(12) United States Patent
Sweeney et al.

(10) Patent No.: US 9,904,729 B2
(45) Date of Patent: *Feb. 27, 2018

(54) SYSTEM, METHOD, AND COMPUTER PROGRAM FOR A CONSUMER DEFINED INFORMATION ARCHITECTURE

(71) Applicant: Primal Fusion Inc., Waterloo (CA)

(72) Inventors: Peter Sweeney, Kitchener (CA); Robert Good, Waterloo (CA)

(73) Assignee: Primal Fusion Inc., Kitchener, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/915,489

(22) Filed: Jun. 11, 2013

(65) Prior Publication Data

US 2013/0275359 A1  Oct. 17, 2013

Related U.S. Application Data

(63) Continuation of application No. 12/441,100, filed as application No. PCT/CA2007/001546 on Aug. 31, (Continued)

(51) Int. Cl.
*G06F 7/00* (2006.01)
*G06F 17/30* (2006.01)
(Continued)

(52) U.S. Cl.
CPC .. *G06F 17/30734* (2013.01); *G06F 17/30705* (2013.01); *G06F 17/30707* (2013.01); *G06F 17/30914* (2013.01); *G06N 5/02* (2013.01)

(58) Field of Classification Search
CPC ......... G06F 17/30705; G06F 17/30038; G06F 17/30643; G06F 17/30707;
(Continued)

(56) References Cited

U.S. PATENT DOCUMENTS 3,943,462 A  3/1976 Thompson
4,532,813 A  8/1985 Rinehart
(Continued)

FOREIGN PATENT DOCUMENTS

CA  2734756 A1  3/2010
CN  1395193 A   2/2003
(Continued)

OTHER PUBLICATIONS

International Search Report and Written Opinion for PCT/CA2007/001546 dated Dec. 28, 2007.
(Continued)

*Primary Examiner* — Kris Mackes
*Assistant Examiner* — Cecile Vo
(74) *Attorney, Agent, or Firm* — Norton Rose Fulbright Canada LLP; Niall Cooney

(57) ABSTRACT

Techniques are described for performing synthesis of relationships between a plurality of concept definitions automatically derived from a faceted domain of information. Some embodiments involve identifying at least one facet attribute in an active concept definition specified by user input. In response to determining that at least one explicit relationship and/or at least one implicit relationship exist(s) between the active concept definition and a first concept definition of the plurality of concept definitions, a relationship is synthesized between the active concept definition and the first concept definition.

22 Claims, 37 Drawing Sheets

Related U.S. Application Data 2007, now Pat. No. 8,510,302, which is a continuation-in-part of application No. 11/469,258, filed on Aug. 31, 2006, now Pat. No. 7,596,574, which is a continuation-in-part of application No. 11/392,937, filed on Mar. 30, 2006, now abandoned, said application No. PCT/CA2007/001546 is a continuation-in-part of application No. 11/550,457, filed on Oct. 18, 2006, now Pat. No. 7,606,781, which is a continuation-in-part of application No. 11/469,258, filed on Aug. 31, 2006, now Pat. No. 7,596,574, said application No. PCT/CA2007/001546 is a continuation-in-part of application No. 11/625,452, filed on Jan. 22, 2007, now Pat. No. 7,849,090, which is a continuation-in-part of application No. 11/550,457, filed on Oct. 18, 2006, now Pat. No. 7,606,781.

(60) Provisional application No. 60/666,166, filed on Mar. 30, 2005.

(51) Int. Cl.
*G06N 5/02* (2006.01)
*G06F 13/14* (2006.01)

(58) Field of Classification Search
CPC ......... G06F 17/30734; G06F 17/30914; G06F 17/30029; G06F 17/3028; G06F 17/30864; G06F 17/30699; G06F 17/30867; G06F 7/00
USPC ... 707/E17.046, E17.089, E17.095, 999.107, 707/736, 737, 999.1, E17.009, E17.047, 707/E17.067, 706, 708, 741, 999.102, 707/E17.109, 999.104, 758, 796, 728, 707/E17.059, 999.103; 706/45, 60; 715/764
See application file for complete search history.

(56) References Cited

U.S. PATENT DOCUMENTS

| | | | |
|---|---|---|---|
| 4,972,328 | A | 11/1990 | Wu et al. |
| 5,056,021 | A | 10/1991 | Ausborn |
| 5,193,185 | A | 3/1993 | Lanter |
| 5,369,763 | A | 11/1994 | Biles |
| 5,745,910 | A | 4/1998 | Piersol et al. |
| 5,774,888 | A | 6/1998 | Light |
| 5,793,376 | A | 8/1998 | Tanaka et al. |
| 5,835,758 | A | 11/1998 | Nochur et al. |
| 5,911,145 | A | 6/1999 | Arora et al. |
| 5,937,400 | A | 8/1999 | Au |
| 5,953,726 | A | 9/1999 | Carter et al. |
| 6,006,222 | A | 12/1999 | Culliss |
| 6,078,916 | A | 6/2000 | Culliss |
| 6,098,033 | A | 8/2000 | Richardson et al. |
| 6,138,085 | A | 10/2000 | Richardson et al. |
| 6,167,390 | A | 12/2000 | Brady et al. |
| 6,173,276 | B1 | 1/2001 | Kant et al. |
| 6,233,575 | B1 | 5/2001 | Agrawal et al. |
| 6,292,792 | B1 | 9/2001 | Belles et al. |
| 6,295,066 | B1 | 9/2001 | Tanizaki et al. |
| 6,334,131 | B2 | 12/2001 | Chakrabarti et al. |
| 6,349,275 | B1 | 2/2002 | Schumacher et al. |
| 6,356,899 | B1 | 3/2002 | Chakrabarti et al. |
| 6,396,864 | B1 | 5/2002 | O'Brien et al. |
| 6,401,061 | B1 | 6/2002 | Zieman |
| 6,499,024 | B1 | 12/2002 | Stier et al. |
| 6,539,376 | B1 | 3/2003 | Sundaresan et al. |
| 6,539,395 | B1 | 3/2003 | Gjerdingen et al. |
| 6,556,983 | B1 | 4/2003 | Altschuler et al. |
| 6,571,240 | B1 | 5/2003 | Ho et al. |
| 6,694,329 | B2 | 2/2004 | Murray |
| 6,751,611 | B2 | 6/2004 | Krupin et al. |
| 6,751,621 | B1 | 6/2004 | Calistri-Yeh et al. |
| 6,768,982 | B1 | 7/2004 | Collins et al. |
| 6,772,136 | B2 | 8/2004 | Kant et al. |
| 6,785,683 | B1 | 8/2004 | Zodik et al. |
| 6,868,525 | B1 | 3/2005 | Szabo |
| 6,976,020 | B2 | 12/2005 | Anthony et al. |
| 6,980,984 | B1 | 12/2005 | Huffman et al. |
| 7,007,074 | B2 | 2/2006 | Radwin |
| 7,035,864 | B1 | 4/2006 | Ferrari et al. |
| 7,051,023 | B2 | 5/2006 | Kapur et al. |
| 7,062,466 | B2 | 6/2006 | Wagner et al. |
| 7,062,483 | B2 | 6/2006 | Ferrari et al. |
| 7,076,503 | B2 | 7/2006 | Platt et al. |
| 7,089,237 | B2 | 8/2006 | Turnbull et al. |
| 7,120,646 | B2 | 10/2006 | Streepy, Jr. |
| 7,152,065 | B2 | 12/2006 | Behrens et al. |
| 7,181,465 | B2 | 2/2007 | Maze et al. |
| 7,209,922 | B2 | 4/2007 | Maze et al. |
| 7,225,183 | B2 | 5/2007 | Gardner |
| 7,249,117 | B2 | 7/2007 | Estes |
| 7,280,991 | B1 | 10/2007 | Beams et al. |
| 7,283,992 | B2 | 10/2007 | Liu et al. |
| 7,302,418 | B2 | 11/2007 | Asahara |
| 7,319,951 | B2 | 1/2008 | Rising, III et al. |
| 7,392,250 | B1 | 6/2008 | Dash et al. |
| 7,406,456 | B2 | 7/2008 | Calistri-Yeh et al. |
| 7,418,452 | B2 | 8/2008 | Maze |
| 7,440,940 | B2 | 10/2008 | Chen et al. |
| 7,478,089 | B2 | 1/2009 | Henkin et al. |
| 7,490,073 | B1 | 2/2009 | Qureshi et al. |
| 7,493,319 | B1 | 2/2009 | Dash et al. |
| 7,496,593 | B2* | 2/2009 | Gardner ............... G06F 17/279 |
| 7,502,810 | B2 | 3/2009 | Acevedo-Aviles et al. |
| 7,580,918 | B2 | 8/2009 | Chang et al. |
| 7,596,374 | B2 | 9/2009 | Katou |
| 7,596,574 | B2 | 9/2009 | Sweeney |
| 7,606,168 | B2 | 10/2009 | Robinson et al. |
| 7,606,781 | B2 | 10/2009 | Sweeney et al. |
| 7,627,582 | B1 | 12/2009 | Ershov |
| 7,668,737 | B2 | 2/2010 | Streepy, Jr. |
| 7,711,672 | B2 | 5/2010 | Au |
| 7,716,207 | B2 | 5/2010 | Odom et al. |
| 7,716,216 | B1 | 5/2010 | Harik et al. |
| 7,720,857 | B2 | 5/2010 | Beringer et al. |
| 7,752,199 | B2 | 7/2010 | Farrell |
| 7,752,534 | B2 | 7/2010 | Blanchard, III et al. |
| 7,827,125 | B1 | 11/2010 | Rennison |
| 7,844,565 | B2 | 11/2010 | Sweeney |
| 7,849,090 | B2 | 12/2010 | Sweeney |
| 7,853,582 | B2* | 12/2010 | Gopalakrishnan ........................ G06F 17/30029 379/88.13 |
| 7,860,817 | B2 | 12/2010 | Sweeney et al. |
| 7,945,555 | B2 | 5/2011 | Sankaran et al. |
| 7,970,764 | B1 | 6/2011 | Ershov |
| 8,010,570 | B2 | 8/2011 | Sweeney |
| 8,281,238 | B2 | 10/2012 | Sweeney et al. |
| 8,510,302 | B2* | 8/2013 | Sweeney ........... G06F 17/30705 707/736 |
| 2002/0002450 | A1 | 1/2002 | Nunberg et al. |
| 2002/0069197 | A1* | 6/2002 | Katayama ......... G06F 17/30707 |
| 2002/0078044 | A1* | 6/2002 | Song .................. G06F 17/3071 |
| 2002/0133483 | A1 | 9/2002 | Klenk et al. |
| 2002/0194187 | A1 | 12/2002 | McNeil et al. |
| 2003/0177112 | A1* | 9/2003 | Gardner ............... G06F 19/28 |
| 2003/0196094 | A1 | 10/2003 | Hillis et al. |
| 2003/0217023 | A1 | 11/2003 | Cui et al. |
| 2003/0217335 | A1* | 11/2003 | Chung .............. G06F 17/2785 715/206 |
| 2004/0024739 | A1 | 2/2004 | Cooperman et al. |
| 2004/0049522 | A1 | 3/2004 | Streepy, Jr. |
| 2005/0010428 | A1 | 1/2005 | Bergeron et al. |
| 2005/0060297 | A1 | 3/2005 | Najork |
| 2005/0065955 | A1* | 3/2005 | Babikov ............. G06F 17/30607 |
| 2005/0086188 | A1 | 4/2005 | Hillis et al. |
| 2005/0149502 | A1 | 7/2005 | McSherry |
| 2005/0149518 | A1 | 7/2005 | Duan et al. |
| 2005/0154708 | A1 | 7/2005 | Sun |

(56) References Cited

U.S. PATENT DOCUMENTS

| | | |
|---|---|---|
| 2005/0209874 A1 | 9/2005 | Rossini |
| 2005/0216335 A1 | 9/2005 | Fikes et al. |
| 2005/0223109 A1 | 10/2005 | Mamou et al. |
| 2005/0289524 A1 | 12/2005 | McGinnes |
| 2006/0010117 A1 | 1/2006 | Bonabeau et al. |
| 2006/0026147 A1 | 2/2006 | Cone et al. |
| 2006/0053172 A1 | 3/2006 | Gardner et al. |
| 2006/0074980 A1* | 4/2006 | Sarkar ............... G06F 17/3089 |
| 2006/0085489 A1 | 4/2006 | Tomic et al. |
| 2006/0129906 A1 | 6/2006 | Wall |
| 2006/0153083 A1 | 7/2006 | Wallenius |
| 2006/0195407 A1 | 8/2006 | Athelogou et al. |
| 2006/0242564 A1 | 10/2006 | Egger et al. |
| 2006/0271520 A1 | 11/2006 | Ragan |
| 2007/0033531 A1 | 2/2007 | Marsh |
| 2007/0036440 A1 | 2/2007 | Schaepe et al. |
| 2007/0038500 A1 | 2/2007 | Hammitt et al. |
| 2007/0061195 A1 | 3/2007 | Liu et al. |
| 2007/0078889 A1 | 4/2007 | Hoskinson |
| 2007/0083492 A1 | 4/2007 | Hohimer et al. |
| 2007/0094221 A1 | 4/2007 | Au |
| 2007/0106658 A1 | 5/2007 | Ferrari et al. |
| 2007/0118542 A1 | 5/2007 | Sweeney |
| 2007/0136221 A1 | 6/2007 | Sweeney et al. |
| 2007/0143300 A1 | 6/2007 | Gulli et al. |
| 2007/0174041 A1 | 7/2007 | Yeske |
| 2007/0192272 A1 | 8/2007 | Elfayoumy et al. |
| 2007/0203865 A1 | 8/2007 | Hirsch |
| 2007/0208719 A1 | 9/2007 | Tran |
| 2007/0208764 A1 | 9/2007 | Grisinger |
| 2007/0288503 A1 | 12/2007 | Taylor |
| 2007/0294200 A1 | 12/2007 | Au |
| 2007/0300142 A1 | 12/2007 | King et al. |
| 2008/0001948 A1 | 1/2008 | Hirsch |
| 2008/0004864 A1 | 1/2008 | Gabrilovich et al. |
| 2008/0021925 A1 | 1/2008 | Sweeney |
| 2008/0072145 A1 | 3/2008 | Blanchard et al. |
| 2008/0086465 A1 | 4/2008 | Fontenot et al. |
| 2008/0092044 A1 | 4/2008 | Lewis et al. |
| 2008/0126303 A1 | 5/2008 | Park et al. |
| 2008/0137668 A1 | 6/2008 | Rodriguez et al. |
| 2008/0154906 A1 | 6/2008 | McDavid et al. |
| 2008/0162498 A1 | 7/2008 | Omoigui |
| 2008/0228568 A1 | 9/2008 | Williams et al. |
| 2008/0243480 A1 | 10/2008 | Bartz et al. |
| 2008/0270120 A1 | 10/2008 | Pestian et al. |
| 2008/0275694 A1 | 11/2008 | Varone |
| 2008/0281814 A1 | 11/2008 | Calistri-Yeh et al. |
| 2008/0294584 A1 | 11/2008 | Herz |
| 2009/0012842 A1 | 1/2009 | Srinivasan et al. |
| 2009/0018988 A1 | 1/2009 | Abrams et al. |
| 2009/0024385 A1 | 1/2009 | Hirsch |
| 2009/0024556 A1 | 1/2009 | Hirsch |
| 2009/0028164 A1 | 1/2009 | Hirsch |
| 2009/0037261 A1 | 2/2009 | Won Cho |
| 2009/0055342 A1 | 2/2009 | Gong et al. |
| 2009/0070219 A1 | 3/2009 | D'Angelo et al. |
| 2009/0083140 A1 | 3/2009 | Phan |
| 2009/0106234 A1 | 4/2009 | Siedlecki et al. |
| 2009/0138454 A1 | 5/2009 | Rayner et al. |
| 2009/0144059 A1 | 6/2009 | Yu et al. |
| 2009/0150809 A1 | 6/2009 | Hirsch |
| 2009/0157442 A1 | 6/2009 | Tesler |
| 2009/0157616 A1 | 6/2009 | Barber et al. |
| 2009/0182725 A1 | 7/2009 | Govani et al. |
| 2009/0192954 A1 | 7/2009 | Katukuri et al. |
| 2009/0192968 A1 | 7/2009 | Tunstall-Pedoe |
| 2009/0198561 A1 | 8/2009 | Otto et al. |
| 2009/0228425 A1 | 9/2009 | Goraya |
| 2009/0300326 A1 | 12/2009 | Sweeney |
| 2009/0307581 A1 | 12/2009 | Jaepel et al. |
| 2009/0327205 A1 | 12/2009 | Sweeney |
| 2009/0327417 A1 | 12/2009 | Chakra et al. |
| 2010/0030552 A1 | 2/2010 | Chen et al. |
| 2010/0036783 A1 | 2/2010 | Rodriguez |
| 2010/0036790 A1 | 2/2010 | Sweeney et al. |
| 2010/0036829 A1 | 2/2010 | Leyba |
| 2010/0049702 A1 | 2/2010 | Martinez et al. |
| 2010/0049766 A1 | 2/2010 | Sweeney et al. |
| 2010/0057664 A1 | 3/2010 | Sweeney et al. |
| 2010/0070448 A1 | 3/2010 | Omoigui |
| 2010/0100546 A1 | 4/2010 | Kohler |
| 2010/0107094 A1 | 4/2010 | Steelberg et al. |
| 2010/0122151 A1 | 5/2010 | Mendelson et al. |
| 2010/0153219 A1 | 6/2010 | Mei et al. |
| 2010/0161317 A1 | 6/2010 | Au |
| 2010/0198724 A1 | 8/2010 | Thomas |
| 2010/0205061 A1 | 8/2010 | Karmarkar |
| 2010/0217745 A1 | 8/2010 | Song et al. |
| 2010/0223295 A1 | 9/2010 | Stanley et al. |
| 2010/0228693 A1 | 9/2010 | Dawson et al. |
| 2010/0235307 A1 | 9/2010 | Sweeney et al. |
| 2010/0250526 A1 | 9/2010 | Prochazka et al. |
| 2010/0257171 A1 | 10/2010 | Shekhawat |
| 2010/0262456 A1 | 10/2010 | Feng et al. |
| 2010/0268596 A1 | 10/2010 | Wissner et al. |
| 2010/0280860 A1 | 11/2010 | Iskold et al. |
| 2010/0285818 A1 | 11/2010 | Crawford |
| 2010/0287011 A1 | 11/2010 | Muchkaev |
| 2011/0040749 A1 | 2/2011 | Ceri et al. |
| 2011/0060644 A1 | 3/2011 | Sweeney |
| 2011/0060645 A1 | 3/2011 | Sweeney |
| 2011/0060794 A1 | 3/2011 | Sweeney |
| 2011/0113386 A1 | 5/2011 | Sweeney et al. |
| 2011/0173176 A1 | 7/2011 | Christensen et al. |
| 2011/0282919 A1 | 11/2011 | Sweeney et al. |
| 2011/0314006 A1 | 12/2011 | Sweeney et al. |
| 2011/0314382 A1 | 12/2011 | Sweeney |
| 2011/0320396 A1 | 12/2011 | Hunt et al. |
| 2012/0143880 A1 | 6/2012 | Sweeney et al. |
| 2012/0150874 A1 | 6/2012 | Sweeney et al. |
| 2012/0166371 A1 | 6/2012 | Sweeney et al. |
| 2012/0166372 A1 | 6/2012 | Ilyas et al. |
| 2012/0166373 A1 | 6/2012 | Sweeney et al. |
| 2012/0323899 A1 | 12/2012 | Ilyas et al. |
| 2012/0323910 A1 | 12/2012 | Ilyas et al. |
| 2012/0324367 A1 | 12/2012 | Ilyas et al. |
| 2013/0046723 A1 | 2/2013 | Sweeney et al. |

FOREIGN PATENT DOCUMENTS

| | | |
|---|---|---|
| EP | 0 962 873 A1 | 12/1999 |
| JP | 2002-007460 A | 1/2002 |
| WO | WO 02/054292 A2 | 7/2002 |
| WO | WO 2004/075466 A2 | 9/2004 |
| WO | WO 2005/020093 A1 | 3/2005 |
| WO | WO 2005/020094 A1 | 3/2005 |
| WO | WO 2007/047971 A2 | 4/2007 |
| WO | WO 2008/025167 A1 | 3/2008 |
| WO | WO 2008/063987 A2 | 5/2008 |
| WO | WO 2008/076438 A1 | 6/2008 |
| WO | WO 2009/014837 A2 | 1/2009 |
| WO | WO 2009/132442 A1 | 11/2009 |
| WO | WO 2010/022505 A1 | 3/2010 |
| WO | WO 2010/149427 A1 | 12/2010 |
| WO | WO 2011/029177 A1 | 3/2011 |
| WO | WO 2011/029177 A4 | 3/2011 |
| WO | WO 2011/057396 A1 | 5/2011 |
| WO | WO 2011/160204 A1 | 12/2011 |
| WO | WO 2011/160205 A1 | 12/2011 |
| WO | WO 2011/160214 A1 | 12/2011 |
| WO | WO 2012/088590 A1 | 7/2012 |
| WO | WO 2012/088591 A1 | 7/2012 |
| WO | WO 2012/088611 A1 | 7/2012 |
| WO | WO 2012/092669 A1 | 7/2012 |
| WO | WO 2012/174648 A1 | 12/2012 |

OTHER PUBLICATIONS

International Preliminary Report on Patentability for PCT/CA2007/001546 dated Dec. 19, 2008.

International Search Report and Written Opinion for PCT/CA2009/000567 dated Aug. 24, 2009.

(56) References Cited

OTHER PUBLICATIONS

International Preliminary Report on Patentability for PCT/CA2009/000567 dated Nov. 11, 2010.
International Search Report and Written Opinion for PCT/CA2009/001185 dated Dec. 3, 2009.
International Preliminary Report on Patentability for PCT/CA2009/001185 dated Mar. 10, 2011.
International Search Report and Written Opinion for International Application No. PCT/CA2010/001382 dated Jan. 13, 2011.
International Preliminary Report on Patentability for PCT/CA2010/001382 dated Mar. 22, 2012.
International search report and written opinion for International application No. PCT/CA2010/001772, dated Apr. 28, 2011.
International Preliminary Report on Patentability for International application No. PCT/CA2010/001772, dated May 24, 2012.
International Search Report and Written Opinion for International Application No. PCT/CA2011/000718 dated Oct. 13, 2011.
International Preliminary Report on Patentability for International Application No. PCT/CA2011/000718 dated Jan. 10, 2013.
International Search Report and Written Opinion of the International Searching Authority for International Application No. PCT/CA2011/000719, dated Sep. 28, 2011.
International Preliminary Report on Patentability for International Application No. PCT/CA2011/000719, dated Jan. 10, 2013.
International Search Report and Written Opinion for International Application No. PCT/CA2011/000745 dated Sep. 22, 2011.
International Preliminary Report on Patentability for International Application No. PCT/CA2011/000745 dated Jan. 10, 2013.
International Search Report and Written Opinion for International Application No. PCT/CA2011/001382 dated Apr. 24, 2012.
International Search Report and Written Opinion of the International Searching Authority for International Application No. PCT/CA2011/001402, dated Apr. 24, 2012.
International Search Report and Written Opinion for International Application No. PCT/CA2011/001403 dated May 23, 2012.
International Search Report and Written Opinion of the International Searching Authority for International Application No. PCT/CA2012/000007, dated Apr. 20, 2012.
International Search Report and Written Opinion of the International Searching Authority for International Application No. PCT/CA2012/000009, dated May 1, 2012.
International Search Report and Written Opinion for International Application No. PCT/CA2012/000603 dated Nov. 5, 2012.
Examiner's First Report for AU 2007291867 dated Aug. 18, 2001.
Chinese Office Action for Chinese Application No. 200780032062.9, dated May 17, 2011.
Second Office Action for CN 200780032062.9 dated May 14, 2012.
Extended European Search Report for EP 07800570.9 dated Jun. 21, 2011.
Office Action for IL 197261 dated Jul. 3, 2012.
First Office Action for JP 2009-525879 dated Jun. 19, 2012.
Second Office Action for JP 2009-525879 dated Dec. 25, 2012.
Office Action for U.S. Appl. No. 11/625,452 dated Mar. 30, 2009.
Office Action for U.S. Appl. No. 11/625,452 dated Dec. 7, 2009.
Office Action for U.S. Appl. No. 11/625,452 dated Mar. 26, 2010.
Office Action for U.S. Appl. No. 11/625,452 dated Oct. 25, 2010.
Office Action for U.S. Appl. No. 12/477,994 dated Aug. 31, 2010.
Office Action for U.S. Appl. No. 12/477,994 dated Oct. 12, 2010.
Office Action for U.S. Appl. No. 12/477,977 dated Sep. 28, 2010.
Office Action for U.S. Appl. No. 11/469,258 dated Aug. 21, 2008.
Interview Summary for U.S. Appl. No. 11/469,258 dated Dec. 16, 2008.
Office Action for U.S. Appl. No. 11/550,457 dated Dec. 15, 2008.
Office Action for U.S. Appl. No. 12/556,349 dated Jun. 29, 2010.
Advisory Action for U.S. Appl. No. 12/441,100 dated May 4, 2012.
Office Action for U.S. Appl. No. 12/441,100 dated Apr. 19, 2013.
Office Action for U.S. Appl. No. 12/441,100 dated Dec. 24, 2012.
Office Action for U.S. Appl. No. 12/441,100 dated Jan. 24, 2012.
Office Action for U.S. Appl. No. 12/441,100 dated Jan. 18, 2013.
Office Action for U.S. Appl. No. 12/441,100 dated Jun. 9, 2011.
Office Action for U.S. Appl. No. 12/441,100 dated Oct. 31, 2011.
Office Action for U.S. Appl. No. 12/549,812 dated Oct. 1, 2012.
Office Action for U.S. Appl. No. 12/671,846 dated Feb. 14, 2013.
Office Action for U.S. Appl. No. 12/555,222 dated Jan. 27, 2012.
Office Action for U.S. Appl. No. 12/555,222 dated Oct. 31, 2012.
Office Action for U.S. Appl. No. 12/555,341 dated Feb. 9, 2012.
Office Action for U.S. Appl. No. 12/555,341 dated Aug. 1, 2012.
Office Action for U.S. Appl. No. 12/615,703 dated Feb. 1, 2012.
Office Action for U.S. Appl. No. 13/105,890 dated Jun. 26, 2012.
Office Action for U.S. Appl. No. 13/105,890 dated Dec. 26, 2012.
[No Author Listed] "Faceted Classification and Adaptive Concept Matching," Gemstone Business Intelligence Ltd., Feb. 2006. pp. 1-7. 7 pages.
Allen et al., Two digital library interfaces that exploit hierarchical structure. Proceedings of DAGS95: Electronic Publishing and the Information Superhighway. 1995. 8 pages.
Anick et al., Interactive document retrieval using faceted terminological feedback. HICSS-32. Proceedings of the 32nd Annual Hawaii International Conference on Systems Sciences. 1999;2(2):2036-2048. Digital Object Identifier: 10.1109/HICSS.1999.772692.
Blei et al., Hierarchical Bayesian models for applications in information retrieval. In: Bayesian Statistics 7. Bernardo et al., eds. 2003:25-43.
Bollegala et al., Measuring semantic similarity between words using web searches engines. Proceedings of 16th International Conference on World Wide Web. 2007;757-66.
Brewster et al., User-Centered Ontology Learning for Knowledge Management. 7th International Workshop on Applications of Natural Language to Information Systems, Stockholm, Jun. 27-28, 2002. Lecture Notes in Computer Sciences, Springer Verlag. 2002:12 pages.
Brewster et al., User-Centered Ontology Learning for Knowledge Management. 7th International Workshop on Applications of Natural Language to Information Systems, Stockholm, Jun. 27-28. 2002. Lecture Notes in Computer Sciences, Springer Verlag. 2002:203-207. 5 pages.
Dakka et al., Automatic Extraction of Useful Facet Hierarchies from Text Databases. Data Engineering. IEEE 24th International Conference on Apr. 7-12, 2008. ICDE 2008:466-475. Digital Object Identifier 10.1109/ICDE.2008.4467455.
Fikadu et al., A Framework for Personalized Information Retrieval Model. Conference Proceedings, Second International Conference on Computer and Network Technology (ICCNT), IEEE, Piscataway, NJ, USA Apr. 23, 2010, pp. 500-505.
Gabrilovich et al., Computing semantic relatedness using wikipedia-based explicit semantic analysis. Proceedings of 20th International Joint Conference on Artificial Intelligence. 2007;1606-11.
Hassan-Montero et al., Improving tag-clouds as visual information retrieval interfaces, International Conference on Multidisciplinary Information Sciences and Technologies, InSciT2006. Oct. 25-28, 2006, Merida, Spain. 6 pages.
Hiemstra, A probabilistic justification for using tf-idf term weighting in information retrieval. International Journal on Digital Libraries. 2000;3(2):131-39.
Jiang et al., Semantic similarity based on corpus statistics and lexical taxonomy. Proceedings of International Conference Research on Computational Linguistics. 1997; 15 pages.
Jones, A statistical interpretation of term specificity and its applications in retrieval. Journal of Documentation. 2004;60(5):493-502.
Kaser et al., Tag-Cloud Drawing: Algorithms for Cloud Visualization, arXiv:cs/0703109v2 [cs.DS] May 7, 2007.
Lewis, Naive (bayes) at forty: The independence assumption in information retrieval. Lecture Notes in Computer Science. 1998;1398:4-15.
Loehrlein et al., A hybrid approach to faceted classification based on analysis of descriptor suffixes. Proceedings of the American Society for Information Science and Technology. 2005;42(1). 18 pages.
Ma et al., Semantic Information Extraction of Video Based on Ontology and Inference. ICSC 2007. International Conference on Semantic Computing. 2007;1:721-726. Digital Object Identifier: 10.1109/ ICSC.2007.12.

(56) References Cited

OTHER PUBLICATIONS

Metzler et al., A Markov random field model for term dependencies. Proceedings of SIGIR 2005. 2005:472-79.

Mihalcea, Unsupervised Large-Vocabulary Word Sense Disambiguation with Graph-based Algorithms for Sequence Data Labeling. Proceedings of Human Language Technology Conference and Conference on Empirical Methods in Natural Language Processing (HLT/EMNLP). Vancouver. Oct. 2005:411-118.

Ozcan et al., Concept-based information access. Proceedings of the International Conference on Information Technology: Coding and Computing. ITCC 2005;1:794-799. Digital Object Identifier: 10.1109/ITCC.2005.111.

Payne et al., Calendar Agents on the Semantic Web. IEEE Intelligent Systems. Jun. 2002;17(3):84-86.

Robertson, Understanding inverse document frequency: On theoretical arguments for ids. Journal of Documentation. 2004;60(5):503-20.

Rocha, Adaptive Webs for Heterarchies with Diverse Communities of Users. Paper prepared for the workshop from Intelligent Networks to the Global Brain: Evolutionary Social Organization through Knowledge Technology, Brussels, Jul. 3-5, 2001. LAUR005173. 35 pages.

Seco et al., An intrinsic information content metric for semantic similarity in wordnet. Proceedings of 16th European Conference on Artificial Intelligence. 2004;1089-90.

Slavic et al., Core Requirements for Automation of Analytico-Synthetic Classifications. Advances in Knowledge Organization. 2004;9:187-192.

Song et al., A conceptual graph approach to semantic similarity computation method for e-service discovery. International Journal on Knowledge Engineering and Data Mining. 2010;1(1):50-68.

Storey, Comparing Relationships in Conceptual Modeling: Mapping to Semantic Classifications. IEEE Transactions on Knowledge and Data Engineering. 2005;17(11):1478-1489. Digital Object Identifier: 10.1109/.

Terra et al., Frequency estimates for statistical word similarity measures. Proceedings of 2003 Conference of the North American Chapter of the Association for Computational Linguistics on Human Language Technology. 2003:165-172.

Wang et al., Gene expression correlation and gene ontology-based similarity: An assessment of quantitative relationships. Proceedings of IEEE Symposium on Computational Intelligence in Bioinformatics and Computational Biology. 2004:25-31.

Wu et al., Interpreting tf-idf term weights as making relevance decisions. ACM Transactions on Information Systems. 2008;26(3):Article No. 13.

Zhai, Statistical language models for information retrieval—a critical review. Foundations and Trends in Information Retrieval. 2008;2(3):137-213.

Zhang et al., Bootstrapping Ontology Learning for Information Retrieval Using Formal Concept Analysis and Information Anchors. 14th International Conference on Conceptual Structures. Aalborg, Denmark. Jul. 2006. 14 pages.

\* cited by examiner

Faceted classification

Overview of Operations
(Data structure transformation)

Overview of system methods

Extract input data

Process source structure analytics

Extracting preliminary concept definitions

Morpheme extraction

Potential morpheme relationships
from concept hierarchy

Calculate potential morpheme relationships

Merging morpheme relationships

Morpheme polyhierarchy before attribution

Morpheme hierarchy after attribution

Morpheme hierarchy

Keyword hierarchy

Data output process

Constructing dimensional concepts

Constructing dimensional concept taxonomy

Constructing implicit concept relationships

Concept hierarchy construction

Concept taxonomy
build process
(Localized domain set)

Mode of Dynamic Synthesis

Candidate Set Assembly for Dynamic Synthesis

Container edits

Personalization

Architecture Components

Simplified Database Schema

System overview

Multi-tier data structures

Presentation of concept taxonomy views

Dynamic concept synthesis user interface

Outliner editing interface

Computer System

SYSTEM, METHOD, AND COMPUTER PROGRAM FOR A CONSUMER DEFINED INFORMATION ARCHITECTURE

PRIORITY

This application is a continuation of U.S. patent application Ser. No. 12/441,100, filed on Nov. 12, 2009, entitled "System, Method, and Computer Program for a Consumer Defined Information Architecture," which is incorporated herein by reference in its entirety.

U.S. patent application Ser. No. 12/441,100 claims the benefit of U.S. patent application Ser. No. 11/469,258, filed on Aug. 31, 2006, now U.S. Pat No. 7,596,574, entitled "Complex-Adaptive System For Providing a Faceted Classification;" U.S. patent application Ser. No. 11/550,457, filed on Oct. 18, 2006, now U.S. Pat. No. 7,606,781, entitled "System, Method and Computer Program for Facet Analysis;" and U.S. patent application Ser. No. 11/625,452, filed on Jan. 22, 2007, now U.S. Pat. No. 7,849,090, entitled "System, Method and Computer Program for Faceted Classification Synthesis."

FIELD OF THE INVENTION

This invention relates generally to classification systems. More particularly this invention relates to a system, method, and computer program to classify information. This invention further relates to a system, method, and computer program for synthesizing a classification structure for a particular domain of information.

BACKGROUND OF THE INVENTION

Faceted classification is based on the principle that information has a multi-dimensional quality, and can be classified in many different ways. Subjects of an informational domain are subdivided into facets to represent this dimensionality. The attributes of the domain are related in facet hierarchies. The materials within the domain are then identified and classified based on these attributes.

FIG. 1 illustrates the general approach of faceted classification in the prior art, as it applies (for example) to the classification of wine.

Faceted classification is known as an analytico-synthetic method, as it involves processes of both analysis and synthesis. To devise a scheme for faceted classification, information domains are analyzed to determine their basic facets. The classification may then be synthesized (or built) by applying the attributes of these facets to the domain.

Many scholars have identified faceted classification as an ideal method for organizing massive stores of information, such as those on the Internet. Faceted classification is amenable to our rapidly changing and dynamic information. Further, by subdividing subjects into facets, it provides for multiple and varied ways to access the information.

Yet despite the potential of faceted classification for addressing our classification needs, its adoption has been slow. Relative to the massive amount of information on the Internet, very few domains use faceted classification. Rather, its use has been segmented within specific vertical applications (such as e-commerce stores and libraries). It generally remains in the purview of scholars, professional classificationists, and information architects.

The barriers to adoption of faceted classification lie in its complexity. Faceted classification is a very labor-intensive and intellectually challenging endeavor. This complexity increases with the scale of the information. As the scale increases, the number of dimensions (or facets) compounds within the domain, making it increasingly difficult to organize.

To help address this complexity, scholars have devised rules and guidelines for faceted classification. This body of scholarship dates back many decades, long before the advent of modern computing and data analysis.

More recently, technology has been enlisted in the service of faceted classification. By and large, this technology has been applied within historical classification methods and organizing principles. Bounded by the traditional methods, attempts to provide a fully automated method of faceted classification have generally been frustrated.

As indicative of the state of the art, an example of automated categorization and faceted navigation systems is ENDECA™. ENDECA is recognized as a leader in product excellence in the information categorization and access system industry http://www.usatoday.com/tech/products/cnet/2007-06-29-endece-google_N.htm]

ENDECA's technology uses guided navigation and a meta-relational index which houses the dimensions of the data and documents as well as the relationships among the dimensions: for example, U.S. Pat. No. 7,062,483, Jun. 13, 2006: "Hierarchical data-driven search and navigation system and method for information retrieval"; U.S. Pat. No. 7,035,864, Apr. 25, 2006: "Hierarchical data-driven search and navigation system and method for information retrieval".

ENDECA's system includes a categorization approach that is described by the company as taxonomy definition and classification: U.S. Pat. No. 7,062,483, Jun. 13, 2006: Hierarchical data-driven search and navigation system and method for information retrieval.

The current state of automated categorization technology is most predominately used and useful for what industry experts term "structured data repositories" and "managed content repositories."

Another limitation of the current state of automated categorization technology is its lack of human-based feedback for the cognitively demanding aspects of categorization. For instance, while ENDECA has feedback loops for faceted navigation—including usage popularity to drive search result presentation and priority—it does not have a usage-based feedback loop to improve the semantic definitions and semantic relationships of the content.

Another major category of hybrid categorization systems may be described as large-scale collaborative categorization. This approach attempts to combine the cognitive advantages of manual categorization with the processing power of automated systems. Collaborative categorization systems in this emerging field are called a variety of names: "Web 2.0", "collaborative categorization", "folksonomy", "social indexing", "social tagging", "collective intelligence", and others. FLICKR™ (a photo-sharing community), DEL.I-CIO.US™ (a social bookmarks manager), and WIKIPEDIA™ (the wiki-based collaborative encyclopedia) are examples of this emerging category of collaborative categorization.

In varying proportions, these systems use technology to provide a framework for wide-scale and distributed collaboration, while allowing the collaborators to make decisions about the categories, concepts, and relationships. One challenge to this approach is that it creates clashes between the guidance of topic and classification experts and the input of lay person end-users, who often have very different perspectives and categorization approaches to the content. These systems can help people collaborate by identifying areas of ambiguity and inconsistency, and by highlighting the competing opinions among the collaborators. But ultimately with a collaborative system, people should preferably reconcile their differences and come to broad agreement on the most slippery of terms. This process is thus difficult to scale and extend across large and varied information domains.

A leading example of the collaborative categorization approach is Metaweb Technologies, Inc., which aims to categorize wide-scale, open information domains by using a collaborative categorization approach to create a searchable database over the Web and other complex and varied information environments.

Metaweb Technologies has received much attention for its pioneering collaborative approach to creating the Semantic Web. Metaweb Technologies has filed 2 patent applications with the United States Patent & Trademark Office [United States Patent Application 20050086188, "Knowledge web," Apr. 21, 2005; United States Patent Application 20030196094, "Method and apparatus for authenticating the content of a distributed database," Oct. 16, 2003]."

Metaweb Technologies' collaborative ontology building relies on the "wisdom of the crowd" for its collaborative categorization. With it, end users define and extend multiple schemas that can be used by everybody. According to noted industry watch Esther Dyson, "Metaweb's creators have 'intelligently designed' the grammar of how the relationships are specified, but they are relying on the wisdom (or the specific knowledge) and the efforts of the crowd to create the actual content—not just specific data, but specific kinds of relationships between specific things." [Release 0.9: Metaweb—Emergent Structure vs. Intelligent Design, Mar. 11, 2007, http://www.huffingtonpost.com/esther-dyson/release-09-met_b_43167.html] The limitation of this approach is that the database scope and quality is constrained by the semantic-related content inputted by its users. It also relies on the ability of experts and lay people to agree on specific data elements and specify relationships among content to eliminate redundancy so that the database contains definitive information.

Thus, there are many disadvantages with the current state of the art in automated faceted classification, automated categorization, and large-scale collaborative classification. Technologies are applied within or based on traditional methods. Enhanced classification methods are needed that affect fundamental changes to the structure of information.

For facet analysis, the input of human cognition is generally required, as there are no universal patterns or heuristics for facet analysis that work across all information domains. Presently, only humans possess the full breadth of pattern recognition skills. Unfortunately, structural patterns (such as semantic or syntactical structures) are generally required to be identified within the entire domain of information to be classified and there are many different patterns that may identify facets and attributes. While people can be trained to identify these patterns on small (local) data sets, the task becomes prohibitively difficult as the size of the domain increases.

Limitations are also introduced due to human involvement when the computational demands of the analysis and synthesis processes exceed the powers of human cognition. Humans are adept at assessing the relationships between informational elements at a small scale, but fail to manage the complexity over an entire domain in the aggregate. Systems are needed that are able to aggregate small, localized human inputs across an entire domain of information.

Faceted classification schemes enable multiple perspectives, an oft-cited benefit. Unfortunately, when these perspectives are fragmented across multiple hierarchies, they are not intuitive. This poses serious problems of visualization, integration, and holistic perspective. As the number of facets (or dimensions) in the structure increases, visualization becomes increasingly difficult. Consequently, visualizations of faceted classification schemes are often reduced to "flat", one-dimensional result sets; structures are navigated across only one facet at a time. This type of reduction obscures the rich complexity of the underlying structure.

Methods and technologies are needed that combine the expressiveness and flexibility of faceted schemes within integrated and richly descriptive hierarchies. Moreover, this flexibility optimally extends down to the fundamental level of the classification scheme itself, in a dynamic construction of facets as organizing bases.

Once selected, the facets themselves are static and difficult to revise. This represents a considerable risk in the development of a faceted scheme. Classificationists often lack complete knowledge of the information domain, and thus the selection of these organizing bases is prone to error. Under a dynamic system of classification, these risks would be mitigated by the ability to easily add or alter the underlying facets. Traditional methods of classification and derivative technologies lack flexibility at this fundamental level.

Any classification system may also consider maintenance requirements in dynamic environments. As the materials in the domain change, the classification may adjust accordingly. Maintenance often imposes an even more daunting challenge than the initial development of the faceted classification scheme. Terminology must be updated as it emerges and changes; new materials in the domain are generally required to be evaluated and notated; the arrangement of facets and attributes are generally required to be adjusted to contain the evolving structure. Many times, existing faceted classifications are simply abandoned in favor of whole new classifications.

Hybrid systems involve humans at key stages of analysis, synthesis and maintenance. Involved early on in the process, humans often bottleneck the classification effort. As such, the process remains slow and costly. Systems are needed that accept classification data from people in a more decentralized, ad hoc manner that does not require centralized control and authority. These systems may support implicit feedback mechanisms, wherein the very activities of information access and information consumption provide positive support for the maintenance and growth of the classification scheme.

To guide the process, hybrid systems are often based on existing universal schemes of faceted classification. However, these universal schemes do not always apply to the massive and rapidly evolving modern world of information. There is a need for customized schemes, specialized to the needs of individual domains.

Since universal schemes of faceted classification cannot be applied universally, there is also a need to connect different domains of information together. However, while providing the opportunity to integrate domains, solutions ought to respect the privacy and security of individual domain owners.

The sheer magnitude of our classification needs requires systems that can be managed in wide decentralized environments involving large groups of collaborators. However, classification deals in complex concepts, with shades of meaning and ambiguity. Resolving these ambiguities and conflicts often involve intense negotiations and personal conflicts which derail collaboration in even small groups.

SUMMARY OF THE INVENTION

In a first aspect of the present invention, a method for organizing and managing data structures including based on input from a feedback agent is provided, the method including: (a) a method for faceted classification that is applicable to a domain of information, said method of faceted classification including: (i) a facet analysis of said domain or receiving the results of facet analysis of the domain; and (ii) applying a faceted classification synthesis of said domain; and (b) a complex-adaptive method for selecting and returning information, on one or more iterations, from said faceted classification synthesis, said complex-adaptive method varying the organizing and managing of data structures in response to said returned information.

In another aspect of the present invention, a method for faceted classification of a domain of information including: (a) providing a faceted data set including facet attributes with which to classify information, such facet attributes including optionally facet attribute hierarchies for the facet attributes; (b) providing a dimensional concept taxonomy in which the facet attributes are assigned to objects of the domain to be classified in accordance with concepts that associate meaning to the objects, said concepts being represented by concept definitions defined using said facet attributes and associated with the objects in the dimensional concept taxonomy, said dimensional concept taxonomy expressing dimensional concept relationships between the concept definitions in accordance with the faceted data set; and (c) providing or enabling a complex-adaptive system for selecting and returning dimensional concept taxonomy information to vary the faceted data set and dimensional concept taxonomy in response to the dimensional concept taxonomy information.

In a still other aspect of the present invention, the method for faceted classification of a domain of information further includes performing faceted classification synthesis to relate a set of concepts represented by concept definitions defined in accordance with a faceted data set including facet attributes, and optionally facet attribute hierarchies, said faceted classification synthesis including: expressing dimensional concept relationships between the concept definitions, wherein two concept definitions are determined to be related in a particular dimensional concept relationship by examining whether at least one of explicit relationships and implicit relationships exist in the faceted data set between the respective facet attributes of the two concept definitions.

In yet another aspect of the present invention, a computer system for performing facet analysis of input information selected from a domain of information in accordance with a source data structure is provided, the computer system being: (a) operable to derive facet attributes, and optionally facet attribute hierarchies, of the input information using pattern augmentation and statistical analyses to identify patterns of facet attribute relationships in the input information.

In another aspect of the present invention, a computer system for enabling a user to manipulate dimensional concept relationships is provided, the computer system including: (a) a processor; (b) a computer-readable medium in data communication with the processor, where the computer-readable medium includes thereon processor executable instructions and a plurality of data elements determined to be related in a particular dimensional concept relationship; (c) an input utility configured to allow an outside entity to interface with the processor; (d) a display operative to provide a visual depiction of at least selected data elements; and (e) an editor allowing the outside entity to modify the data elements and the particular dimensional concept relationship.

In yet another aspect of the present invention a system for organizing and managing data structures including based on input from a feedback agent is provided in which: (a) the system includes or is linked to a complex-adaptive system for selecting and returning dimensional concept taxonomy information to vary a faceted data set and a dimensional concept taxonomy in response to dimensional concept taxonomy information; (b) the system is operable to process a faceted data set including facets, facet attributes, and, optionally, facet attribute hierarchies for the facet attributes with which to classify information; and (c) the system is further operable to define the dimensional concept taxonomy in which the facet attributes are assigned to objects of the domain to be classified in accordance with concepts that associate meaning to the objects, said concepts being represented by concept definitions defined using said facet attributes and associated with the objects in the dimensional concept taxonomy, said dimensional concept taxonomy expressing dimensional concept relationships between the concept definitions in accordance with the faceted data set.

BRIEF DESCRIPTION OF THE DRAWINGS

The invention will be better understood with reference to the drawings. Note for the illustrations contained herein, triangle shapes are used to represent relatively simple data structures and pyramid shapes are used to represent relatively complex data structures embodying higher dimensionality. Varying sizes of the triangles and pyramids represent transformations of compression and expansion, but in no way indicate or limit the precise scale of the compression or transformation.

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION OF THE INVENTION

System Operation

Figure 1:
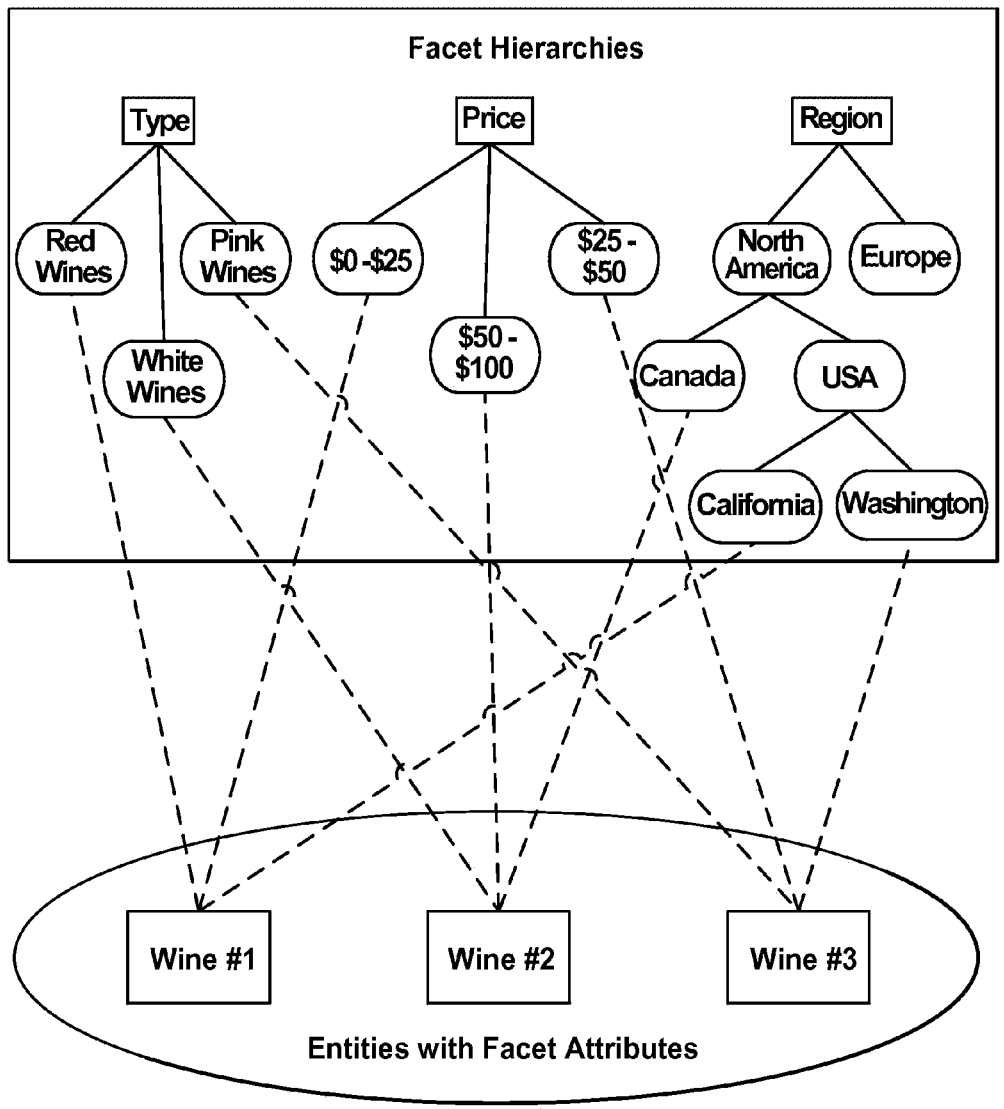
FIG. 1 is a schematic diagram illustrating a method of faceted classification of the prior art.

The detailed description details one or more embodiments of some aspects of the present invention.

The detailed description is divided into the headings and subheadings described below.
(1) "General Description of the Invention"—which describes generally the art of information classification including the present invention in relation to such art, and further describes generally the purposes and some of the advantages of the present invention.
(2) "System Operation"—which describes generally the steps involved in practicing the present invention. The subsection "Overview of Operations" describes generally some of the components that comprise the system. The subsection "Methods of Facet Analysis" describes generally the facet analysis component of the invention. The subsection "Methods of Faceted Classification Synthesis" describes generally the facet synthesis component of the invention, including both the static and dynamic synthesis components of the present invention. The subsection "Mechanisms of Complex-Adaptive Feedback" describes generally the invention's response to various user interactions.
(3) "Implementation"—which describes generally representative embodiments made operable by the present invention. The subsection "System Architecture Components" describes generally possible embodiments of the present invention. The subsection "Data Model and Schema" describes generally the method by which data is transformed by the invention. The subsection "Dimensional Transformation System" describes generally the operation of the system of the present invention as it would occur in just one possible embodiment of the present invention. The following subsections refer to representative implementations of the present invention: "Multi-Tier Data Structures"; "Distributed Computing Environments"; "XML Schema and Client-Side Transformations"; and "User Interfaces".

General Description of the Invention

In light of the limitations and shortcomings in the prior art, we can identify specific requirements of a constructive and collaborative system of information architecture to address the challenges and problems cited herein. Accordingly, several objects and advantages of the present invention are summarized in the following points: These objects or advantages are non-exhaustive and merely serve to illustrate some aspects of the invention and its possible advantages and benefits.

In one aspect of the present invention, the system of the present invention operates on the foundational level of constructing optimal information structures. The vast majority of existing categorization, search and visualization solutions are patchwork over flawed structural foundations, and are thus inherently limited. The system of the present invention provides an ontological and classification framework for complex information structures, but a practical path to implementation. The system of the present invention in one aspect thereof supports complex structures, as opposed to the simple flat structures of the prior art that dominate the informational landscape today.

The system of the present invention supports concept hierarchies as the most familiar and robust model for relating information. (The term "polyhierarchy" describes a structural model that combines the core requirements of dimensionality and concept hierarchies.) However, the system of the present invention in one aspect thereof mitigates the personal and collaborative negotiations that plague concept hierarchy, taxonomy, and ontology construction. It should also provide a reliable mechanism for linking hierarchies from different information domains.

The system of the present invention in one aspect thereof provides structural integrity at the various intersections within the dimensional space. This may be addressed by eliminating the problem of information voids that present in both the nodes and the linkages and connections between nodes.

The system of the present invention in one aspect thereof involves humans to provide the vital cognitive component of context. Although machines provide useful tools for discovery and collaboration, machines do not possess the artificial intelligence necessary to "understand" complex knowledge. As such, the system of the present invention in one aspect thereof relates to humans in a manner that is familiar and accessible to humans.

The system of the present invention involves machines to manage the overwhelming complexity of dimensional structures and concept polyarchies in huge informational domains, and to broker agreements between collaborators in concept descriptions and relationships.

The system of the present invention in one aspect thereof accommodates non-technical lay people in the collaboration. The scarcity of professional architects and the scope of the problem demands universal access to the solution. The present invention may shelter people from the complexities of dimensional structures without compromising their technical advantages.

The system of the present invention is operable to support massive distributed parallel processing ("many hands make light work"). The size and complexity of the informational landscape generally imposes physical limits to processing which appear at present to be practically immutable. Massive and decentralized parallelism is in many cases preferable to challenge these limits.

The system of the present invention in one aspect thereof is operable to support synthesis operations capable of avoiding the physical limits of unbounded information and knowledge. The system of the present invention in one aspect thereof provides the ability to encode the potential for a virtually unlimited number of data connections, without the need for actually generating those data connections until they are requested by the consumers of the information. Further, the system of the present invention may in one aspect thereof provide various modes of synthesis such that only the data connections that match the stated interest and perspective of the consumers are presented.

The system of the present invention in one aspect thereof supports and embraces the dynamism of the informational landscape. It provides structures that can adapt and evolve alongside the information, rather than static snapshots of the information as at a certain point in time.

The system of the present invention is cost-effective. Although search costs provide a tremendous incentive to find solutions to info glut and info sprawl, organizational projects do not carry a blank check. An impediment to a more structured Internet is the astronomical costs of organizing it using existing technologies and methods. These organizational costs are not merely financial, but also borne in human terms and computer processing limits.

The system of the present invention in one aspect thereof provides domain owners and end-users of the system with an opportunity to maintain distinct, private, and highly personalized knowledge repositories, while sharing the benefits of collective intelligence and centralized knowledge assets.

The present invention in one aspect thereof provides a method and system capable of managing a plurality of informational forms, including structural relationships, digital media such as text and multimedia, messaging and e-mail, commerce, and many forms of human interactivity and collaboration, and to provide the end-users with a decentralized system to output structural information across various media, including web sites and software clients.

Further objects and advantages will become apparent from a consideration of the ensuing description and drawings.

System Operation
Overview of Operations

FIGS. 2, 3, 18, 19, 32, 33 and 4 provide an overview of operations and a system for constructing and managing complex dimensional information structures such as to create a dimensional concept taxonomy for a domain. In particular, FIGS. 2, 3, 18, 19, 32, 33 and 4 show a knowledge representation model useful for such operations as well as certain dimensional data structures and constructs. Also shown are methods of data structure transformation including a complex-adaptive system and an enhanced method of faceted classification. This description begins with a brief overview of complex dimensional structures, specifically as they apply to knowledge representation.

Knowledge Representation in Complex Dimensional Structures

There are graduated levels of abstraction that may be used to represent information and knowledge. The notion of "dimensions" is often used to convey the degree of complexity. Simple lists (like a shopping list or a list of friends) may be described as one-dimensional arrays. Tables and spreadsheets—two-dimensional arrays—are more sophisticated than simple lists. Cartesian graphs may describe information in a three-dimensional space, and so on.

Each dimension within the structure may establish an organizing basis for the information contained. The dimensionality thus may establish a complexity scale for the information structures. Complex structures may involve many of these bases, and are often identified as n-dimensional structures.

It is also important to note that the technical attributes of the dimensions themselves may provide much diversity between structures. For example, dimensions may exist as variables, the structures thus establishing multivariate spaces. Under these types of models, nodes may take on specific values or data points within the variables represented by each dimension. Alternatively, the nodes may be less rigorous, merely providing containers for information rather than discrete variables. The distances between nodes may be relative, rather than strictly quantized. By varying these types of technical attributes, the associated structures may strike some balance between organizational rigor and descriptive flexibility.

Some information structures may contain nodes at every intersection; others may be incomplete, missing nodes of intersection between some dimensions. This is particularly relevant when the information structure is constructed manually. When the complexity of the structure exceeds the cognitive abilities of the human architects, errors and voids in the information structure may result.

As an example, when people create hyperlinks in a network structure such as the World Wide Web, the links they provide are rarely comprehensive within the given domain. If there exists a suitable target for a link in a domain, but that link is absent, it can be said that this is a void in the information structure. Alternatively, if an informational structure provides for a category of information, but that information does not presently exist, there may also be a void in the structure.

The integrity of a structure may be described in part by the voids in the information structure. Unless there is an underlying classification system or explicit ontology to manage the relationships, structures may begin to deteriorate as the number of nodes and dimensions increases. Information voids are one marker of this deterioration.

Complex structures have far more information-carrying capacity than simple structures. Just as adding floors increases the volume of a building, adding dimensions increases the amount of information that may be contained in the structure. Without the support of multiple dimensions, structures will eventually collapse under the load as the glut of information exceeds capacity.

Another striking feature of complex dimensional structures is their accessibility. Flat structures will sprawl as the information increases, much like suburbs of small buildings cause urban sprawl.

Clearly, the dimensionality of complex structures points to a compelling redress to info glut and info sprawl. With their inherent advantages, one would expect to them to proliferate. Unfortunately, this has not been the case. The adoption of complex structures—particularly among the general public where they are most needed—has been painstakingly slow.

The reason for the limited adoption of complex structures is obvious: their inherent complexity. Despite these glaring foundational and structural problems, there has yet to be proposed a solution robust enough to create and manage complex structures, yet simple enough for mass market adoption.

Overview of System Methods
Analysis and Compression

Figure 2:
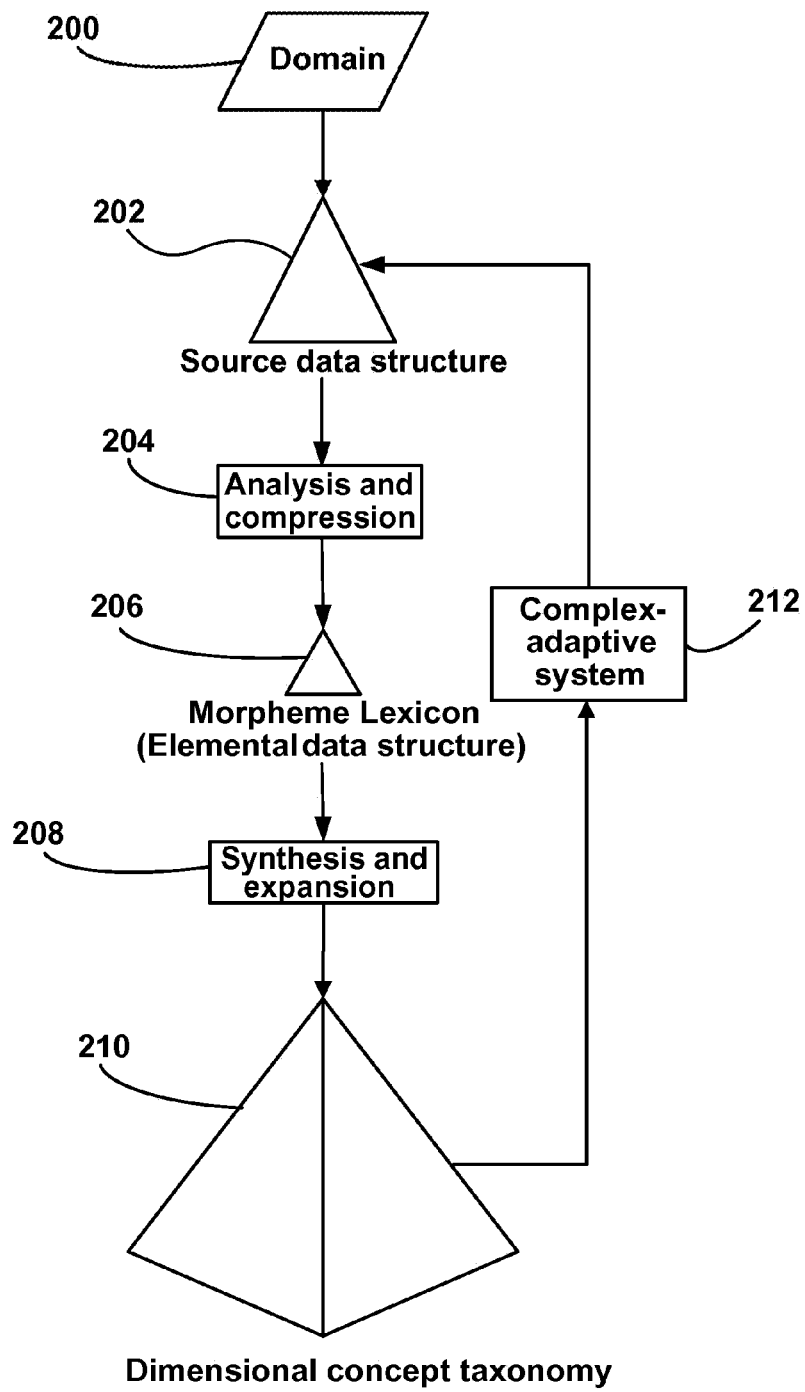
FIG. 2 illustrates an overview of operations showing data structure transformations to create a dimensional concept taxonomy for a domain.

FIG. 2 illustrates operations to construct a dimensional concept taxonomy 210 for a domain 200 comprising a corpus of information that is the subject matter of a classification. Domain 200 may be represented by a source data structure 202 comprised of a source structure schema and a set of source data entities derived from the domain 200 for inputting to a process of analysis and compression 204. The process of analysis and compression 204 may derive a morpheme lexicon 206 that is an elemental data structure comprised of a set of elemental constructs to provide a basis for the new faceted classification scheme.

The information in domain 200 may relate to virtual or physical objects, processes, and relationships between such information. As an example, the operations described herein may be directed to the classification of content accessible through Web pages. Alternate embodiments of domain 200 may include document repositories, recommendation systems for music, software code repositories, models of workflow and business processes, etc.

The elemental constructs within the morpheme lexicon 206 may be a minimum set of fundamental building blocks of information and information relationships which in the aggregate provide the information-carrying capacity with which to classify the source data structure 202.

Synthesis and Expansion

Morpheme lexicon 206 may be an input to a method of synthesis and expansion 208. The synthesis and expansion operations may transform the source data structure 202 into a third data structure, referred to herein as the dimensional concept taxonomy 210. The term "taxonomy" refers to a structure that organizes categories into a hierarchical tree and associates categories with relevant objects such as documents or other digital content. The dimensional concept taxonomy 210 may categorize source data entities from domain 200 in a complex dimensional structure derived from the source data structure 202. As such, source data entities (objects) may be related across many different organizing bases, allowing them to be found from many different perspectives.

Complex-Adaptive System

It is advantageous that classification systems and operations adapt to change in dynamic environments. In one embodiment, this requirement is met through a complex-adaptive system 212. Feedback loops may be established through user interactions with the dimensional concept taxonomy 210 back to the source data structure 202. The processes of transformation (204 and 208) may repeat and the resultant structures 206 and 210 may be refined over time.

In one embodiment, the complex-adaptive system 212 may manage the interactions of end-users that use the output structures (i.e. dimensional concept taxonomies 210) to harness the power of human cognition in the classification process.

The operations described herein seek to transform relatively simply source data structures to more complex dimensional structures in order that the source data objects may be organized and accessed in a variety of ways. Many types of information systems may be enhanced by extending the dimensionality and complexity of their underlying data structures. Just as higher resolution increases the quality of an image, higher dimensionality may increase the resolution and specificity of the data structures. This increased dimensionality may in turn enhance the utility of the data structures. The enhanced utility may be realized through improved and more flexible content discovery (e.g. through searching), improvements in information retrieval, and content aggregation.

Since the transformation may be accomplished through a complex system, the increase in dimensionality is not necessarily linear or predictable. The transformation may also be dependent in part on the amount of information contained in the source data structure.

To implement a system to a massive Internet scale, the key distinction is that the dimensional information structure optimally provides for the potential for an exponentially increasing set of nodes and connections, without incurring the prohibitive costs of actually building those connections until and unless they are needed.

Dimensional Knowledge Representation Model

Figure 3:
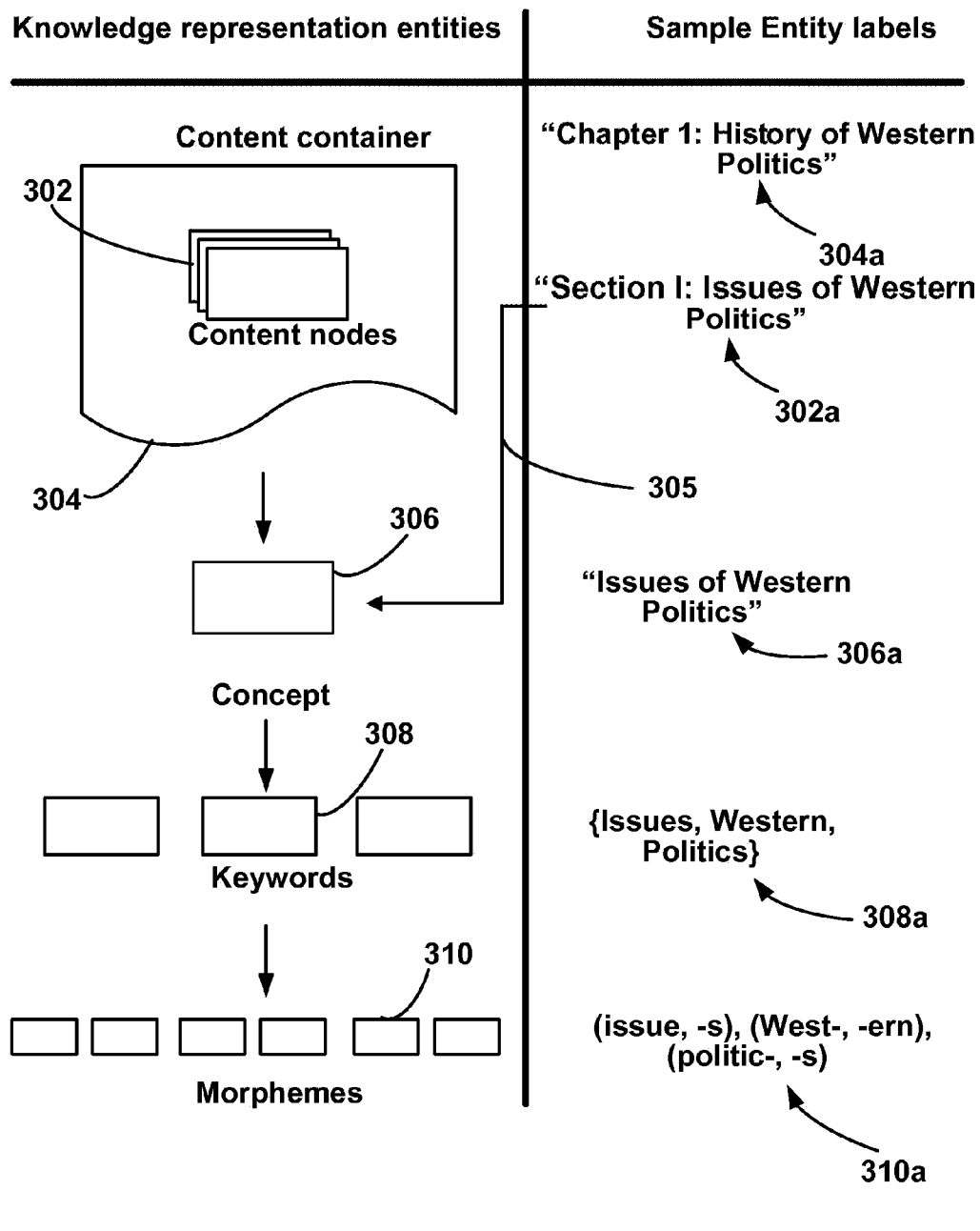
FIG. 3 illustrates a knowledge representation model useful for the operations of FIG. 2.

FIG. 3 illustrates an embodiment of a knowledge representation model including knowledge representation entities, relationships, and method of transformation that may be used in the operations of FIG. 2. Further specifics of the knowledge representation model and its methods of transformation are described in the descriptions that follow with reference to FIGS. 3, 18, 19, 32, 33 and 4.

The knowledge representation entities in one embodiment of the invention are a set of content nodes 302, a set of content containers 304, a set of concepts 306 (to simplify the illustration, only one concept is presented in FIG. 3), a set of keywords 308, and a set of morphemes 310.

The objects of the domain to be classified are known as content nodes 302. Content nodes may be comprised of any objects that are amenable to classification. For example, content nodes 302 may be a file, a document, a chunk of document (like an annotation), an image, or a stored string of characters. Content nodes 302 may reference physical objects or virtual objects.

Content nodes 302 may be contained in a set of content containers 304. The content containers 304 may provide addressable (or locatable) information through which content nodes 302 can be retrieved. For example, the content container 304 of a Web page, addressable through a URL, may contain many content nodes 302 in the form of text and images. Content containers 304 may contain one or more content nodes 302.

Concepts 306 may be associated with content nodes 302 to abstract some meaning (such as the description, purpose, usage, or intent of the content node 302). Individual content nodes 302 may be assigned many concepts 306; individual concepts 306 may be shared across many content nodes 302.

Concepts 306 may be defined in terms of compound levels of abstraction through their relationships to other entities and structurally in terms of other, more fundamental knowledge representation entities (e.g. keywords 308 and morphemes 310). Such a structure is known herein as a concept definition.

Morphemes 310 represent the minimal meaningful knowledge representation entities that present across the domains known by the system (i.e. that have been analyzed to construct the morpheme lexicon 206). A single morpheme 310 may be associated with many keywords 308; a single keyword 308 may be comprised of one or more morphemes 310.

Further, there is a distinction between the meaning of the term "morphemes" in the context of this specification and its traditional definition in the field of linguistics. In linguistics, morphemes are the "minimal meaningful units of a language". In the context of this specification, morphemes refer to the "minimal meaningful knowledge representation entities that present in any domain known by the system."

Keywords 308 comprise sets (or groups) of morphemes 310. A single keyword 308 may be associated with many concepts 306; a single concept 306 may be comprised of one or more keywords 308. Keywords 308 thus may represent an additional tier of data structure between concepts 306 and morphemes 310. They facilitate "atomic concepts" as the lowest level of knowledge representation that would be recognizable to users.

Since concepts 306 may be abstracted from the content nodes 302, a concept signature 305 may be used to identify concepts 306 within concept nodes 302. Concept signatures 305 are those features of a content node 302 that are representative of organizing themes that exist in the content.

In one embodiment of the present invention, as with the elemental constructs, content nodes 302 tend towards their most irreducible form. Content containers 304 may be reduced to as many content nodes 302 as is practical. When combined with the extremely fine mode of classification in the present invention, these elemental content nodes 302 may extend the options for content aggregation and filtering. Content nodes 302 may thus be reorganized and recombined along any dimension in the dimensional concept taxonomy.

A special category of content nodes 302, namely labels (often called "terms" in the art of classification) may be joined to each knowledge representation entity. As with content nodes 302, labels may be abstracted from the respective entities they describe in the knowledge representation model. Thus in FIG. 3, the following types of labels are identified: a content container label 304a to describe the content container 304; a content node label 302a to describe the content node 302; a concept label 306a to describe the concept 306; a set of keyword labels 308a to describe the set of keywords 308; and a set of morpheme labels 310a to describe the set of morphemes 310.

Figure 18:
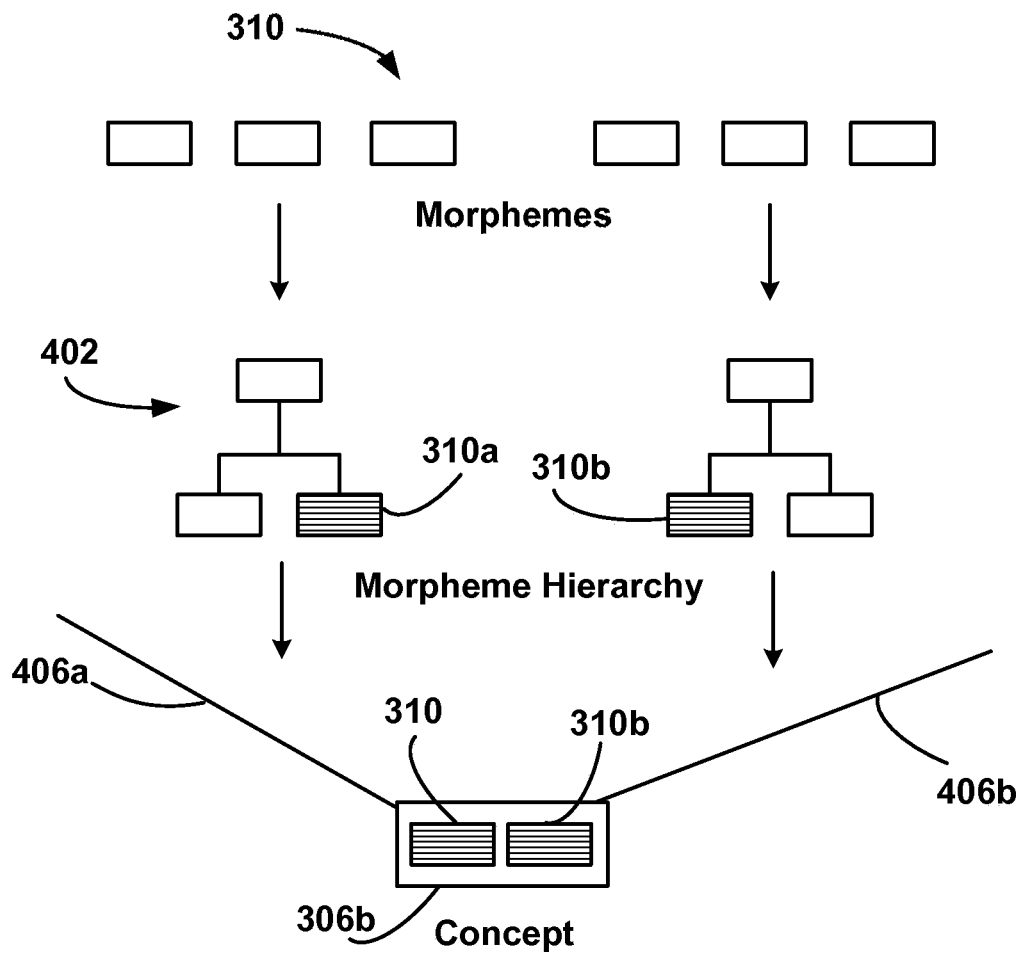
FIG. 18 illustrates the manner in which the operations generate dimensional concepts from elemental constructs.

In FIG. 18, a sample of morphemes 310 are presented. Morphemes 310 may be among the elemental constructs derived from the source data. The other set of elemental constructs may be comprised of a set of morpheme relationships. Just as morphemes represent the elemental building blocks of concept definitions and are derived from concepts, morpheme relationships represent the elemental building blocks of the relationships between concepts and are derived from such concept relationships. Morpheme relationships are discussed in greater detail below, illustrated in FIGS. 9-10.

Labels provide knowledge representation entities that are discernable to humans. In one embodiment, each label is derived from the unique vocabulary of the source domain. In other words, the labels assigned to each data element are drawn from the language and terms presented in the domain.

Figure 5:
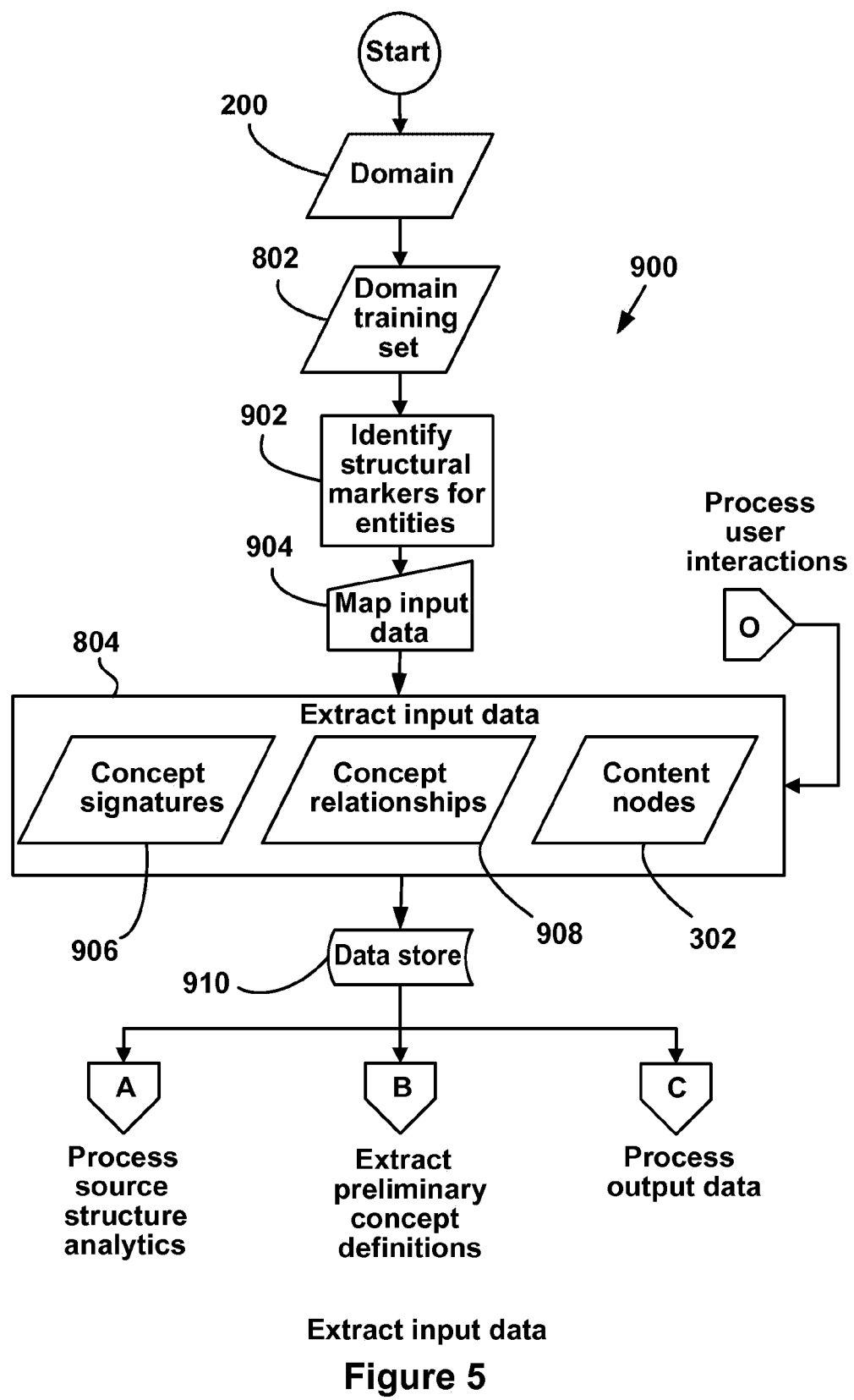
FIG. 5 illustrates a method of extracting input data.

Concept, keyword, and morpheme extraction are described below and illustrated in FIGS. 7-8. Concept signatures and content node and label extraction are discussed in greater detail below with reference to input data extraction (FIG. 5).

One embodiment of the invention uses a multi-tier knowledge representation model across both the entities and their relationships. This differentiates it from the two-tier model of concepts-atomic concepts and their flat (single-tier) relational structures in traditional faceted classification, as illustrated in FIG. 1 (Prior Art).

Though certain aspects of the operations and system are described with reference to one knowledge representation model, those of ordinary skill in the art will appreciate that other models may be used, adapting the operations and system accordingly. For example, concepts may be combined together to create higher-order knowledge representation entities (such as "meme", as a collection of concepts to comprise an idea). The structure of the representation model may also be contracted. For example, the keyword abstraction layer may be removed such that concepts are defined only in relation to morphemes 310.

Overview of System Transformation Methods

Figure 4:
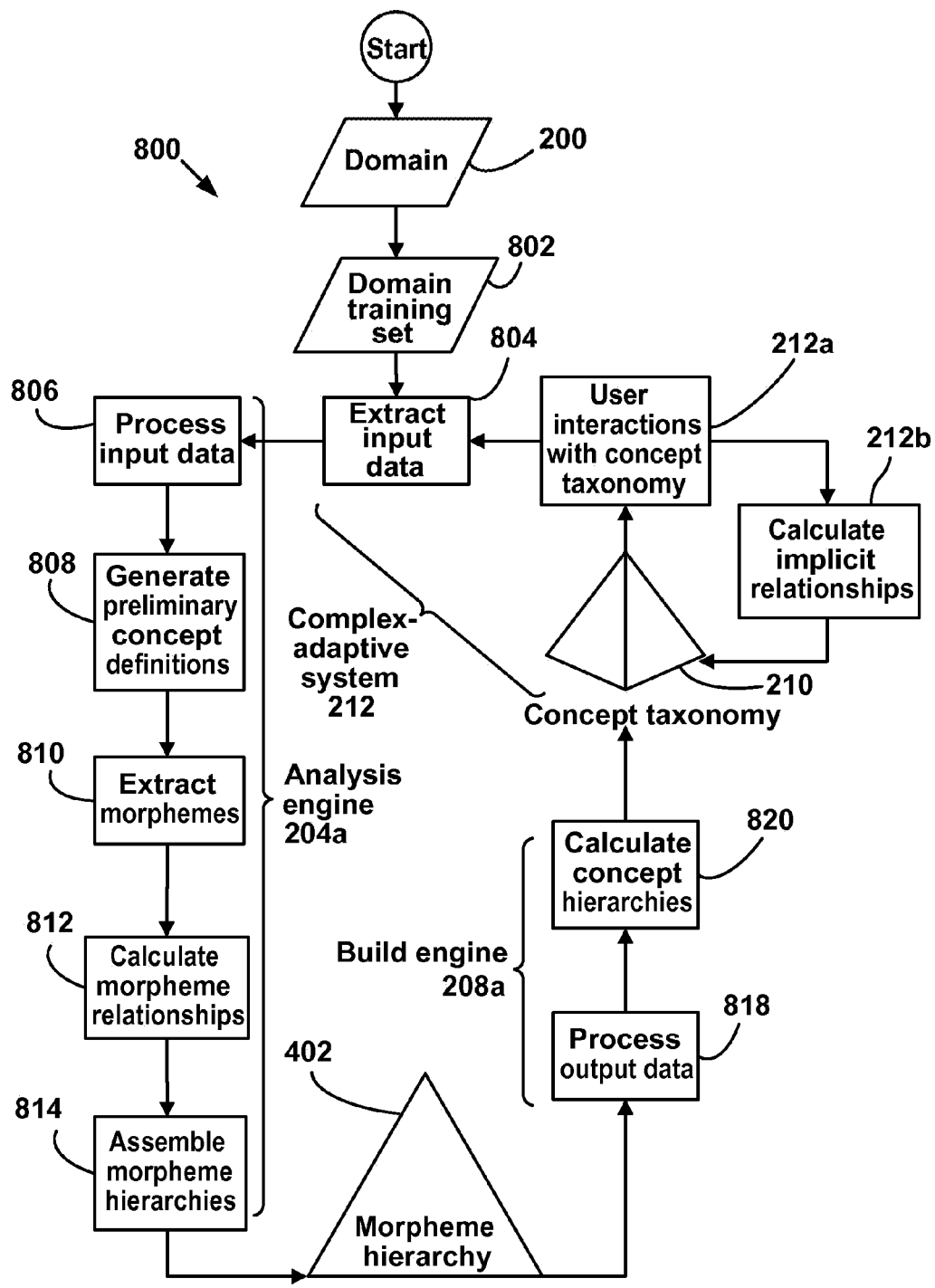
FIG. 4 illustrates in further detail an overview of the operations of FIG. 2.

FIG. 4 illustrates a broad overview of one embodiment of the transformation operations 800 introduced in FIG. 2.

Input Data Extraction

Operations 800 may begin with the manual identification by domain owners of the domain 200 to be classified. The source data structure 202 may be defined from a domain training set 802. The training set 802 may be a representative subset of the larger domain 200 and may be used as a surrogate. That is, the training set may comprise a source data structure 202 for the whole domain 200 or a representative part thereof. Training sets are well known in the art.

A set of input data may be extracted 804 from the domain training set 802. The input data may be analyzed to discover and extract the elemental constructs. (This process is discussed in greater detail below, illustrated in FIG. 5.)

Domain Facet Analysis and Data Compression

Figure 33:
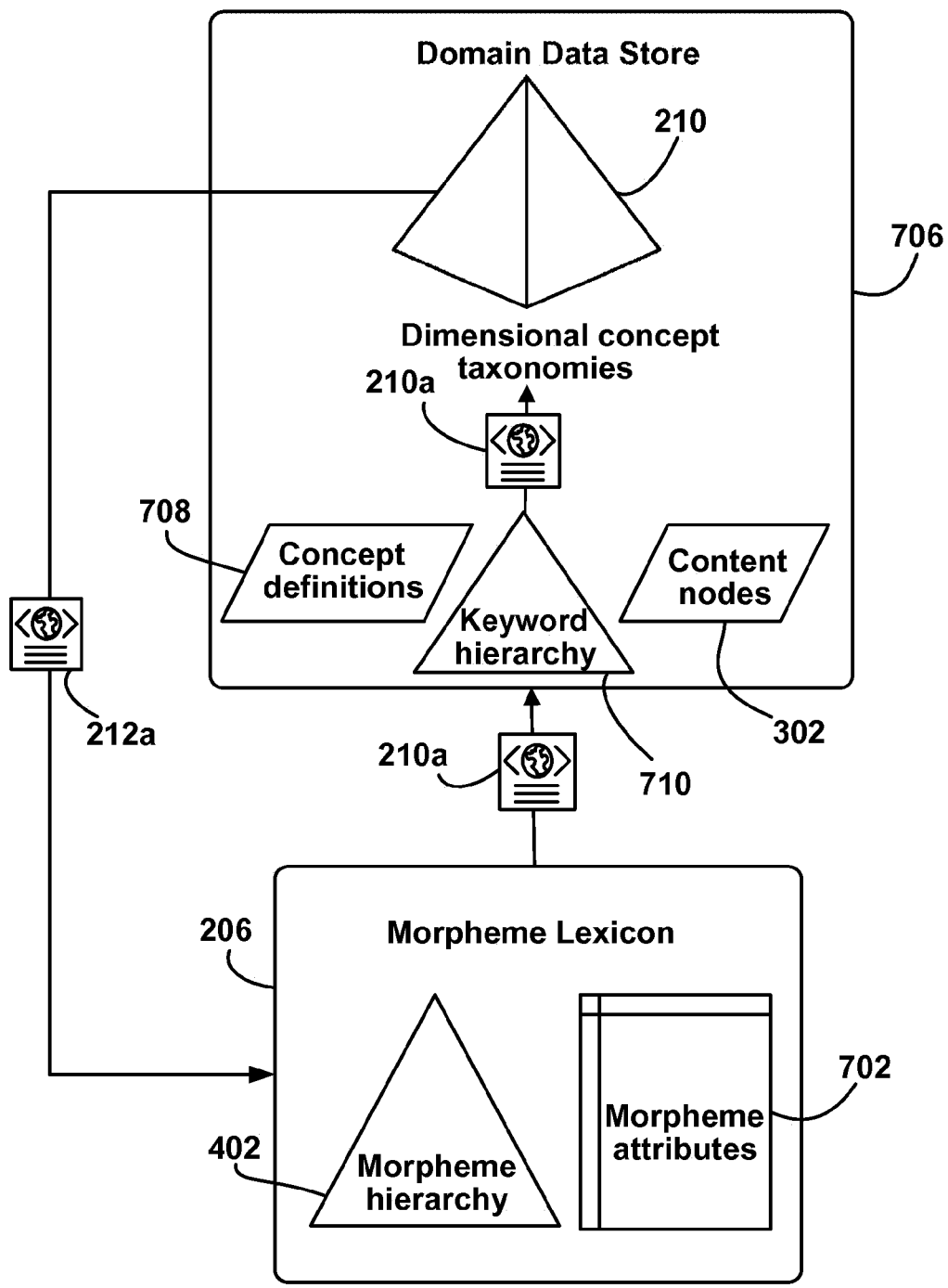
FIG. 33 illustrates faceted data structures used in one embodiment, and the multi-tier architecture that supports these structures.

In the present embodiment, the analysis engine 204a introduced above and described in FIG. 33 may be bounded by the methods 806 to 814, as indicated by the bracket in FIG. 4. The input data may be analyzed and processed 806 to provide a set of source structure analytics. The source structure analytics may provide information about the structural characteristics of the source data structure 202. This process is discussed in greater detail below, illustrated in FIG. 6.

A set of preliminary concept definitions may be generated 808. (This process is discussed in greater detail below, illustrated in FIG. 7.) The preliminary concept definitions may be represented structurally as sets of keywords 308.

Morphemes 310 may be extracted 810 from the keywords 308 in the preliminary concept definitions, thus extending the structure of the concept definitions to another level of abstraction. (This process is discussed in greater detail below, illustrated in FIG. 8.)

To begin the process of constructing the morpheme hierarchy 402, a set of potential morpheme relationships may be calculated 812. The potential morpheme relationships may be derived from an analysis of the concept relationships in the input data. Morpheme structure analytics may be applied to the potential morpheme relationships to identify those that will be used to create the morpheme hierarchy.

The morpheme relationships selected for inclusion in the morpheme hierarchy may be assembled 814 to form the morpheme hierarchy 402. (This process is discussed in greater detail below, illustrated in FIGS. 9-15.)

Dimensional Structure Synthesis and Data Expansion

Figure 32:
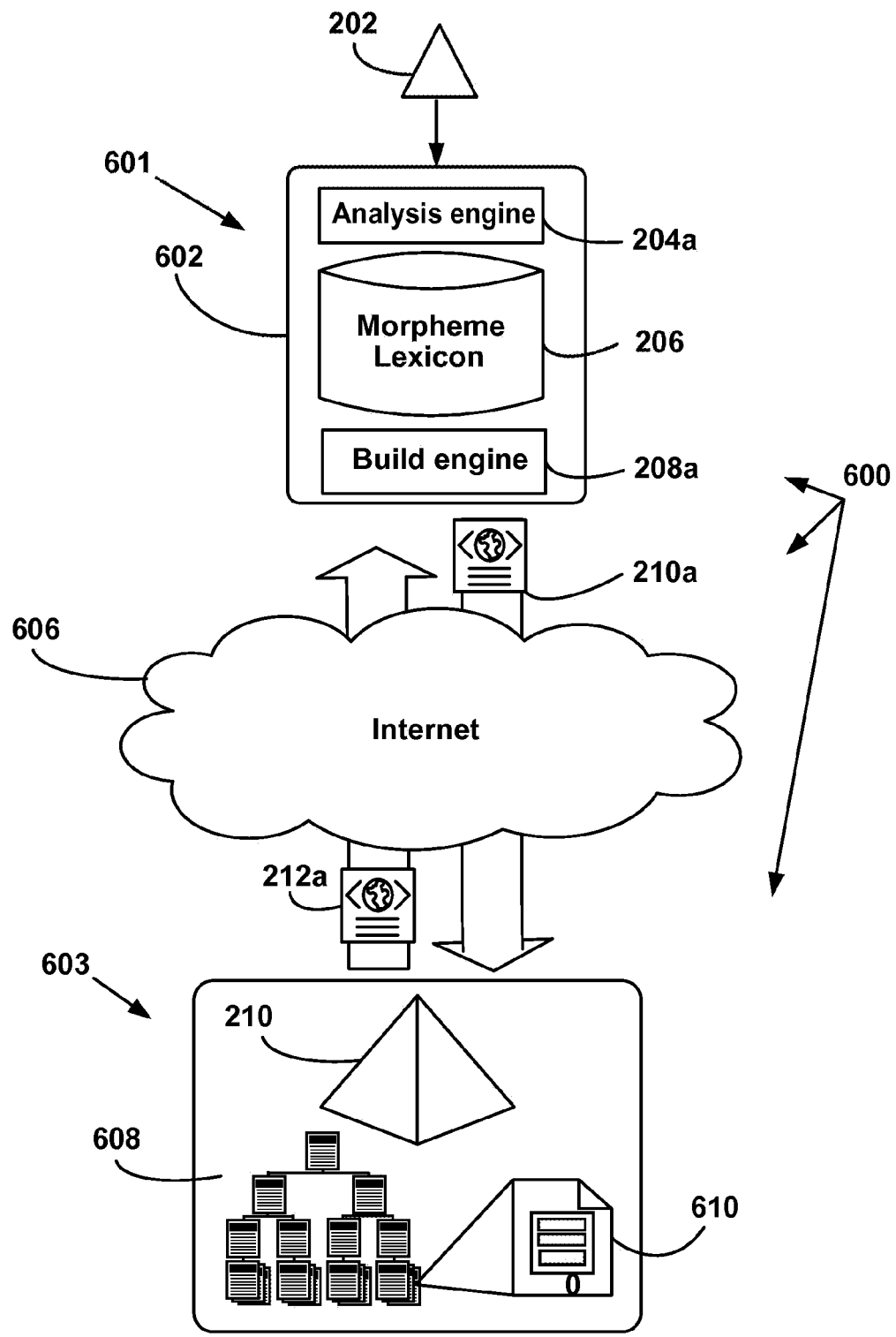
FIG. 32 illustrates a system overview in accordance with one embodiment to execute the operations of data structure transformation.

In the present embodiment, build engine 208*a* introduced above and described in FIG. 32 may be bounded by the methods 818 to 820, as indicated by the bracket in FIG. 4. The enhanced method of faceted classification may be used to synthesize the complex dimensional structure 210*a* and the dimensional concept taxonomy 210. (This process is discussed in greater detail below, illustrated in FIGS. 20-22.)

Output data 210*a* for the new dimensional structure may be prepared 818. The output data is the structural representation of the classification scheme for the domain. It may be used as faceted data to create the dimensional concept taxonomy 210. As described above, the output data may comprise the concept definitions 708 that are associated with the content nodes 302 and the keyword hierarchy 710. Specifically, the faceted data may be comprised of the keywords 308 in the concept definitions and the structure of the keyword hierarchy 710 where the keywords 308 are defined in terms of the morphemes 310 of the morpheme lexicon 206. (This process is discussed in greater detail below, illustrated in FIG. 17.)

A set of dimensional concept relationships (that in the aggregate form polyhierarchies) may be constructed 820. The dimensional concept relationships represent the concept relationships in the dimensional concept taxonomy 210. The dimensional concept relationships may be calculated based on the organizing principles of the enhanced method of faceted classification. The dimensional concept relationships may be merged and, within the categorization of concepts 306 (as encoded in concept definitions), may form the dimensional concept taxonomy 210. (This process is discussed in greater detail below, illustrated in FIGS. 20-22.)

Various modes of synthesis operation are possible for the enhanced method of faceted classification. In one embodiment, a system of "scope-limited" faceted classification synthesis operations is disclosed in which concept relationships are synthesized from domains that have not been fully or at all processed by the analysis engine methods. In another embodiment, a system of "dynamic" faceted classification synthesis is disclosed in which dimensional concept hierarchies are processed in near real-time, based directly on synthesis parameters provided for the end-users of the information. (Modes of synthesis operations are discussed in greater detail below.)

Complex-Adaptive System and User Interactions

In the present embodiment, the operations of the complex-adaptive system 212 introduced above and described in FIG. 2 may be bounded by the methods 212*a*, 212*b*, and 804, in association with the concept taxonomy 210, as indicated by the bracket in FIG. 4.

As discussed, the dimensional concept taxonomy 210 may be expressed to users through the presentation layer 608. In one embodiment, the presentation layer 608 is a web site. (The presentation layer is discussed in greater detail below, illustrated in FIGS. 23-27 and 34-36.) Via the presentation layer 608, the content nodes 302 in the domain 200 may be presented as categorized within the concept definitions that are associated with each content node 302.

This presentation layer 608 may provide the environment for collecting a set of user interactions 212*a* as dimensional concept taxonomy information. The user interactions 212*a* may be comprised of various ways in which end-users and domain owners may interact with the dimensional concept taxonomy 210. The user interactions 212*a* may be coupled to the analysis engine via a feedback loop through step 804 to extract input data to enable the complex-adaptive system. (This process is discussed in greater detail below, illustrated in FIG. 27.)

In one embodiment, the user interactions 212*a* returned in the explicit feedback loop may be queued for processing as resources become available. Accordingly, an implicit feedback loop may be provided. The implicit feedback loop may be based on a subset of the organizing principles of the enhanced method of faceted classification to calculate implicit concept relationships 212*b*. Through the implicit feedback loop, the user interactions 212*a* with the dimensional concept taxonomy 210 may be processed in near real-time.

Through the complex-adaptive system 212, the classification scheme that derives the dimensional concept taxonomy 210 may be continually honed and expanded.

Methods of Facet Analysis

Extract Input Data

FIG. 5 illustrates operations 900 that may comprise operations to extract the input data 804 and certain preliminary steps thereto as discussed briefly with reference to FIG. 4, in one particular aspect of the present invention.

Identify Structural Markers

Structural markers may be identified 902 within the training set 802 to indicate where input data may be extracted from the training set. The structural markers may comprise a source structure schema. The structural markers may present in content containers 304 and may include, but are not limited to, the title of the document, descriptive meta tags associated with content, hyperlinks, relationships between tables in a database, or the prevalence of keywords 308 that exist in content containers. The markers may be identified by domain owners or others.

Operations 900 may be configured with default structural markers that apply across domains. For example, the URLs of Web pages may be a common structural marker for content nodes 302. As such, the operations 902 may be configured with a multitude of default structural patterns that would apply in the absence of any explicit references in those areas in the source structure schema.

The structural markers may be located in the input data explicitly, or may be located as surrogates for the input data. For example, relationships between content nodes 302 may be used as the surrogate structural marker for concept relationships.

In one embodiment, the structural markers may be combined to generate logical inferences about the source structure schema. If concept relationships are not explicit in the source structure schema, they may be inferred from structural markers such as concept signatures associated with content nodes 302, and a set of content node relationships. For example, a concept signature may be a title in a document mapped as a surrogate for a concept to be defined as described further. Content node relationships may be derived from the structural linkages between content nodes 302, such as the hyperlinks that connect Web pages.

The connection of concept signatures to content nodes 302, and the connection of content nodes 302 to other content nodes 302, may infer concept relationships among the intersecting concepts. These relationships may form additional (explicit) input data.

There are many different ways to identify structural markers as known to those of ordinary skill in the art.

Map Source Structure Schema to System Input Schema

The source structure schema may be mapped to an input schema 904. In one embodiment, the input schema may be comprised of a set of concept signatures 906, a set of concept relationships 908, and a set of concept nodes 302.

This schema design is representative of the transformation processes and is not intended to be limiting. The input operations do not require source input data across every data element in the system input schema, so as to accommodate very simple structures.

The system input schema may also be extended to map to every element in a system data transformation schema. The system data transformation schema may correspond to every data entity that presents in the transformation processes. That is, the system input schema may be extended to map to every data entity in the system. In other words, the source structure schema may be comprised of a subset of the system input schema.

In addition, domain owners may map source data schema from very complex structures. As an example, the tables and attributes of a relational database may be modeled as facet hierarchies at various levels of abstraction and mapped to the multi-tier structure of the system data transformation schema.

Again, operations of the analysis engine 204a and build engine 208a provide a data structure transformation engine, and significant new utility may be achieved in transforming one type of complex data structure (such as those modeled in relational databases) to another type of complex data structure (the complex dimensional structures produced through the methods and systems described herein). Product catalogs provide an example of complex data structures that benefit from this type of complex-to-complex data structure transformation. More information on an example data transformation schema is provided below, illustrated in FIG. 30.

Extract Input Data

An input data map may be applied against the training set to map its source structure schema to the input schema, extracting the input data 804. One embodiment of the invention uses XSLT to encode the data map, which is used to extract the data from source XML files, as is known in the art.

The extraction methodology varies with many factors, including the parameters of the source structure schema and the location of the structural markers. For example, if the concept signature is precise—as with a document title, a keyword-based meta-tag, or a database key field—then the signature may be used directly to represent the concept label. For more complex signatures—such as the prevalence of keywords in the document itself—common text mining methodologies may be used. A simple methodology bases keyword extraction on a simple count of the most prevalent keywords in the documents. There are many other extraction methodologies within the broad fields of information extraction and text mining as known to those of ordinary skill in the art.

Once extracted, the input data may be stored in one or more storage means coupled to the analysis engine 204a. For convenience, the figures and descriptions contained herein reference a data store 910 as the storage means but other stores may be used. For example, a domain data store 706 may be used particularly if the computing environment is a hosted environment.

The system input data may be split into their constituent sets and passed to subsequent processes in the transformation engine:

Concept relationships are the inputs for the source structure analytics A, described below and illustrated in FIG. 6.

Concept signatures may be processed to extract preliminary concept definitions B, described below and illustrated in FIG. 7.

Content nodes may be processed as system output data C, described below and illustrated in FIG. 17.

The extraction of input data from source data structures, as described above, is one of many embodiments that may be employed for extracting input data. The other primary input channel to the analysis engine 204a is the feedback loops that comprise the complex-adaptive system in one embodiment. As such, user interactions 212a are returned O to provide further input data. The details of this channel of input data and the feedback loops that comprise the complex-adaptive system are described below, illustrated in FIG. 27.

Process Source Data Structure

Figure 6:
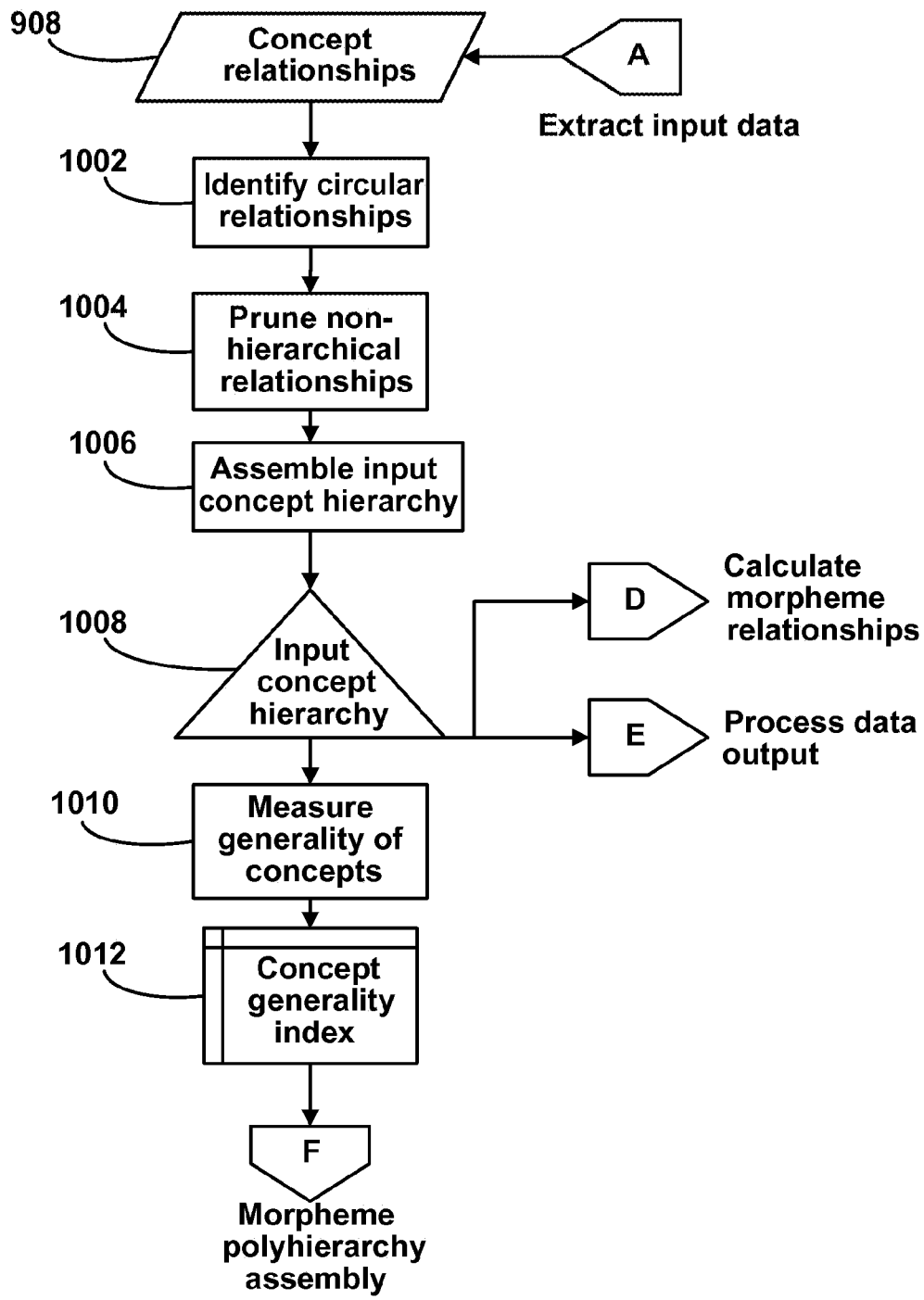
FIG. 6 illustrates a method of source structure analytics.

FIG. 6 illustrates in one particular aspect of the present invention the processing of the source data structure to extract source structure analytics. The source structure analytics may provide data relating to a topology of the source data structure. The topology of the source data refers to a set of technical characteristics of the source data structure that describe its shape (characteristics such as the number of nodes contained in the structure, and the dispersal patterns of the relationships between nodes in the source data structure).

A primary objective of this analytical method is to measure the degree to which concepts 306 are general or specific (in relation to other concepts 306 in the training set 802). Herein, the measure of the relative generality or specificity of the concepts is referred to as the "generality". The source data characteristics analyzed in one embodiment are described below. Specifics on the analytics and the characteristics will vary with the source data structures.

Concept relationships 908 may be assembled for analysis. Circular relationships 1002 among the concepts 306 may be identified (indicating the presence of non-hierarchical relationships) and resolved.

All concept relationships that are identified by the system as non-hierarchical may be pruned from the set 1004. The pruned concept relationships are not involved in the subsequent processing, but may be made available for processing based on different transformation rules.

The concept relationships that were not pruned may be processed as hierarchical relationships. The system may assemble these concept relationships 1006 into an input concept hierarchy 1008 of all hierarchical concept relationships ordered into extended sets of indirect relationships. Assembling the input concept hierarchy 1008 may involve ordering the nodes in the aggregate and removing any redundant relationships that may be inferred from other sets of relationships. The input concept hierarchy 1008 may comprise a polyhierarchy structure where entities may have more than one direct parent.

Once assembled, the input concept hierarchy 1008 may comprise the structure for measuring the generality of the concepts 306 in the concept relationship set, as described in the steps below and may be useful for other methods in the transformation process. The concept relationships in the input concept hierarchy 1008 may be used to calculate potential morpheme relationships D, as described below and illustrated in FIGS. 9-10. The concept relationships in the input concept hierarchy may also be used to process the output data for the system E, as described below and illustrated in FIG. 17.

The analysis of the input concept hierarchy may proceed to the measure of the generality of each concept 1010. Again, generality refers to how general or specific any given node is relative to the other nodes in the hierarchy 1008. Each concept 306 may be assessed a generality measurement based on its location in the input concept hierarchy 1008.

Calculations may be made of a weighted average degree of separation for each concept 308 from each root in the tree that intersects with the concept 306. The weighted average degree of separation refers to the distance of each concept 306 from the concepts 306 at the root nodes. Concepts 306 that are unambiguously root nodes are assigned a generality measure of one. The generality measurement increases for more specific concepts 306, reflecting their increased degree of separation from the most general concepts 306 that reside at the root nodes. Those skilled in the art will appreciate that many other measures of generality are possible.

The generality measurements for each concept 306 may be stored in a concept generality index 1012 (e.g. in data store 910). The concept generality index 1012 may be used to infer a set of generality measurements for the morphemes F, as described below and illustrated in FIGS. 12-13.

The methods described in one embodiment may apply to hierarchical-type relationships, also known as parent-child relationships. Parent-child relationships encompass a great deal of diversity in the types of relationships they can support. Examples include: whole-part, genus-species, type-instance, and class-subclass. In other words, by supporting hierarchical type relationships, the present invention applies to a huge expanse of classification tasks.

Process Preliminary Concept Definitions

Figure 7:
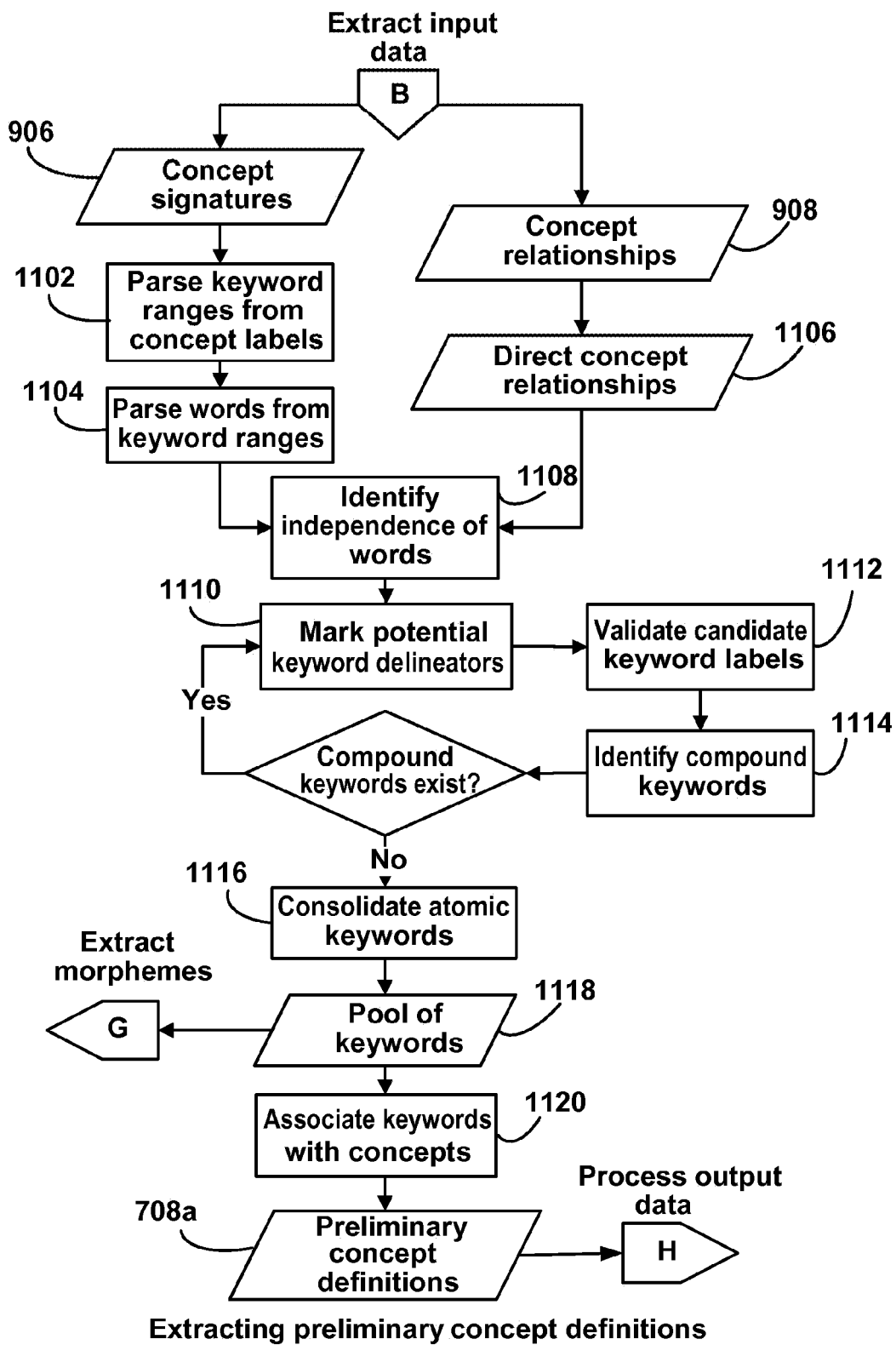
FIG. 7 illustrates a process of extracting preliminary concept-keyword definitions.

FIG. 7 illustrates a method of keyword extraction to generate the preliminary concept definitions. A primary objective of this process is to generate a structural definition for the concepts 306 in terms of keywords 308. At this stage in one embodiment, the concept definitions may be described as "preliminary" because they will be subject to revision in later stages.

Those of ordinary skill in the art will appreciate that there are many methods and technologies that may be directed to the goal of extracting keywords 308 as structural representations of concepts 306.

In one embodiment, the level of abstraction applied to keyword extraction may be limited. These limits may be designed to derive keywords with the following qualities: Keywords are defined using (extracted based on) atomic concepts (where concepts present in other areas of the training set) and in response to the independence of words within direct relationship sets.

Concept signatures 906 and concept relationships 908 may be gathered for analysis. In one embodiment, this process is based on the extraction of textual entities. As such, in the description that follows, the concept signatures 906 may be assumed to map directly to the concept labels that are assigned to concepts 306.

As labels are identified in the concept signatures 906, a relevant portion of the text string may be extracted and used as the concept label 306a. In subsequent methods, as keywords 308 and morphemes 310 are identified in concepts 306, labels for keywords 308a and morphemes 310a may be extracted from the relevant portions of the concept label 306a.

These domain-specific labels may eventually be written to the output data. If the operations 800 are transforming a data structure that has been previously analyzed and classified, the entity labels may be available directly in the source data structure.

Note that this juncture between concept signature and concept label extraction represents an integration point for a wide variety of entity extraction tools, directed at many types of content nodes 302, such as images, multimedia, and the classification of physical objects.

A series of keyword delineators may be identified in the concept labels. Preliminary keyword ranges 1102 may be parsed from the concept labels 306a based on common structural delineators of keywords 308 (such as parentheses, quotes, and commas). Whole words may then be parsed from the preliminary keyword ranges 1104, again using common word delineators (such as spaces and grammatical symbols). These pattern-based approaches to textual entity parsing are well known in the art.

The parsed words from the preliminary keyword ranges 1102 may comprise one set of inputs for the next stage in the keyword extraction process. The other set of inputs may be a direct concept relationship set 1106. The direct concept relationship set 1106 may be derived from the set of concept relationships 908. The direct concept relationship set 1106 may be comprised of all direct relationships (all direct parents and all direct children) for each concept 306.

These inputs are used to examine the independence of words in the preliminary keyword ranges 1108. Single word independence within direct relationship sets 1106 may comprise delineators for keywords 308. After the keyword ranges have been delineated, checks may be performed to ensure that all portions of the derived keywords 308 are valid. Specifically, all sections of the concept label 306a that are delineated as keywords 308 optimally pass the word independence test.

In one embodiment, the check for word independence may be based on a method of word stem (or word root) matching, hereafter referred to as "stemming". There are many methods of stemming, well known in the art. As described in the methods of morpheme extraction below, illustrated in FIG. 8, stemming provides an extremely fine basis for classification.

Based on the independence of words in the preliminary keyword ranges, an additional set of potential keyword delineators 1110 may be identified. In simplified terms, if a word presents in one concept label 306a with other words, and in a related concept label 306a absent those same words, than that word may delineate a keyword.

However, before the concept labels 306a are parsed to keyword labels 308a on the basis of these keyword delineators, the candidate keyword labels may be validated 1112. All candidate keyword labels are generally required to pass the word independence test described above. This check prevents the keyword extraction process from fragmenting concepts 306 beyond the target level of abstraction, namely atomic concepts.

Once a preliminary set of keyword labels is generated, the system may examine all preliminary keyword labels in the aggregate. The intent here is to identify compound keywords 1114. Compound keywords may present as more than one valid keyword label within a single concept label 306a. This test may be based directly on the objective of atomic concepts as the scope of the concept-keyword abstraction.

In one embodiment, recursion may be used to exhaustively split the set of compound keywords into the most elemental set of keywords 308 that is supported by the training set 802.

If compound keywords remain in the evolving set of keyword labels, an additional set of potential keyword delineators 1110 may be generated, where the matching keywords are used to locate the delineators. Again, the delineated keyword ranges may be checked as valid keywords, keywords are extracted, and the process repeats until no more compound keywords can be found.

A final method round of consolidation may be used to disambiguate keyword labels across the entire domain. Disambiguation is a well known requirement in the art, and there are many approaches to it. In general, disambiguation is used to resolve ambiguities that emerge when entities share the same labels.

In one embodiment, a method of disambiguation may be provided by consolidating keywords into single structural entities that share the same label. Specifically, if keywords share labels and intersecting direct concept relationship sets, then there may be a basis for consolidating the keyword labels, associating them with a single keyword entity.

Alternatively, this method of disambiguation may be relaxed. Specifically, by removing the criterion of intersecting direct concept relationship sets, all shared keyword labels in the domain may consolidate to the same keyword entities. This is a useful approach when the domain is relatively small or quite focused in its subject matter. Alternatively, the concept relationship sets used in this method of disambiguation may be varied by broader lineages of direct and indirect concept relationships. Many methods of disambiguation are known in the art.

A result of this method of keyword extraction may be a set of keywords 1118, abstracted to the level of "atomic concepts". The keywords are associated 1120 with the concepts 306 from which they were derived, as the preliminary concept definitions 708a. These preliminary concept definitions 708a may later be extended to include morpheme entities in their structure, a deeper and more fundamental level of abstraction. These preliminary concept definitions may be further extended to capitalize on implicit attributes of keywords and morphemes indicated by concept relationships in the input data, as described below.

The entities 708a derived from this process may be passed to subsequent processes in the transformation engine described in this disclosure. Preliminary concept definitions 708a are the inputs to the morpheme extraction process G, described below and illustrated in FIG. 8 and output data process H, described below and illustrated in FIG. 17.

Extract Morphemes

In traditional faceted classification, the attributes for facets may generally be limited to concepts that can be identified and associated with other concepts using human cognition. As a result, the attributes may be thought of as atomic concepts, in that the attributes constitute concepts, absent any deeper context.

The methods described herein may use statistical tools across large data sets to identify elemental (morphemic), irreducible attributes of concepts and their relationships. At this level of abstraction, many of the attributes would not be recognizable to human classificationists as concepts.

Figure 8:
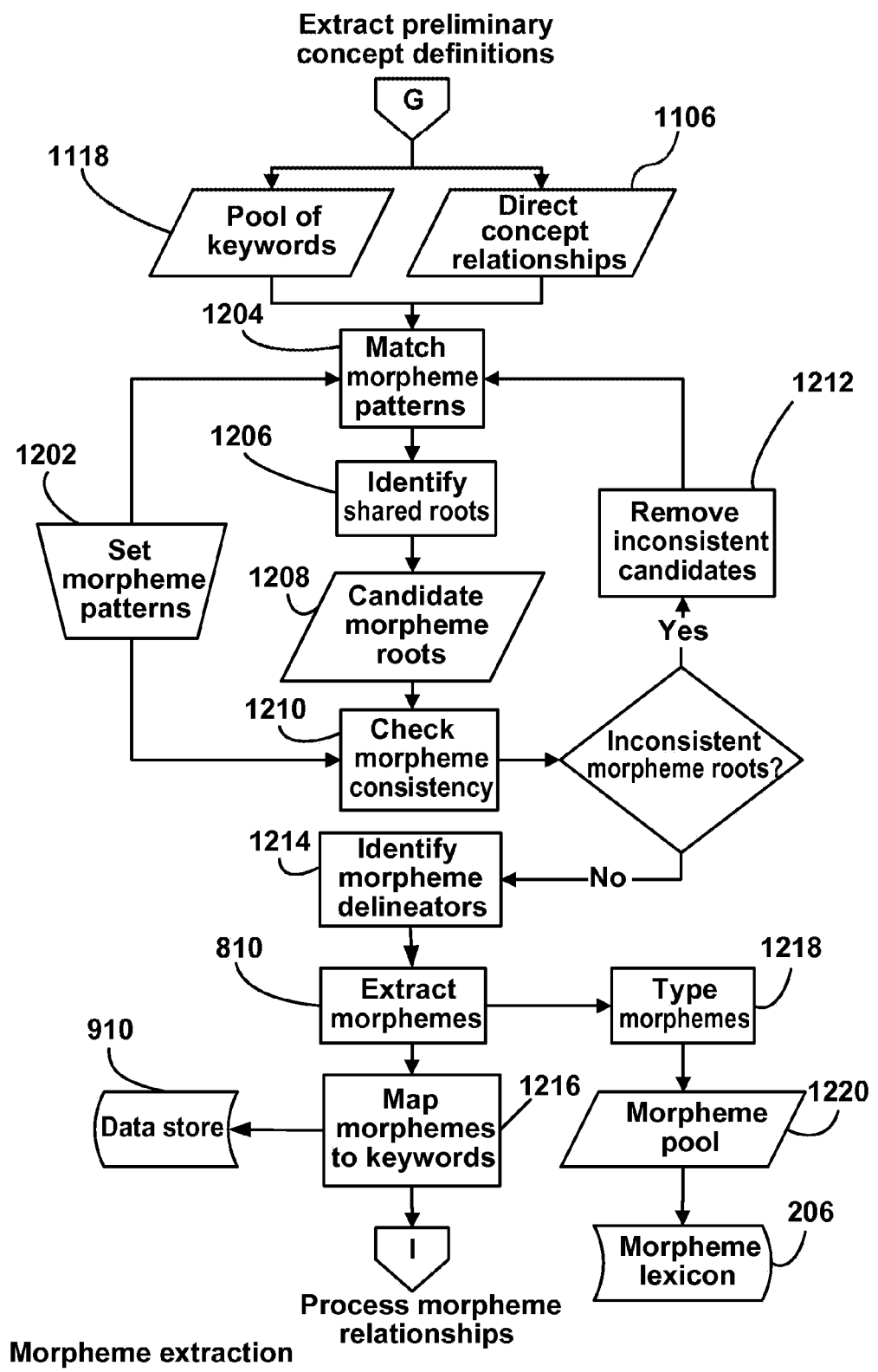
FIG. 8 illustrates a method of extracting morphemes.

FIG. 8 illustrates the method by which morphemes 310 may be parsed and associated with keywords 308 to extend the preliminary concept definitions 708a. The method of morpheme extraction may continue from the method of generating the preliminary concept definitions, described above and illustrated in FIG. 7.

Note that in one embodiment, the methods of morpheme extraction may have elements in common with the methods of keyword extraction. Herein, a more cursory treatment is afforded this description of morpheme extraction where these methods overlap.

The pool of keywords 1118 and the sets of direct concept relationships 1106 may be the inputs to this method.

Patterns may be defined to use as criteria for identifying morpheme candidates 1202. These patterns may establish the parameters for stemming, and may include patterns for whole word as well as partial word matching, as is well known in the art.

As with keyword extraction, the sets of direct concept relationships 1106 may provide the context for pattern-matching. The patterns may be applied 1204 against the pool of keywords 1118 within the sets of direct concept relationships in which the keywords occur. A set of shared roots based on stemming patterns may be identified 1206. The set of shared roots may comprise the set of candidate morpheme roots 1208 for each keyword.

The candidate morpheme roots for each keyword may be compared to ensure that they are mutually consistent 1210. Roots residing within the context of the same keyword and the direct concept relationship sets in which the keyword occurs may be assumed to have overlapping roots. Further, it is assumed that the elemental roots derived from the intersection of those overlapping roots will remain within the parameters used to identify valid morphemes.

This validation check may provide a method for correcting errors that present when applying pattern-matching to identify potential morphemes (a common problem with stemming methods). More importantly, the validation may constrain excessive morpheme splitting and may provide a contextually meaningful yet fundamental level of abstraction.

The series of constraints on morpheme and keyword extraction designed in one embodiment may also provide a negative feedback mechanism within the context of the complex-adaptive system. Specifically, these constraints may work to counteract complexity and manage it within set parameters for classification.

Through this morpheme validation process, any inconsistent candidate morpheme roots may be removed from the keyword sets 1212. The process of pattern matching to identify morpheme candidates may be repeated until all inconsistent candidates are removed.

The set of consistent morpheme candidates may be used to derive the morphemes associated with the keywords. As with the keyword extraction methods, delineators may be used to extract morphemes 1214. By examining the group of potential roots, one or more morpheme delineators may be identified for each keyword.

Morphemes may be extracted 810 based on the location of the delineators within each keyword label. More significant is the process of deriving one or more morpheme entities to provide a structural definition to the keywords. The keyword definitions may be constructed by relating (or mapping) the morphemes to the keywords from which they were derived 1216. These keyword definitions may be stored in the domain data store 706.

The extracted morphemes may be categorized based on the type of morpheme (as for example, free, bound, inflectional, or derivational) 1218. In later stages of the construction process, the rules for building concepts may vary based on the type of morphemes involved and whether these morphemes are bound to other morphemes.

Once typed, the extracted morphemes may comprise the pool of all morphemes in the domain 1220. These entities may be stored in the system's morpheme lexicon 206.

A permanent inventory of each morpheme label may be maintained to be used to inform future rounds of morpheme parsing. (For more information, see the overview of the data structure transformations above, illustrated in FIG. 33.)

The morphemes derived from this process may be passed to subsequent processes in the transformation engine to process morpheme relationships I, as described below and illustrated in FIGS. 9-10.

Those of ordinary skill in the art will appreciate that there are many algorithms that may be used to discover and extract keyword definitions comprised of morphemes.

Calculate Morpheme Relationships

Morphemes may provide one set of elemental constructs that anchor the system's multi-tier faceted data structures. The other elemental construct may be morpheme relationships. As discussed above and illustrated in FIGS. 3, 18-19, morpheme relationships provide a powerful basis for creating dimensional concept relationships.

However, the challenge is in identifying truly morphemic morpheme relationships in the noise of ambiguity that exists in classification data. The multi-tier structure of the present invention provides one address to this challenge. By validating relationships across multiple levels of abstraction, ambiguity is successively pared away.

The sections that follow address discovering morpheme relationships. Specifically, in this particular aspect of the present invention, methods of pattern augmentation are used to strip away noise to enhance the statistical identification of the elemental constructs.

Overview of Potential Morpheme Relationships

Figure 9:
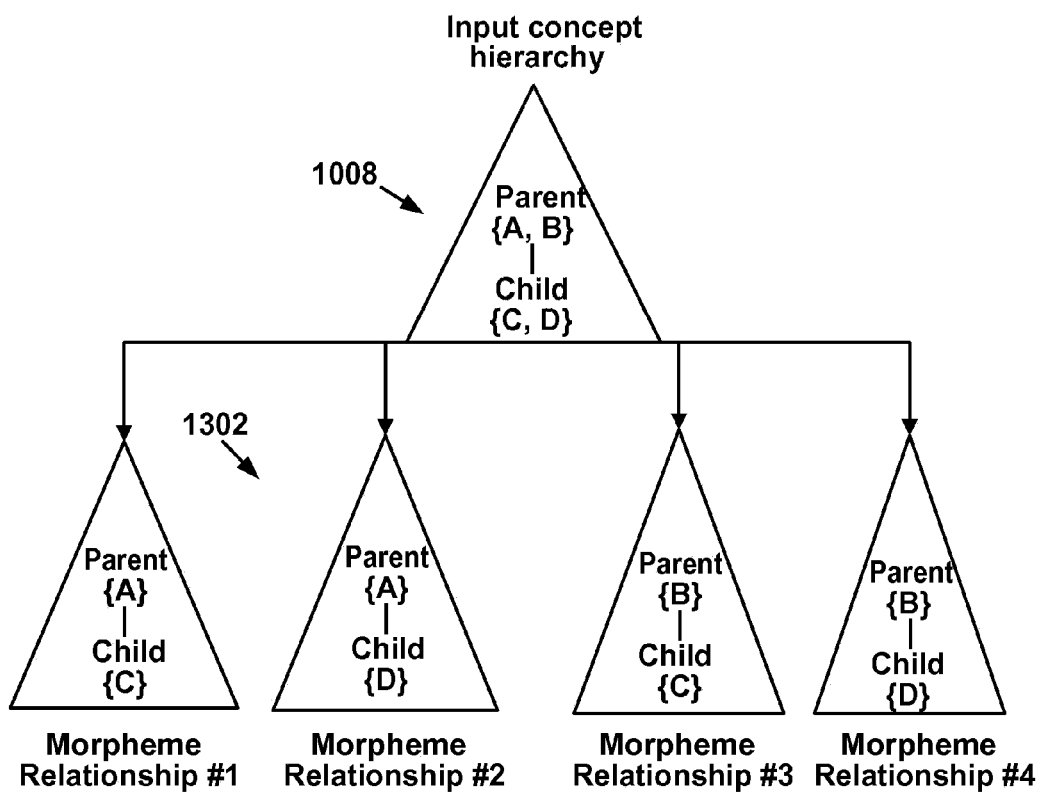
FIGS. 9-10 illustrate a process of calculating potential morpheme relationships from concept relationships.
Figure 9:
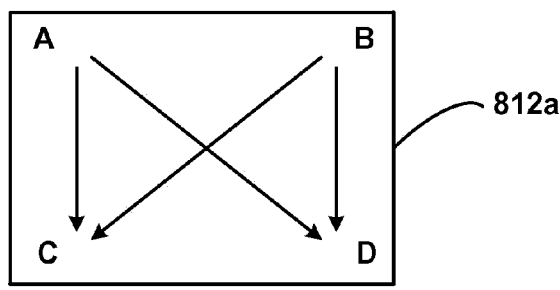

FIG. 9 illustrates the method by which potential morpheme relationships are inferred from concept relationships in the training set.

Potential morpheme relationships may be calculated to examine the prevalence of individual potential morpheme relationships in the aggregate of all concept relationships. Based on this examination, statistical tests may be applied to identify candidate morpheme relationships that have a high likelihood of holding true in the context of all the concept relationships in which they present.

In one embodiment of the system of the present invention, potential morpheme relationships may be constructed as all permutations of relationships that may exist between morphemes in related concepts, wherein the parent-child directionality of the relationships are preserved.

In the example in FIG. 9, a portion of the input concept hierarchy 1008 shows a relationship between two concepts. The parent concept and its related child concept may contain the morphemes {A, B} and {C, D}, respectively.

Again, concepts may be defined in terms of one or more morphemes (grouped via keywords, in one embodiment). As a result, any relationship between two concepts will imply at least one (and often more than one) relationship between the morphemes that define the concepts.

In this example, the process of calculating potential morpheme relationships is illustrated. Four potential morpheme relationships 812a may be inferred from the single concept relationship. Maintaining the parent-child directionality established by the concept relationship, and disallowing any repetition, there are four potential morpheme relationships that may be derived: A→C, A→D, B→C, B→D.

In general, if the parent concept contains x morphemes and the child concept contains y morphemes, then there will exist x times y potential morpheme relationships: the number of potential morpheme relationships is the product of the number of morphemes in the parent and child concepts.

In one embodiment, this simple illustration of calculating morpheme relationships may be refined to improve the statistical indicators generated. These refinements (namely, aligning morphemes) are noted below in the description of the method of potential morpheme relationship calculations, illustrated in FIG. 10.

These refinements to the basic method of identifying potential morpheme relationships may serve to reduce the number of potential morpheme relationships. This reduction, in turn, may reduce the amount of noise, thus augmenting the patterns that identify morpheme relationships, and makes the statistical identification of morpheme relationships more reliable.

Again, those of ordinary skill in the art will appreciate that there are many algorithms that may be used to derive potential morpheme relationships from a given set of concept relationships.

Method of Calculating Potential Morpheme Relationships

Figure 10:
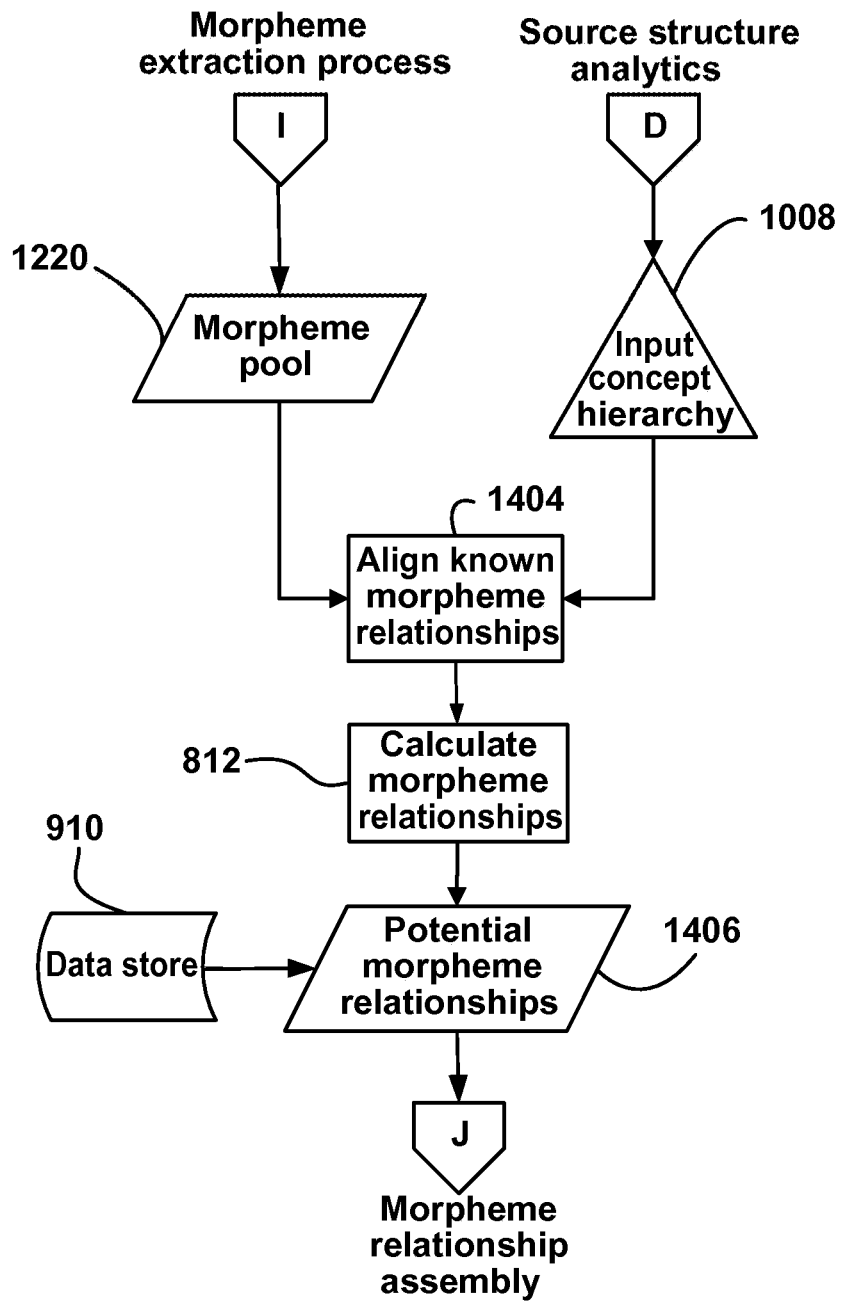

FIG. 10 presents one embodiment of the process of calculating potential morpheme relationships in greater detail.

The intent here is to generate a set of potential morpheme relationships, which may later be analyzed to assess the likelihood that they are truly morphemic in nature (that is, they hold in every context that they present).

The present method of calculating potential morpheme relationships continues from the method of source structure analytics D, described above and illustrated in FIG. 6.

The method also extends from the methods of morpheme extraction I, as described above and illustrated in FIG. 8.

The inputs to this method of determining potential morpheme relationships may be the pool of morphemes extracted from the domain 1220 and the input concept hierarchy 1008 that contains the validated set of concept relationships from the domain.

Morphemes within each concept relationship pair may be aligned 1404 to reduce the number of potential morpheme relationships that may be inferred. Specifically, if two data elements are aligned, these elements cannot be combined with any other element in the same concept relationship pair. Through alignment, the number of candidate morpheme relationships may be reduced.

In one embodiment, axes may be aligned based on shared morphemes, and include all morphemes bound to the shared morphemes. For example, if one concept is "Politics in Canada" and the other is "International Politics", the shared morphemes in the keyword "Politics" may be used as a basis for alignment.

Axes may also be aligned based on existing morpheme relationships within the morpheme lexicon. Specifically, if any given potential morpheme relationship may be represented by morpheme relationships in the morpheme lexicon, either directly or indirectly constructed using sets of morpheme relationships, then the potential morpheme relationship may be aligned on this basis.

An external lexicon (not shown in FIG. 10) may also be used to direct the alignment of potential morpheme relationships. WORDNET™, for example, is a lexicon that may be applied to alignment. A variety of information contained within the external lexicon may be used as the basis for the direction. Under one embodiment, keywords may first be grouped by parts of speech; potential morpheme relationships are constrained to combine only within these grammatical groupings. In other words, alignment may be based on grammatical parts of speech, as directed by the external lexicon. Direct morpheme relationships that may be inferred from an external lexicon may also be used as a basis for alignment.

The potential morpheme relationships may be calculated 812 as all combinations of morphemes that are not involved in aligned sets. This calculation is described above and illustrated in FIG. 9.

The resultant set of potential morpheme relationships 1406 may be held in the domain data store 910. Here the inventory of potential morpheme relationships may be tracked as they present in the training set and are pruned through subsequent stages of analysis.

The potential morpheme relationships derived from this process may be passed to the process for pruning and morpheme relationship assembly J, as described below and illustrated in FIGS. 11-13.

Prune Potential Morpheme Relationships

The pool of potential morpheme relationships generated through the methods described above and illustrated in FIGS. 9-10 may be pruned down to a set of candidate morpheme relationships.

Potential morpheme relationships may be pruned based on an assessment of their overall prevalence in the training set. Those potential morpheme relationships that are highly prevalent have a greater likelihood of being truly morphemic (that is, of holding the relationship in every context).

In addition, morpheme relationships may be assumed to be unambiguous in their relationships with more general (broader) related morphemes. The structural marker for this ambiguity may be polyhierarchies. Morpheme relationships may embody fewer attributes and provide more definite bases for relating morphemes. As such, potential morpheme relationships may also be pruned as they present in polyhierarchies.

A hierarchy of morpheme relationships may be constructed from a set of morpheme relationship pairs that are also hierarchical. As such, the pool of potential morpheme relationships may be analyzed in the aggregate to identify relationships that contradict this assumption of hierarchy.

The candidate morpheme relationships that survive this pruning process are may be assembled into morpheme hierarchies. Whereas the candidate morpheme relationships are parent-child pairings, the morpheme hierarchies may extend to multiple generations of parent-child relationships.

Figure 11A:
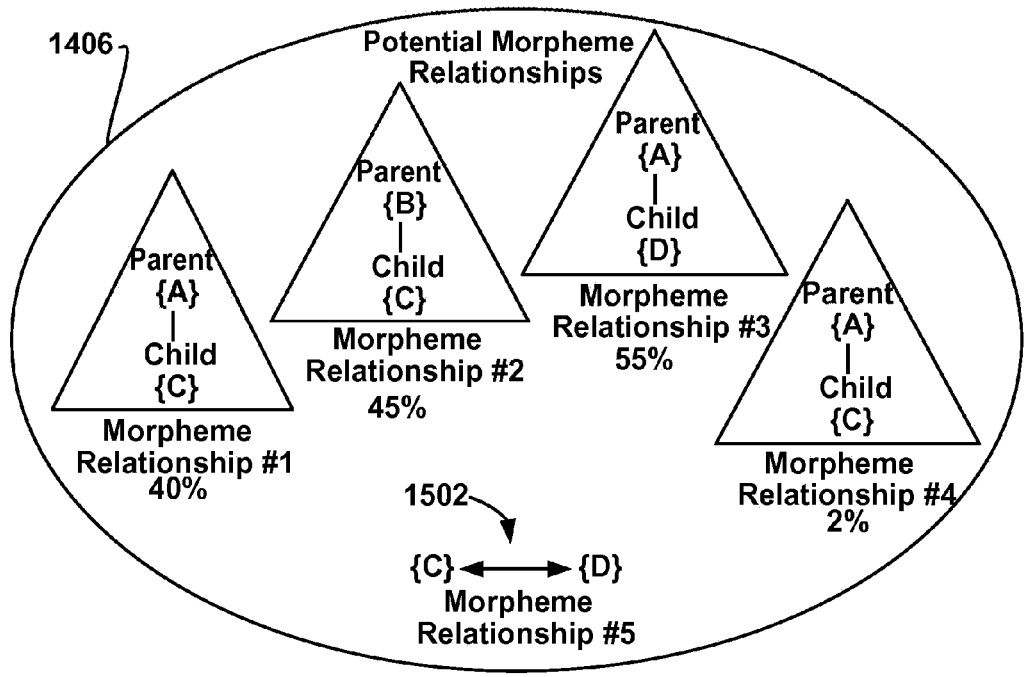
FIGS. 11A-11B, 12 and 13 illustrate a process of assembling a polyhierarchy of morpheme relationships from the set of potential morpheme relationships.
Figure 11B:
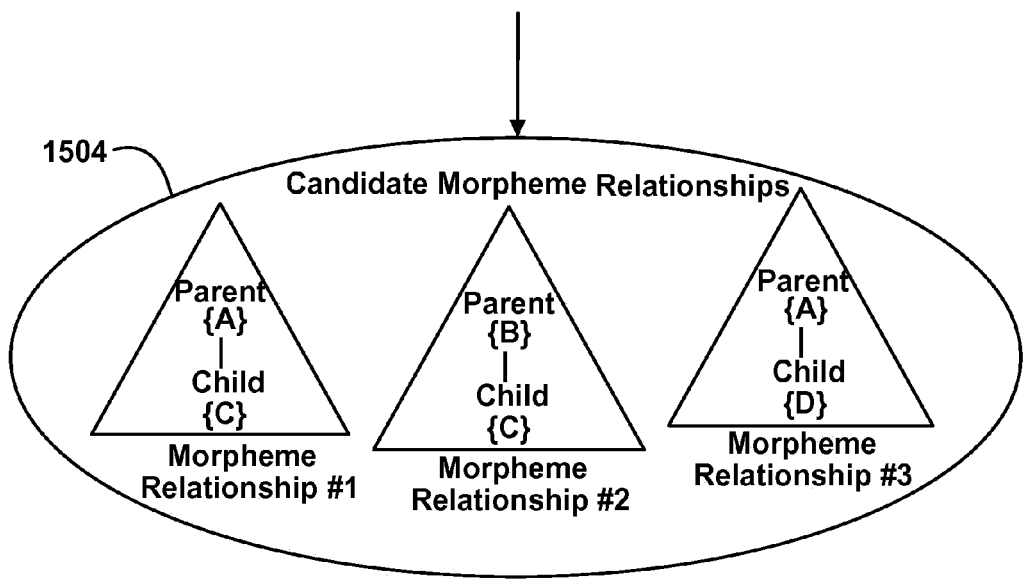
Figure 15B:
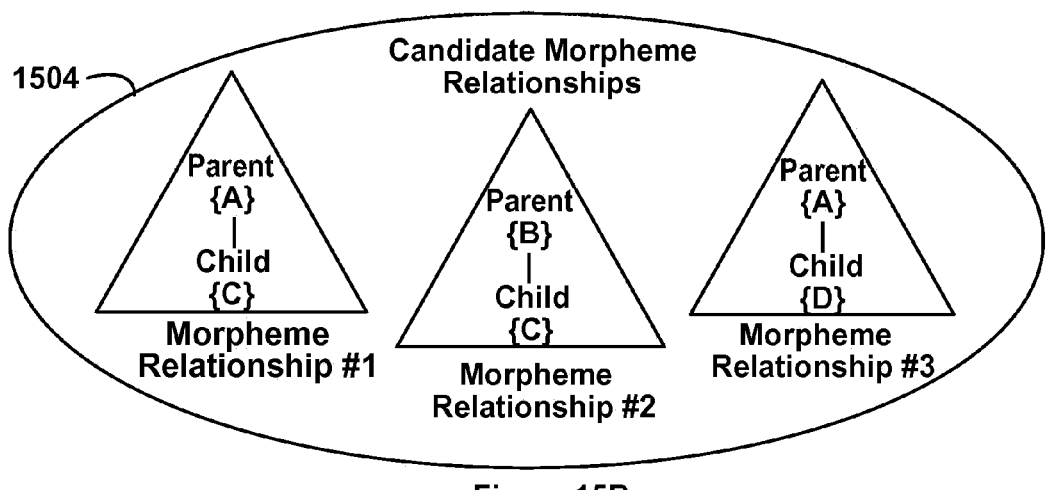
FIGS. 14A, 14B and 15 illustrate the reordering of morpheme polyhierarchy into a strict hierarchy using a method of attribution.

FIG. 11A and FIG. 11B illustrate the difference between potential morpheme relationships and the pruned set of candidate morpheme relationships.

In FIG. 11A, there are four potential morpheme relationship pairs that are hierarchical (parent-child). The first three of these relationships are relatively prevalent in the domain, but the fourth is relatively rare. Accordingly, the fourth pair is pruned from the set of potential morpheme relationships.

The first three relationship pairs in the set of potential morpheme relationships 1406 are also consistent with the assumption of hierarchy. However, the bi-directional fifth relationships 1502 conflict with this assumption. The direction of relationship D→C conflicts with the relationship C→D. This morpheme pair is re-typed as related through an associative relationship and removed from the set of candidate morpheme relationships 1504. FIG. 11B shows the pruned set of candidate morpheme relationships.

Assemble Morpheme Relationships
Merging Morpheme Relationships

Figure 12:
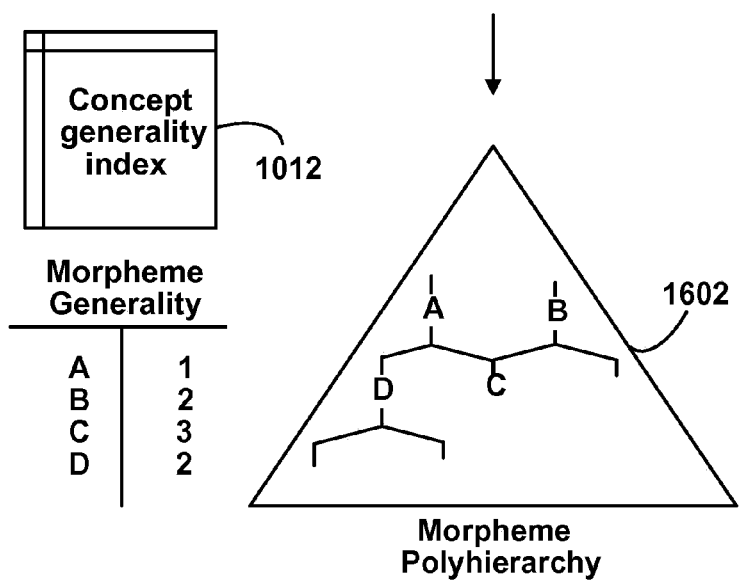

FIG. 12 illustrates the consolidation of candidate morpheme relationships into an overall morpheme polyhierarchy. All candidate morpheme relationship pairs may be incorporated into one aggregate set, connecting logically consistent generational trees (as described in more detail below).

This data structure may be described as a "polyhierarchy" since it may result in singular morphemes involved in more than one direct relationship with more general morphemes (multiple parents). This polyhierarchy may be transformed into a strict hierarchy (single parents only) in later stages of the process.

The potential morpheme relationships that survive the conflict pruning process (described above and illustrated in FIG. 11B) may be collected into a set of candidate morpheme relationships 1504. The set of candidate morpheme relationships may be merged into an overall morpheme polyhierarchy 1602.

In one embodiment, the constraints on the process of constructing the overall polyhierarchy may be: 1) that the set of candidate morpheme relationships in the polyhierarchy is logically consistent in the aggregate; 2) that the polyhierarchy uses the least number of polyhierarchical relationships necessary to create a logically consistent structure.

A recursive ordering algorithm may be used to assemble the trees and highlight conflicts and proposed resolutions. The reasoning applied to the following example illustrates the logic of this algorithm.

Based on relationship hierarchy #1, A is superior (that is, more general) than C. Based on hierarchy #2, B is superior to C. Based on hierarchy #3, A is superior to D. The four morphemes can be logically combined with A and B superior to C, and A superior to D.

Where more than one logical ordering is possible, the concept generality index 1012 may be used to resolve the ambiguity. (The concept generality index is created through a method of source structure analytics, described above and illustrated in FIG. 6.) This index may be used to compare morphemes to assess whether morphemes are relatively more general or more specific than other morphemes (with the generality measured in terms of the degrees of separation from the root nodes).

In the example, both A and B are logically consistent topmost nodes based on the set of candidate morpheme relationships. A and B are also both parent to C. Thus, a polyhierarchical set of relationships may be generated at C. Since there is no information in the sample set to conflict with the polyhierarchical set of relationships, the relationships may be assumed valid. Processing may continue to resolve the polyhierarchies in later stages.

If new data presented that indicated that A and B were instead related nodes through indirect relationships, then the system may resolve the polyhierarchy immediately and order A and B in the same tree. The priority of A and B may be determined through the generality index. Here, A has a lower generality ranking than B. It is thus accorded a higher (more general) position in the resultant polyhierarchy 1602.

Morpheme Polyhierarchy Assembly

Figure 13:
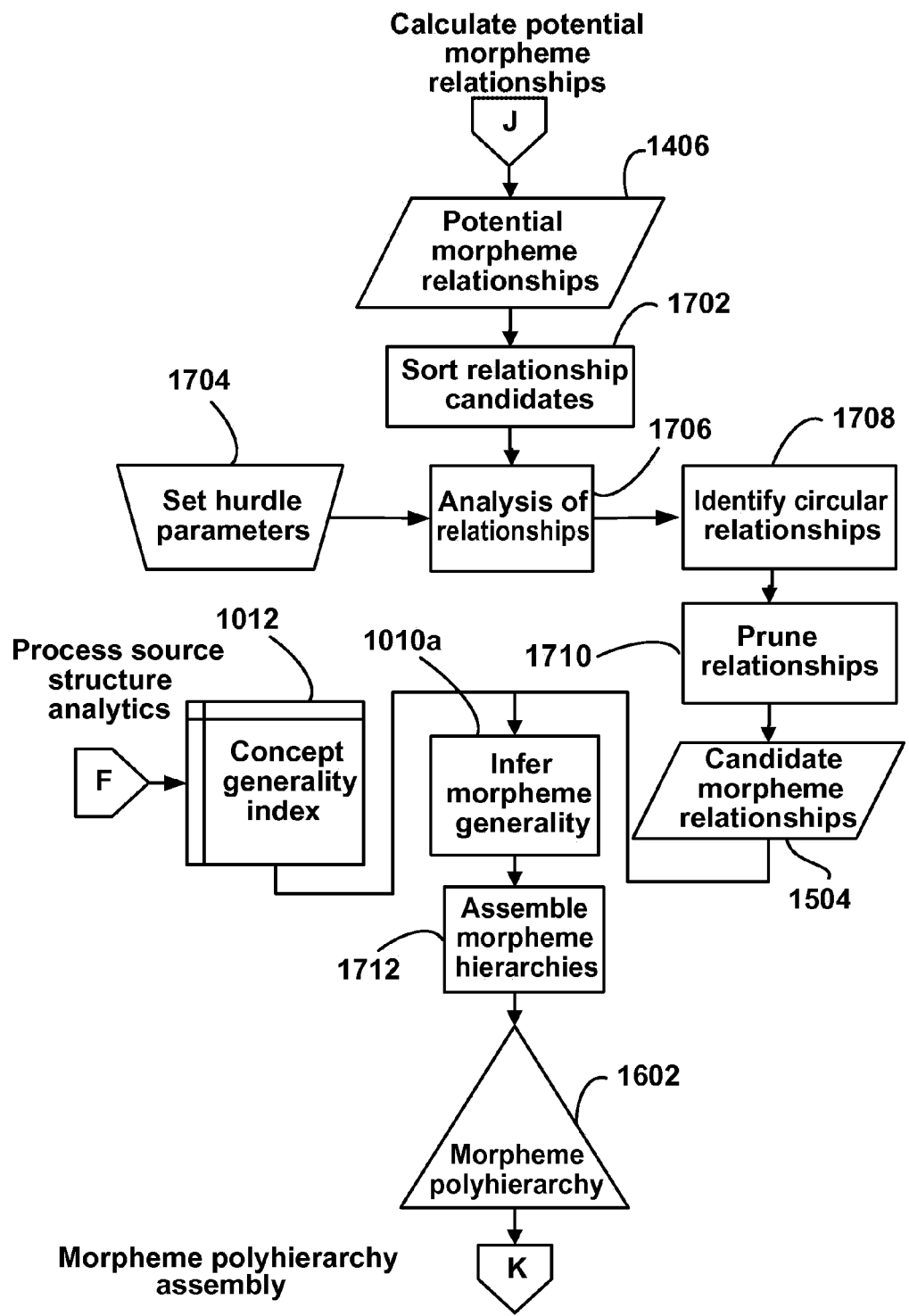

FIG. 13 illustrates a method by which the morpheme polyhierarchy may be assembled from the candidate morpheme relationships.

The morpheme hierarchy may be assembled by analyzing the candidate morpheme relationship pairs in the aggregate. As in input concept hierarchy assembly, the objective is to consolidate the individual pairs of relationships into a unified whole.

The method of morpheme relationship assembly may continue from the method of calculating the potential morpheme relationships J, described above and illustrated in FIG. 9-10.

The set of potential morpheme relationships 1406 may be the input to this method. The candidate morpheme relationships may be sorted 1702 based on an analysis of the concept relationships that contain the morphemes. The concept relationships may be sorted based on the aggregate count of morphemes in each concept relationship pair (lowest to highest).

Morpheme relationships may increase in likelihood as the number of morphemes involved in the concept relationship pair decreases (since the probability for any given morpheme relationship candidate is factored by the number of potential candidates in the pair). Therefore, in one embodiment, the operations may prioritize the analysis of concept relationships with lower morpheme counts. Lower the number of morphemes in the pair and you may increase the chances of finding a truly morphemic morpheme relationship.

Parameters to define the statistically relevant boundaries of morpheme relationships may be set 1704. These parameters may be based on the prevalence of the morpheme relationships in the aggregate. The object is to identify those that are highly prevalent in the domain. These constraints on the morpheme relationships may also contribute to the negative feedback mechanism of the complex-adaptive system. An analysis of the relationship set 1706 in the aggregate may be conducted to determine the overall prevalence of each relationship. This analysis may combine statistical tools conducted within sensitivity parameters controlled by system administrators. The exact parameters may be tailored to each domain and may be changed by domain owners and system administrators.

As with the concept relationship analysis, circular relationships 1708 may be used as a structural marker to negate the assumption of hierarchical relationships. Potential morpheme relationships may be pruned if they do not pass the filters of prevalence and hierarchy 1710.

The pruned set of potential morpheme relationships may comprise the set of candidate morpheme relationships 1504. The generality of the morphemes 1010a may be inferred from the generality of the source structure concepts, as embodied in the concept generality index 1012.

Concepts embodying the lowest numbers of morphemes may be used as surrogates for the generality of each morpheme. To illustrate the basis of this assumption, assume that a concept is comprised of only one morpheme. Given the high degree of relatedness between the concept and the single morpheme that comprises it, it is likely that the generality of the morpheme would closely correlate to the generality of the concept.

This reasoning directs the calculation of morpheme generality in one embodiment. Specifically, the system may gather the set of concepts that embody the lowest number of morphemes in the aggregate. That is, the system may select a set of concepts that represents all morphemes in the set.

The concept generality index 1012 may be used to prioritize dimensional concept relationships and may be stored (not shown) in the domain data store 706.

Morpheme hierarchies may be assembled into an overall polyhierarchy structure 1712, using a method as described above and illustrated in FIG. 12. This may involve ordering the nodes in the aggregate and removing any redundant relationships that may be inferred from other sets of indirect relationships. The concept generality index created may be used to order the morphemes from most general to most specific.

Those of ordinary skill in the art will appreciate that there are many algorithms that may be used to merge a collection of hierarchical morpheme relationships into a polyhierarchy, as is known in the art.

Assemble Morpheme Hierarchy

Figure 14A:
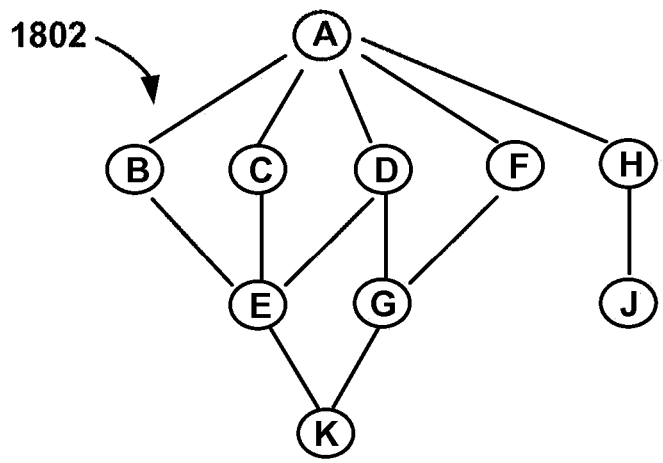
Figure 14B:
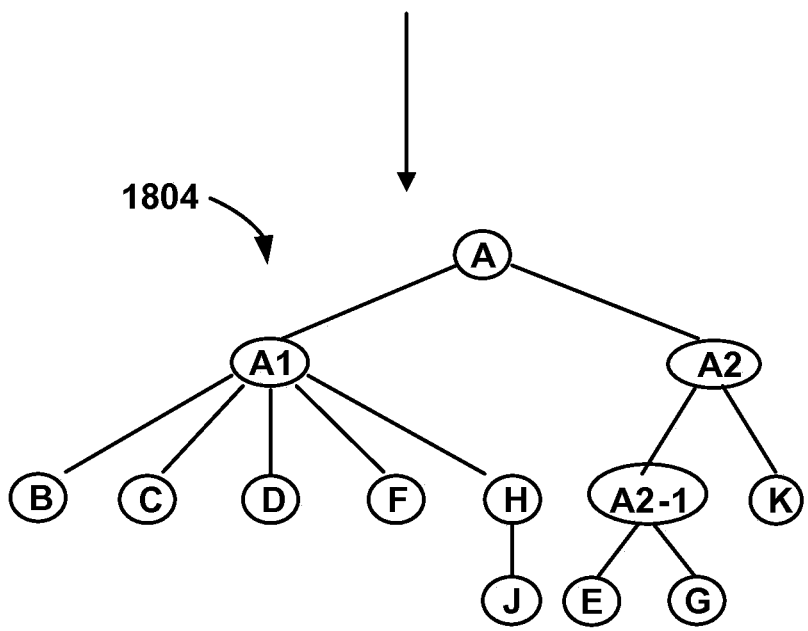
Figure 15:
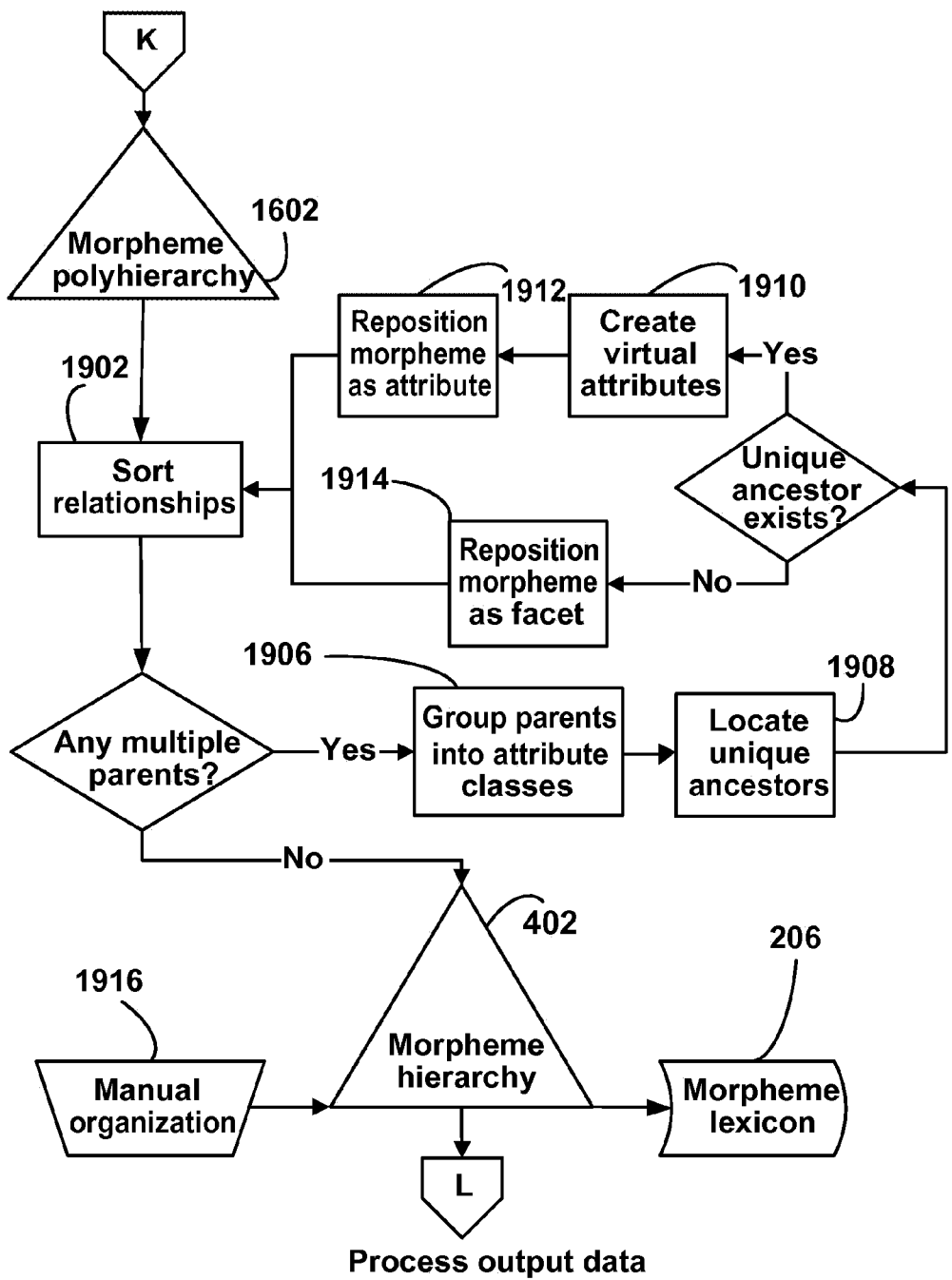

FIGS. 14-16 illustrate the transformation of the morpheme polyhierarchy into a morpheme hierarchy.

Morpheme Polyhierarchy Attribution

FIGS. 14A-14B illustrate a process of morpheme attribution and example results. Attribution in this context refers to the manner in which facet attributes are ordered and assigned to data elements. Just as the operations place constraints on entity extraction (such as keyword and morpheme extraction), the morpheme hierarchy may be built using explicit constraints on morpheme relationships.

The morpheme relationships that link morphemes into hierarchies are, by definition, morphemic. Morphemic entities are fundamental and unambiguous. Morphemes are generally required to relate to only one parent. In a set of morpheme relationships (the morpheme hierarchy), morphemes may exist in only one location.

Based on these definitions in one knowledge representation model, morphemes may be presented as attributes within facet hierarchies of morphemic data. The knowledge representation model thus may provide for the faceted data and multi-tier enhanced method of faceted classification.

In the preceding methods, the aggregation of candidate morpheme relationships may present sets of morpheme polyhierarchies 1802. Thus, attribution may be used to weigh these conflicts in the knowledge representation model and resolve solutions 1804.

The method of attribution in one embodiment may involve finding a place for each morpheme in the hierarchy that does not conflict with the morphemic requirements of hierarchy.

Morphemes in polyhierarchies may ascend to new positions within their original trees or moved to entirely new trees. This process of attribution may ultimately define the topmost root morpheme nodes in the facet hierarchy. Thus, the root morpheme nodes in the morpheme hierarchy may be defined as the morpheme facets, with each morpheme contained within the morpheme facet attribute trees.

The following discussion illustrates the method for removing multiple parents using the concept of attributes.

Again, the structural marker for the conflict may be the presence of multiple parents presenting in the morpheme polyhierarchy 1802. To remove the conflicts, morphemes with multiple parents may be reconsidered as attributes of the ancestors of the shared parents.

Attribute classes may be created to maintain the grouping of the parents originally shared by the reorganized morpheme and to keep the morpheme in a separate attribute class from those parents. (In cases where there is no unique ancestor, the method promotes the morphemes to the root level of the hierarchy, as a new morpheme facet.)

Relationships may be reorganized into attribute classes from the root nodes to the leaf nodes. Multiple parents may be first reorganized into attributes so that a singular parent can be identified. That is, top-down traversal of the morpheme relationships provides for attribution that may resolve to a solution set 1804.

Generally, if two morphemes share at least one parent, they are siblings (associative relationship) in the context of that shared parent. Sibling child nodes may be grouped under a single attribute class. (Note that the child nodes need only share one parent; they need not share all parents.) If morphemes do not share at least one parent, they may be grouped as separate attributes of the shared ancestor.

To choose between alternatives, the relevance of the source relationships may be weighed. Measures of relationship relevance were introduced above in the discussion of source structure analytics, illustrated in FIG. 6.

Starting from the top-down, the transforming steps may breakdown as follows:
1. The sibling group {B, C, D, F, H} share a single parent, A. Each individual node would be checked to see if there are multiple parents. In this case, none of these nodes have multiple parents, so there is no need to reorganize these relationships.
2. The morpheme E has multiple parents. The closest single-parent ancestor of E is A. E needs to be reorganized as an attribute of A.
3. The parents of E, {B, C, D, F, H} are grouped under the attribute class, A1. E then becomes a sibling of A1, as an attribute of A.
4. The morpheme G also has multiple parents. As in steps (2-3), it needs to be reorganized as an attribute of A. In addition, since E and G share at least one parent, they can be grouped under a single attribute class, A2.
5. The morpheme, J, has a unique parent, H. This parent-child relationship does not need to be reorganized.
6. The morpheme, K, has multiple parents, E and G. The unique ancestor of E and G is now, A2. K needs to be reorganized as an attribute of A2.
7. The parents of K, {E, G} are grouped under the attribute class, A2-1. K then becomes a sibling of A2-1, as an attribute of A2.

The end result is the morpheme hierarchy, conforming to the assumptions of truly morphemic attributes and morpheme relationships defined by the knowledge representation model of the invention.

Morpheme Hierarchy Reorganization

FIG. 15 presents the recursive algorithm that may provide for the method of attribution in one embodiment. The core logic of this morpheme hierarchy reorganization may be the method of attribution described above and illustrated in FIGS. 14A and 14B.

The inputs for this method may be the morpheme polyhierarchy K, as described above and illustrated in FIGS. 11-13. The input to the present method may be the morpheme polyhierarchy 1602. Relationships are sorted from root nodes to leaf nodes 1902. Each morpheme in the morpheme polyhierarchy may be checked for multiple parents. Herein, the morpheme that is the focus of the analysis is known as the active morpheme.

If any multiple parents exist, the set of multiple parents for the active morpheme may be grouped into sets, hereafter the morpheme attribute classes 1906. The morpheme attribute classes may be used to direct how the morphemes in the reorganized tree should be ordered.

For each morpheme attribute class, a unique ancestor may be located 1908 that does not have a multiple parent. The ancestor may be uniquely associated with only the attribute class (group of parents shared by the morpheme).

If the ancestor exists, the system may create one or more virtual attributes 1910 to contain all the morphemes in the morpheme attribute class. This node in the tree is called a "virtual attribute" because it is not associated with any morpheme directly and will thus not be involved in any concept definitions. It is a virtual attribute, not a real attribute.

If the ancestor exists and one or more attributes are created, the active morpheme may be reorganized as an attribute of the ancestor 1912, either directly related to the ancestor or grouped with other morphemes in a morpheme attribute class.

If the unique ancestor does not exist, the morpheme may be repositioned as a root node (facet) in the tree 1914.

The system may also allow administrators to manually alter 1916 the pool of morpheme relationships and the resultant morpheme hierarchy to refine or displace the results generated automatically.

The end result of this process may be the morpheme hierarchy 402, which comprises a hierarchical arrangement of elemental morphemes. One of the elemental constructs of the system's data structure, the morpheme hierarchy may be used to categorize and arrange the entities into increasing complex levels of abstraction.

The morpheme relationships in the morpheme hierarchy may be entered in the morpheme lexicon 206. Morpheme labels may be assigned to the morphemes based on the prevalence of labels stored in the system. The morpheme label that is most prevalent in the system may be used as the single representative label for that morpheme.

The outputs of this method may be processed as system output data L, as described below and illustrated in FIG. 17.

Alternative manners to transform a polyhierarchy to a strict hierarchy may be used. A single parent may be chosen based on any of a number of weighting factors to remove a multi-parent situation. In a simple solution, multi-parent relationships may be deleted.

Figure 16A:
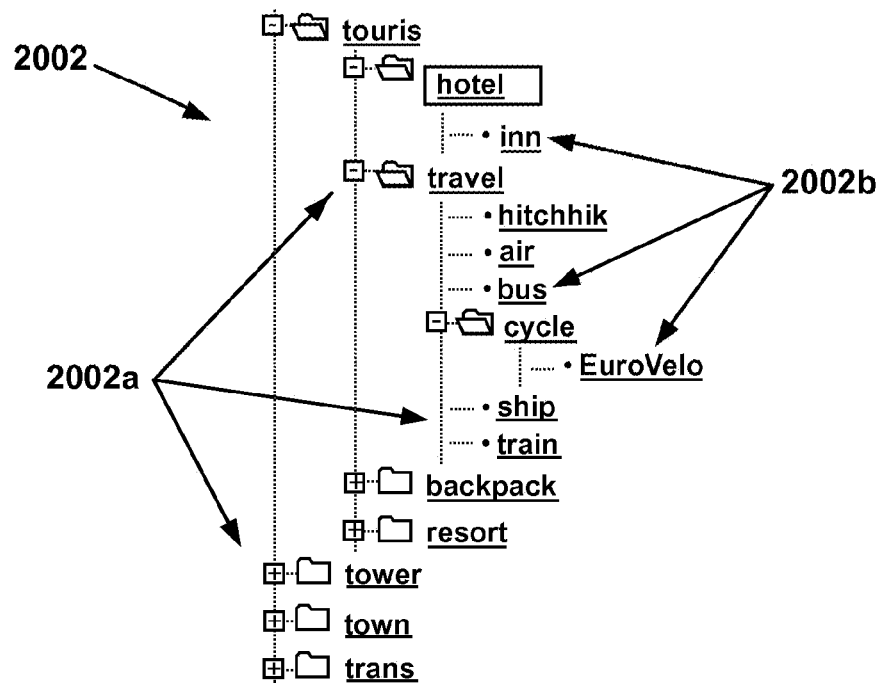
FIGS. 16A and 16B illustrate sample fragments from a morpheme hierarchy and a keyword hierarchy.

FIG. 16A illustrates a sample tree fragment from the assembled morpheme hierarchy. Each node in the tree (e.g. 2002a) may represent a morpheme in the morpheme hierarchy. The folder icons are used to indicate morphemes that are parents to related morphemes nested underneath (morpheme relationships). The texts next to each node (e.g. 2002b) are the associated morpheme labels (in many cases, partial words).

Methods of Faceted Classification Synthesis

Here begins the process of building (or synthesizing) the dimensional concept taxonomy 210 based on the enhanced method of faceted classification. This classification may generate dimensional concept relationships through the examination of the morpheme hierarchy with the set of concept definitions (more specifically defined in terms of the morphemes, with zero or more morphemes as morpheme attributes within the morpheme hierarchy).

The method of faceted classification of the present invention may be applied at multiple tiers of data abstraction. In this way, multiple domains may share the same elemental constructs for classification, while maintaining domain-specific boundaries.

Process Faceted Data Set

The following points summarize the steps involved in one aspect of preparing the output data from analysis operations for use in synthesizing the faceted classification data structure (as further described below):

For each domain to be classified, the data structures may be outputted as the domain-specific keyword hierarchy and the set of domain-specific concept definitions (more specifically defined in terms of domain-specific keywords, with zero or more domain-specific keywords as keyword attributes within the domain-specific keyword hierarchy).

The domain-specific faceted data described above may be derived from elemental constructs shared across domains. The preliminary concept definitions may be revised and significantly extended with new information. This is accomplished by comparing the information in the morpheme hierarchy with the original concept relationships in the training set.

Specifically, the synthesizing operations may assign concept definitions to content nodes based on an analysis of not only the explicit definitions provided by domain owners, but also through an analysis of all intersecting concepts and concept relationships in the aggregate. A preliminary definition of "explicit" attributes may be assigned, which is later supplemented with a far richer set of attributes "implied" by the concept relationships that intersect with the content nodes.

The candidate morpheme relationships may be assembled into an overall morpheme hierarchy, to be used as the data kernel for the faceted classifications. A separate facet hierarchy for each domain may be created from the unique intersections of keywords in each domain and their morphemes. This data structure may be the expression of the morpheme hierarchy limited to the boundaries of the domain.

The facet hierarchy may be expressed in the vocabulary of the domain (its unique set of keywords) and may include only those morpheme relationships that factor into the domain. The faceted classification for each domain may be outputted as the set of concept definitions for that domain and the facet hierarchy.

Thus, in one embodiment, the domain-specific facet hierarchies may be inferred from the centralized morpheme hierarchy. It may provide for a richer set of facets for smaller domains. It may build on the shared experiences of multiple domains (which may correct for errors that present in smaller domains, and it may facilitate faster processing of domains.

In another embodiment, the system may create a unique facet hierarchy for the domain based directly on the methods described above, illustrated in FIGS. 14-15. In this embodiment, the processes of attribute hierarchy assembly may be applied directly to the domain-specific keywords extracted from each domain.

In yet another embodiment, the synthesizing operations may be based on data collected from other traditional means of classification. Such means of classification may include faceted data prepared for traditional faceted classification synthesis, and concepts defined using strictly attribute sets, as in formal concept analysis. These and other complementary classification methods are well known to those skilled in the art.

Figure 16B:
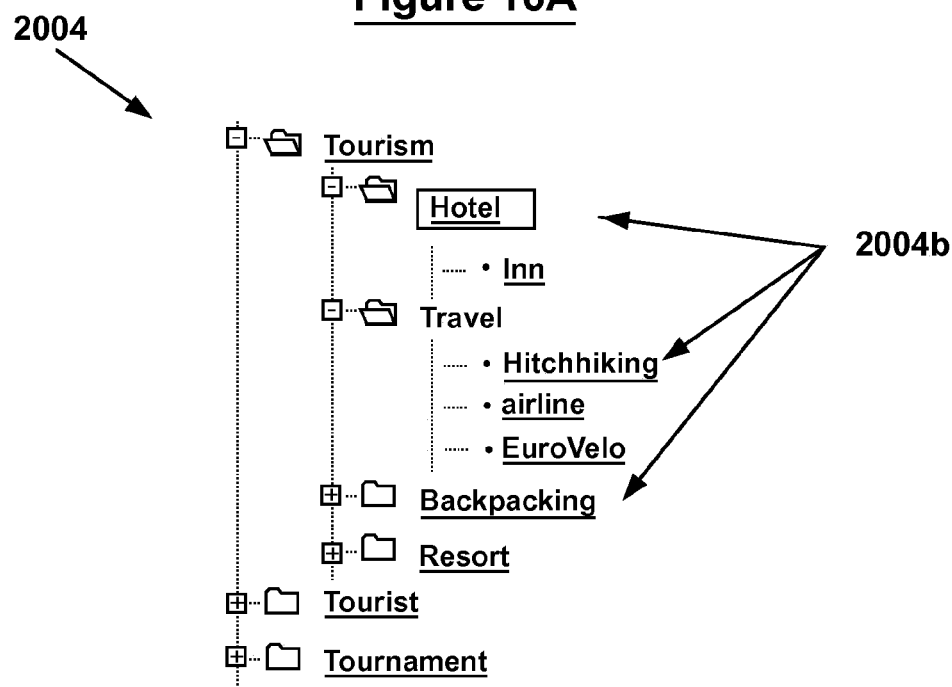

FIGS. 16A and 16B illustrate tree fragments from the assembled morpheme hierarchy 2002 (as described above) and tree fragments from the domain-specific keyword hierarchy 2004 as derived in one embodiment. Note that in the tree fragment for the keyword hierarchy 2004, texts next to each node (e.g. 2004b) representing the associated keyword labels are full words as they would present in the domain. Further, the tree fragment for the keyword hierarchy 2004 may be a subset of the tree fragment for the morpheme hierarchy 2002, contracted to include only those nodes relevant to the domain for which the keyword hierarchy is derived.

Figure 17:
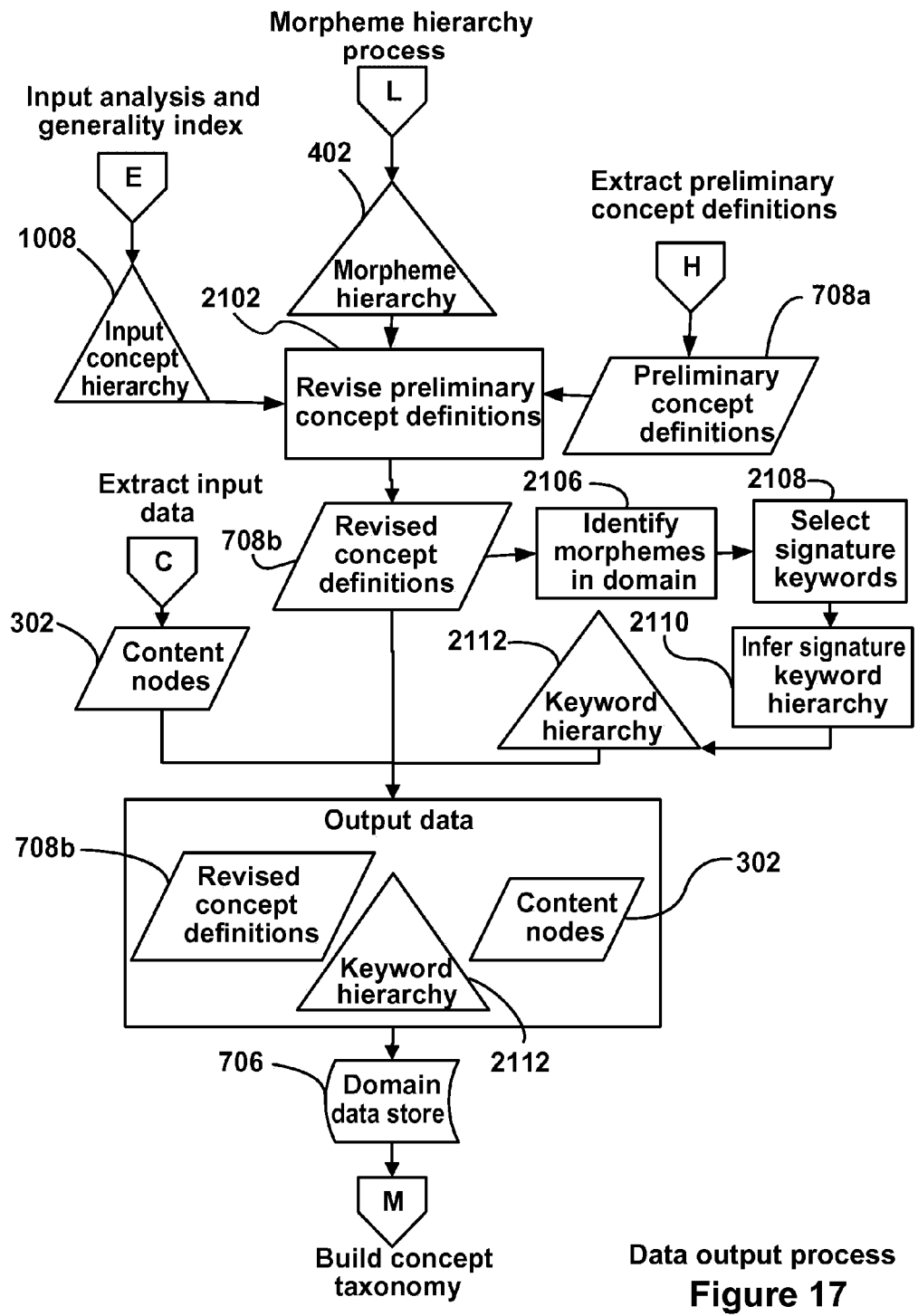
FIG. 17 illustrates a method of preparing output data for use in constructing the dimensional concept taxonomy.

FIG. 17 illustrates the operations of preparing the output data for the enhanced method of faceted classification.

The output data may be comprised of the revised concept definitions and a keyword hierarchy for the domain. The keyword hierarchy may be based on the morpheme hierarchy.

Inputs to this process may be the set of content nodes 302 to be classified, the input concept hierarchy 1008, the morpheme hierarchy 402, and the preliminary concept definitions 708a. Respective operations C, E, L and H to generate or otherwise obtain these inputs are described above.

The intersection of morpheme attributes within the first concept definition 708a and input concept relationships may be used 2102 to revise the first concept definition 708a to a second concept definition 708b. Specifically, if concept relationships in the source data cannot be inferred from the morpheme hierarchy, then the concept definitions may be extended to provide for attributes "implied" by the concept relationships. The result is the set of revised concept definitions 708b.

The set of relevant morpheme relationships 2106 in the morpheme hierarchy from the set of all morphemes participating in the domain may be identified.

The morphemes in the reduced and domain-specific version of the morpheme hierarchy may be labeled using keywords from the domain 2108. For each morpheme, a signature keyword that uses that morpheme the greatest number of times may be selected. The most prevalent keyword label for each keyword may be assigned. Individual keywords may be limited to one occurrence in the facet hierarchy. Once a keyword is used as a signature keyword, it may be unavailable as a surrogate for other morphemes.

The morpheme hierarchy may be consolidated into a set of morpheme relationships that includes only the morphemes participating in the domain and the keyword hierarchy 2112 is inferred 2110 from the consolidated morpheme hierarchy.

The output data 210a representing the faceted classification may be comprised of the revised concept definitions 708b, the keyword hierarchy 2112, and the content nodes 302. The output data may be transferred to the domain data store 706.

The concept relationships in the input concept hierarchy may also directly affect the output data in the domain data store 706. Specifically, the input concept hierarchy may be used to prioritize the relationships inferred from the synthesis portion of the operations. The pool of concept relationships drawn directly from the source data may represent "explicit" data, as opposed to the dimensional concept relationships that are inferred. Relationships inferred that are explicit in the input concept hierarchy (directly or indirectly) may be prioritized over relationships that did not present in the source data. That is, explicit relationships may be deemed more significant than the additional relationships inferred from the process.

The output data may now be available as a complex dimensional data structure to render the dimensional concept taxonomy M.

Apply Methods of Faceted Classification

Figure 19:
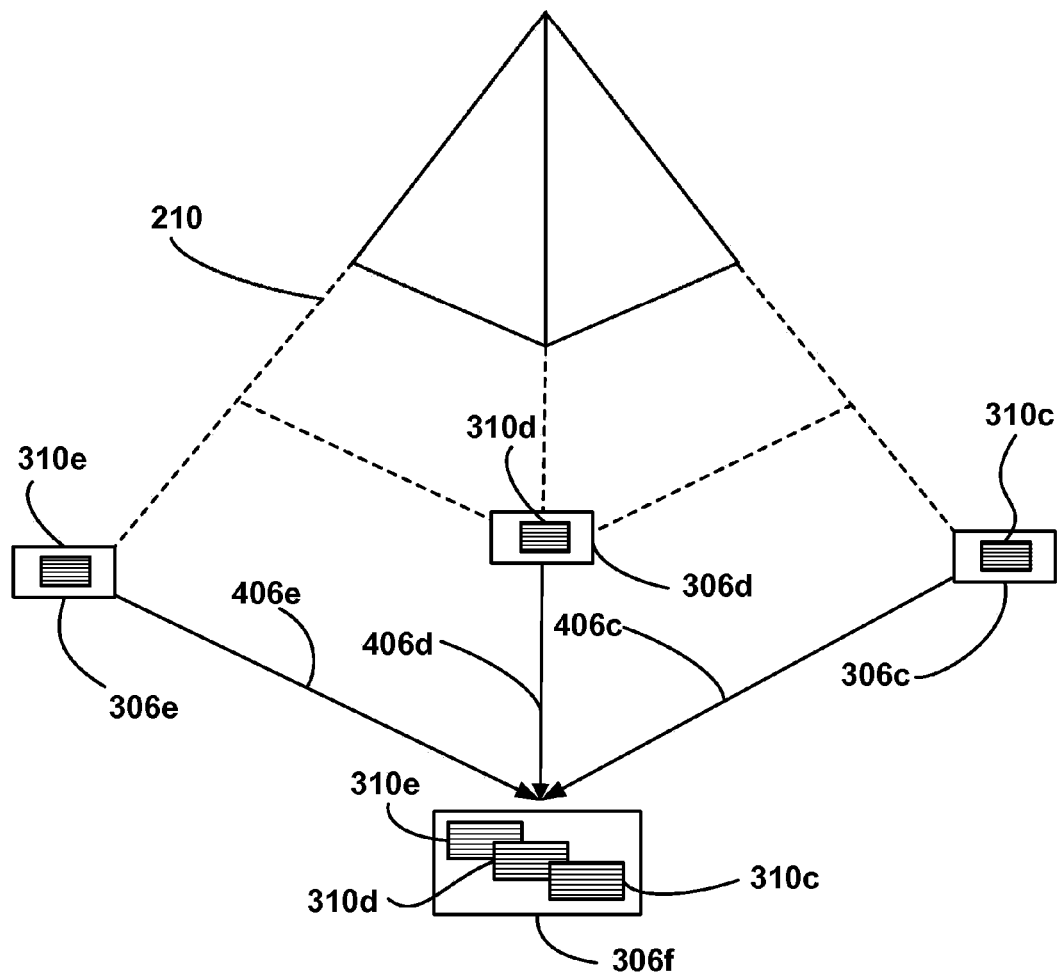
FIG. 19 illustrates how the operations combine dimensional concept relationships to generate dimensional concept taxonomies.

The organizing principles of the enhanced method of faceted classification are illustrated in FIGS. 3, 18-19, first introduced above, and described in more detail below, illustrated in and FIGS. 20-22, through which the elemental constructs may be synthesized to create complex dimensional structures.

This enhanced method of faceted classification marries the flexibility benefits of faceted classification schemes with the benefits of simplicity, visualization, and holistic perspective, as provided through unitary (non-fragmented) hierarchies of complex concepts.

Contrasting faceted hierarchies with simple (unitary) hierarchies illuminates these benefits. Simple hierarchies are intuitive and easy to visualize. They often integrate many organizing bases (or facets) simultaneously, providing a more holistic perspective of all the relevant attributes. Attributes are coupled across facet boundaries and may be navigated concurrently. By integrating attributes, rather than fragmenting them, they offer a much more economical and robust explanatory framework.

Those skilled in the art will appreciate that many other simpler and traditional classification methods may also benefit from the various components and modes of operations of the present invention, as outlined below. Traditional processes of faceted classification and set-based classification constructs such as formal concept analysis illustrate two such alternate classification methods that would benefit from the systems described herein.

Dimensional Concept Synthesis

With reference to FIG. 18, morphemes 310 that comprise the concept definitions may be related in a morpheme hierarchy 402. The morpheme hierarchy 402 may be an aggregate set of all the morpheme relationships known in the morpheme lexicon 206, pruned of redundant morpheme relationships. Morpheme relationships may be considered redundant if they can be logically constructed using sets of other morpheme relationships (i.e. through indirect relationships).

Individual morphemes 310a and 310b may be grouped in keywords to define a specific concept 306b. Note that these morphemes 310a and 310b may thus be associated with a concept 306b (via keyword groupings) and with other morphemes 310 in the morpheme hierarchy 402.

Through these interconnections, the morpheme hierarchy 402 may be used to create a new and expansive set of concept relationships. Specifically, any two concepts 306 that contain morphemes 310 that are related through morpheme relationships may themselves be related concepts.

Co-occurrences of morphemes within concept definitions may be used as the basis for creating hierarchies of concept relationships. Each intersecting line 406a and 406b at concept 306b (FIG. 18) represents a dimensional axis connecting concept 306b to other related concepts (not shown). The set of dimensional axes, each representing a separate hierarchy of concept relationships filtered by a set of morphemes (or facet attributes) that define the axis, may be the structural foundation of a complex dimensional structure. A simplified overview of the construction method continues in FIG. 19.

Dimensional Concept Taxonomy

FIG. 19 illustrates the construction of the complex dimensional structure for defining dimensional concept taxonomy 210 based on the intersection of dimensional axes.

A set of four concepts 306c, 306d, 306e, and 306f may be illustrated with concepts 306c, 306d, and 306e defined by morphemes 310c, 310d, and 310e, respectively and concept 306f defined by the set of morphemes 310c, 310d, and 310e. By virtue of the intersections of the morphemes 310c, 310d, and 310e, the concepts 306c, 306d, 306e, and 306f may share concept relationships. Synthesis operations (described below) may create dimensional axes 406c, 406d, and 406e as distinct hierarchies of concept relationships based on the morphemes 310c, 310d, and 310e in the concept definitions.

This operation of synthesizing dimensional concept relationships may be processed to all or a portion of content nodes 302 in the domain 200 (scope-limited and dynamic modes of processing operations are described below, illustrated in FIGS. 22-23). Content nodes 302 may thus be categorized into a completely reengineered complex dimensional structure, as the dimensional concept taxonomy 210.

As described above, a single content container or content node (such as a web page) may be assigned more than one concept. Consequently, a single content container or content node may reside on many discrete hierarchies in the dimensional concept taxonomy.

Again, any two concepts 306 that contain morphemes 310 that are related through morpheme relationships may themselves be related concepts. In one embodiment, both explicit and implicit morpheme relationships may be combined with contextual investigations of the domain to infer complex dimensional relationships in the dimensional concept taxonomy.

Concept definitions may be described using morphemes as facet attributes. As described above, it may not matter whether the facet attributes (morphemes) are explicit ("registered" or "known") in the lexicon or implicit ("not registered" or "unknown"). There should simply be a valid description associated with the concept definition to carry its meaning in the dimensional concept taxonomy. Valid concept definitions may provide raw materials to describe the meaning of the content nodes in the dimensional concept taxonomy. In this way, objects in the domain may be classified in the dimensional concept taxonomy whether or not they were previously analyzed as part of the training set. As is well known in the art, there are many methods and technologies available to assign concept definitions to objects to be classified.

In one embodiment of the invention, the interplay of the structural entities of the knowledge representation model (described above) may establish logical links between morphemes, morpheme relationships, concept definitions, content nodes, and concept relationships, as follows:

If concepts within the active content node contain facet attributes (and hereafter, as morphemes) of the same lineage as those in other content nodes (hereinafter "related nodes"), then relationships may exist between the concepts of the active and related nodes. In other words, each concept may inherit all the relationships inferred by the relationships between their morphemes, as existing in the content nodes.

Dimensional concept relationships that are inferred directly from the facet hierarchy are referred to herein as explicit relationships. Dimensional concept relationships that are inferred from intersecting sets of facet attributes within concept definitions assigned to the content nodes to be classified are referred to herein as implicit relationships.

Synthesis (Build) Rules

Explicit relationships between concepts may be calculated by examining the relationships between the attributes in their concept definitions. If concept definitions contain attributes that are related either directly or indirectly in the facet hierarchy (hereafter, of the same "lineage") to those in the content node being classified (hereinafter, the "active node"), then explicit relationships may exist between the concepts along the dimensional axis represented by the attributes involved.

Subject to limiting constraints (described below), implicit relationships may be inferred between any concepts that share a subset of attributes in their concept definitions. The intersecting set of attributes establishes a parent-child relationship.

Axes may be defined in terms of facet attribute sets. In one embodiment, axes may be defined by the set of facets (root nodes) in the facet hierarchy. These attribute sets may then be used to filter concepts into consolidated hierarchies of dimensional concept relationships. Alternatively, any set of attributes may be used as bases of dimensional axes, for dynamically constructed (custom) hierarchies derived from the complex dimensional structure.

A dimensional concept relationship exists if explicit and/or implicit relationships may be drawn for all axes in the parent concept definition. Thus dimensional concept relationships are structurally intact across all dimensions defined by the attributes.

Priority and Directionality

The facet hierarchy (as expressed by the morpheme hierarchy) may be used to prioritize the content nodes. Specifically, each content node may embody attributes that present in at most one location in the facet hierarchy. The priority of the attributes in the hierarchy may determine the priority of the nodes.

Priorities within concept relationships may be determined first by examining the overall priorities of any registered morphemes within the sets in question. The topmost registered morpheme may establish the priority for the set.

For example, if the first set includes three registered morphemes with priority numbers {3, 37, 303}, the second set includes two registered morphemes with priorities {5, 490}, and the third set includes three registered morphemes with priorities {5, 296, 1002}, then the sets may be ordered: {3, 37, 303}, {5, 296, 1002}, {5, 490}. The first ordered set may be prioritized based on the top overall ranking of the morpheme with priority 3 contained in its set. The latter two sets may both have a topmost morpheme priority of {5}. Therefore, the next highest morpheme priorities in each set may be examined to reveal that the set containing the morpheme with priority {296} should be the higher prioritized set.

Where the content nodes in the concept relationships are not differentiated by the registered morphemes, the system may use the number of implicit morphemes as the basis for prioritization. The set with the fewest number of morphemes may be assumed to be of a higher priority in the hierarchy. Where content nodes contain the same explicit morphemes and the same number of unregistered implicit morphemes, the content nodes may be considered at parity with each other. When content nodes are at parity, priority may be established by the order in which each of these content nodes is discovered by the system.

Figure 20:
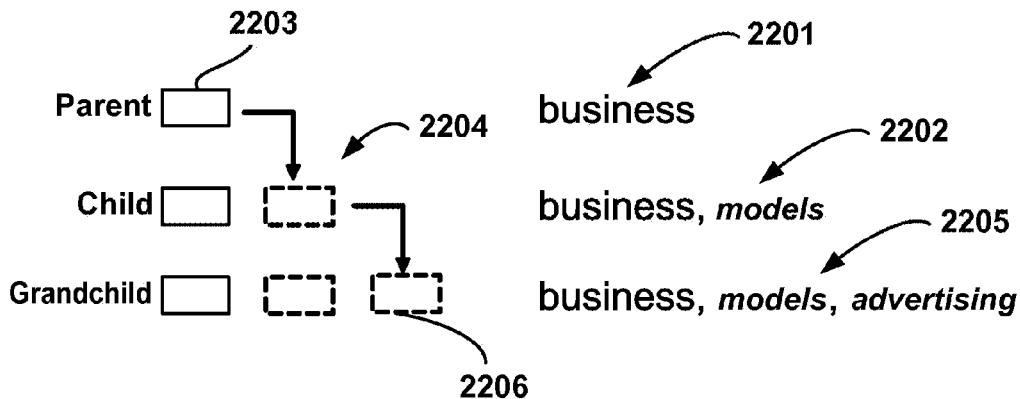
FIGS. 20, 21 and 22 illustrate how faceted output data is used to construct a dimensional concept taxonomy.
Figure 20:
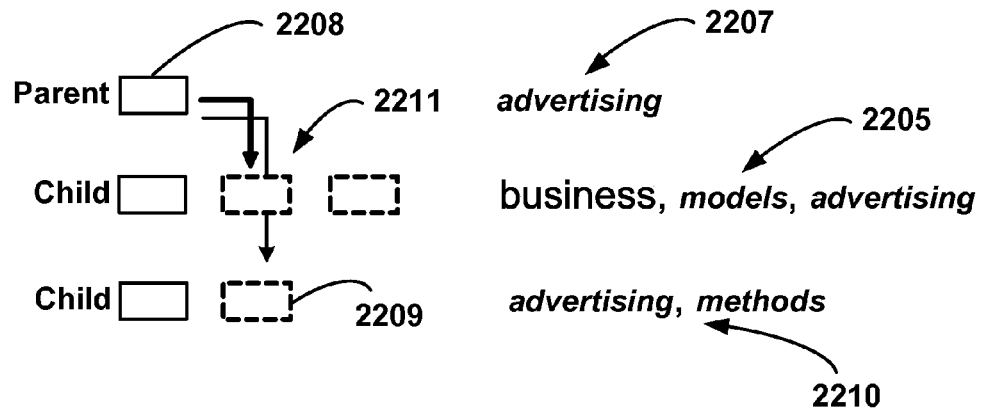

FIG. 20 provides a simple illustration of one embodiment construction of the implicit relationships and the determination of the priority of the nodes in the resultant hierarchy.

In this example, the morpheme "business" 2201 is registered in the morpheme lexicon. Assume that through user interactions, a content node is constructed with a concept definition that contains this morpheme, plus a new morpheme, "models" 2202, that is not recognized in the morpheme lexicon.

Continuing the example above, the morpheme "business" has the highest priority 2203. The set "business, models" is an implied child of "business" 2204. Any additional morphemes that are added to this set, such as "advertising" 2205, would create additional layers in the hierarchy 2206.

Any morphemes, whether explicit in the system or implied, may be used as a basis for a concept hierarchy (or axis). Continuing the example above, the implicit morpheme "advertising" 2207 is the parent 2208 of a hierarchy based on this morpheme. The set "business, models, advertising" 2205 is a child 2209 in this hierarchy. Any additional set that includes "advertising" would also be a member of this hierarchy. In the example, the set "advertising, methods" 2210 is also a child to advertising 2211. Since the morpheme "business" is registered, the set "business, models, advertising" is given a higher priority in the advertising hierarchy over the set "advertising, methods", which contains only implicit morphemes.

An alternate embodiment of node prioritization concerns "signature" nodes. These are defined as the content nodes that best describe (or give meaning) to their associated concepts. For example, a domain owner may associate a photograph with a specific concept as the signature identifier for that concept. Signature nodes may thus be prioritized.

There are many ways to implement signature nodes. For example, labels, as a special class of content nodes, are one way. A special attribute may be assigned to signature nodes and that attribute may be given the highest priority in the facet hierarchy. Or a field may be used in the table of content nodes to stipulate this attribute.

The prioritization based on the facet hierarchy may be supplemented by automatic bases such as alphabetization, numerical, and chronological sorting. In traditional faceted classification, prioritization and sorting are issues of notation and citation order. Systems typically provide for a dynamic reordering of the attributes for prioritization and sorting. Therefore, no further discussion of these operations is made here.

Axial Definitions and Structural Integrity

Another rule for building the dimensional concept taxonomy in one embodiment of the system concerns the structural integrity of the dimensional axes. Each morpheme (attribute) set used as a concept definition (an axial definition) may establish a dimensional axis. Dimensional concept relationships inferred from these morphemes must be structurally intact across all dimensions as determined by the parent node. In other words, all dimensions that intersect with the parent concepts must also intersect all the child concepts of the node. The following example will illustrate:

Consider the active content node with the concept definition {A, B, C},

Where A, B, C are three morphemes in a concept definition, and the morphemes E, F, G are children of A, B, C, respectively, in the morpheme hierarchy;

{A, B, C} refers to a concept definition described with morphemes A and B and C

{A, *} refers to a combination of explicit morpheme A and implicit morpheme(s)

{*} to establish a node that is an implicit child of A

{A|B} refers to either the morpheme {A} or {B}.

The three morphemes A, B, C in the active node, in this example, may be used to establish three dimensions (or intersecting axes) in the dimensional concept hierarchy. For any other content nodes to be a child of this node, candidates must be children relative to all three axes. The notation that follows is the solution set of explicit and implicit relationships as defined by one embodiment of the invention:

{(A|E|A,*|E,*), (B|F|B,*|F,*), (C|G|C,*|G,*)},

Where the morpheme of the first dimension is A or E or an implicit morpheme of A or an implicit morpheme of E;

where the morpheme of the second dimension is B or F or an implicit morpheme of B or an implicit morpheme of F;

where the morpheme of the third dimension is C or G or an implicit morpheme of C or an implicit morpheme of G.

The scope of processing may be further limited by constraining the concept definitions of the dimensional axes. An individual axis (hereafter, the "active axis") may be established by referencing a subset of morphemes from a parent node, thus constraining the set of parents (ancestors) that may link to the active node. Effectively, the concept definition associated with the active axis may establish a virtual parent node that constrains the polyhierarchy that extends from the active node to only those content nodes that reside on the hierarchy defined by the concept definition of the active axis.

The following example illustrates this constraint using the example introduced above, with the concept definition {A, B, C}. In this example, the dimensional concept relationships derived are constrained to an active axis with the concept definition {A,B}. Under this constraint, the set of possible parents (ancestors) to the active node are limited to the set, {(A,B)|A|B}. In other words, matching concept definitions would only include combinations of A or B, but not C (again, assuming in this example that there are no parents to A or B in the morpheme hierarchy).

The combination of explicit and implicit relationships in the morphemes thus may establish the rules for building hierarchical relationships between concepts.

As is known in the art, there are many ways to optimize these types of filtering and ordering functions. They include data management tools such as indices and caches. These refinements are well known in the art and will not be discussed further herein.

Modes of Synthesis Operations

Various modes of synthesis operation are possible for the method of faceted classification of the present invention. Synthesis may be varied to accommodate the individual requirements of different domains and end-user requirements. As described below, these modes may be defined as follows:

Static Synthesis Vs. Dynamic Synthesis

In one embodiment, a "static" faceted classification synthesis is provided in which the axes that define the dimensional concept hierarchies may be defined in advance. The resultant dimensional concept taxonomy may then be accessed as a static structure.

The advantage of the static mode of faceted classification synthesis is that the domain owners may organize the dimensional concept taxonomy to their exact specifications. End-users that access and consume the information contained within these static structures may thus benefit from the organizing knowledge of the domain owners. Static synthesis is thus particularly useful, for example, when the end-users of the information have little knowledge of the information contained within the domain.

In another embodiment, a system of "dynamic" faceted classification synthesis is provided in which dimensional concept hierarchies may be processed in near real-time, based directly on synthesis parameters provided for the end-users of the information. This dynamic mode of operation facilitates an incremental and purely "as-needed" assembly of information structures.

Dynamic processing may provide tremendous economies of information and storage benefits, obviating the need to create and store end-user structures in advance. More importantly, dynamic processing may allow end-users to precisely tailor the output to their requirements, providing personalization benefits. (Modes of synthesis operations are discussed in greater detail below.)

Yet another embodiment combines the modes of static and dynamic synthesis introduced above. Under this hybrid mode of synthesis, domain owners may provide a selection of axes definitions to provide a static "global" structure for the dimensional concept taxonomy. Within that global structure, dynamic synthesis may then be used to enable individual end-users to further tailor the structure to their needs. This hybrid mode thus combines benefits of both static and dynamic synthesis.

Limits on Concept Hierarchies and Content Nodes

As the size of the domain and facet hierarchy increases, the number of dimensional concept relationships that may be inferred may grow rapidly. Limits may be placed on the number of relationships generated.

The limit may be input by the user to set a maximum number of related concepts or associated content nodes in the resultant output hierarchy. For example, an administrator may configure the synthesis operations to stop processing after the system assembles the ten most closely related concepts into a hierarchy.

Varying Abstraction Levels

As described above in the description of the knowledge representation model and analysis operations, the attributes that comprise concept definitions may be defined to varying abstraction levels. One embodiment described herein provides for entities at the abstraction levels of concepts, keywords, and morphemes. Abstraction level changes in the attributes of concept definitions used in synthesis may affect a markedly different output of the synthesis operations.

Specifically, as attributes tend to the more fundamental, morphemic entities within the domain, more connections may be possible between the complex concepts that are defined using these attributes. Defining attributes in these morphemic terms therefore may provide for greater connections and more varied ways to organize the resultant synthesized output.

Conversely, as attributes tend to more abstract, complex entities such as keywords or complex concepts, the resultant synthesized structure may be more precise, having generally fewer connections but of a higher overall quality. Therefore, varying the abstraction level in the synthesis operations may allow administrators, domain owners, or end-users to tailor the information according to their individual requirements.

Scope of Domain Processing

In one embodiment, all content nodes in the domain may be examined and compared before a complete view of the dimensional concept taxonomy is generated. In other words, the system may discover all the content nodes in the domain that may be related before any inferences may be made about the direct hierarchical relationships between these related nodes.

The benefit of a complete examination of all content nodes in a domain is that it may provide an exhaustive exploration and discovery of the information within the domain. For high precision and recall requirements, this mode of synthesis may be appropriate. It is also often preferable for relatively smaller, clearly bounded domains.

In another embodiment, instead of analyzing the entire domain, a localized region of the domain may be analyzed based on the users' active focus. This localized analysis may be applied to materials whether or not they were analyzed previously as part of the training set. Parameters may be set by administrators to balance the depth of analysis with the processing time (latency).

For materials that were not analyzed as part of the training set, the system may use the operations of the localized analysis to classify materials under the enhanced faceted classification scheme derived from the training set materials.

Note that the operations of classifying a local subset of materials from the domain, as described in greater detail below, may also be used to classify new domains. In other words, the training set from one domain may be used as the basis for a constructive scheme to classify materials from a new domain, thus supporting a multi-domain classification environment.

Figure 21:
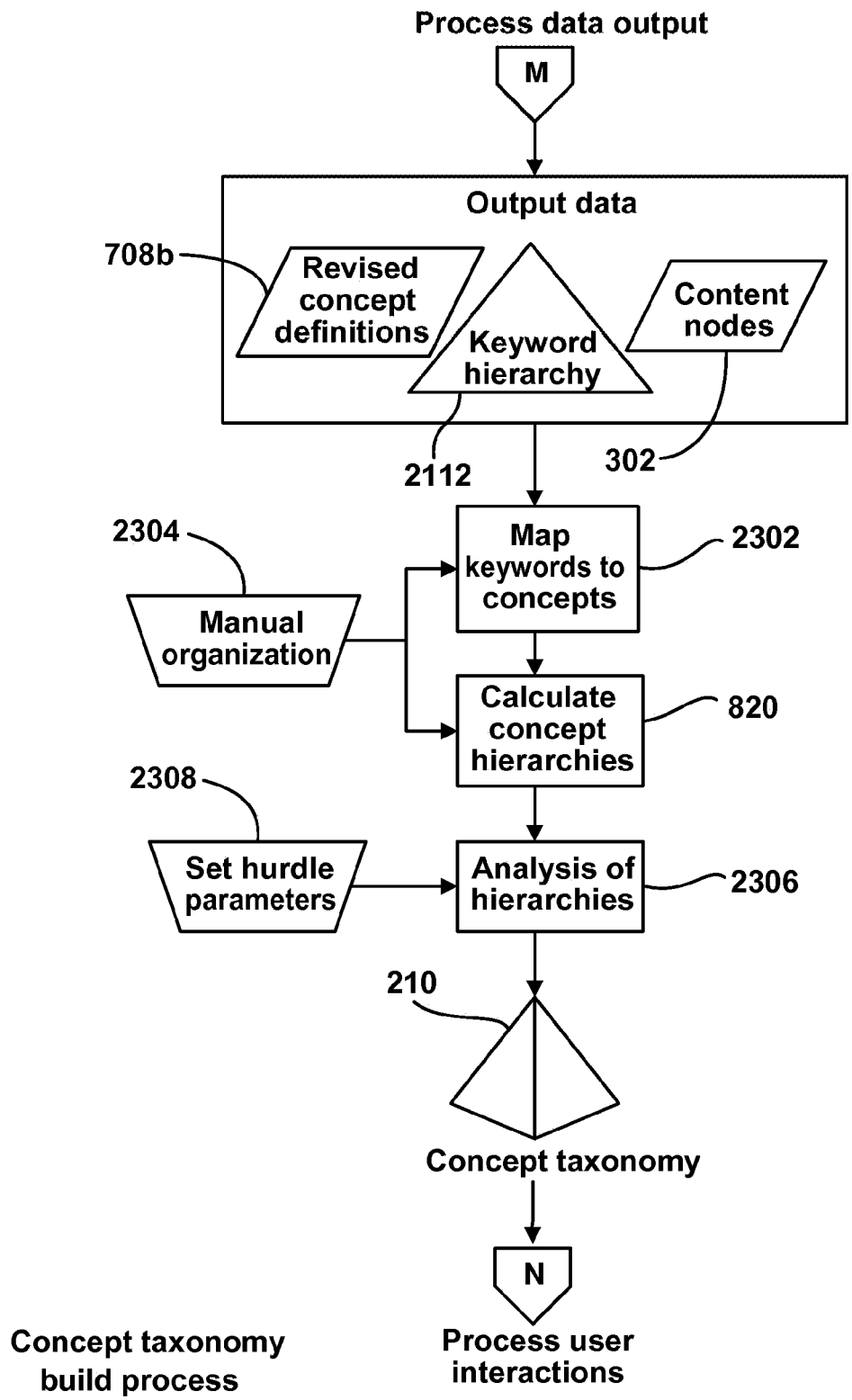

FIG. 21 illustrates various modes of synthesis in greater detail. Without limiting the scope of the present invention, these examples demonstrate the broad scope of synthesis options provided through the various modes. The benefit of this synthesis flexibility is to provide a system that may accommodate a vast array of domains and user requirements.

Static (Pre-Index) Synthesis

FIG. 21 illustrates the method of the present invention in one embodiment thereof by which the output data for the enhanced method of faceted classification may produce the dimensional concept taxonomy 210 to reorganize the domain. The output data may be generated M (as described above and illustrated in FIG. 17). The inputs for this method may be the revised concept definitions 2104, the keyword hierarchy 2112, and the content nodes 302 from the domain.

Each concept definition 708b may be mapped to keywords 2302 in the keyword hierarchy 2112. New dimensional concept relationships for the concepts may be generated 820 by the rules of the enhanced method of faceted classification, as described above and illustrated in FIGS. 3, 18-20.

Administrators of the information structure may prefer to manually adjust 2304 the results of the automatically generated dimensional concept taxonomy construction.

The operations may support these types of manual interventions but do not require user interactions for the fully automated operation.

An analysis 2306 may be used to assess the parameters of the resultant dimensional concept taxonomy. Again, statistical parameters may be set 2308 by the administrators as scaling factors for the dimensional concept taxonomy. They may also limit the complexity as negative feedback in the complex-adaptive system by reducing the scope of processing, and thus scale back the number of hierarchies that are incorporated.

The dimensional concept taxonomy 210 may be available for user interactions N, as described below and illustrated in FIG. 27.

Domain Subset (Scope-Limited) Synthesis

Figure 22:
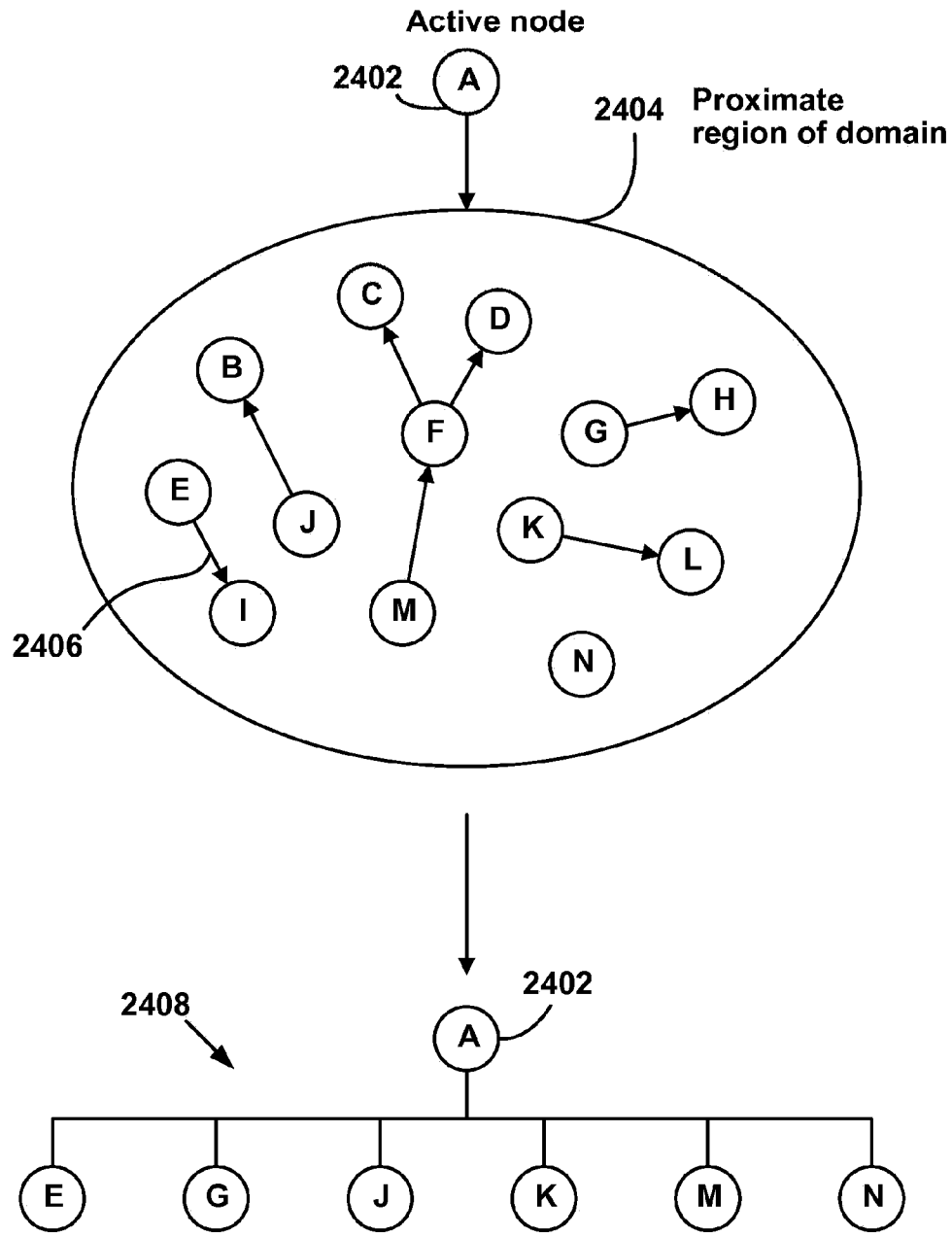

FIG. 22 illustrates the selection of content nodes from the domain and the ordering of those content nodes into dimensional concept hierarchies. A constrained view of the domain relative to active node 2402 may be taken. Rather than processing the entire domain, operations may perform a directed investigation of all content nodes (e.g. 2406) in the immediate proximity 2404 of the active node 2402.

Recursive Concept Hierarchy Assembly

In one embodiment, recursive algorithms may be useful to sub-divide this undifferentiated group of related content nodes into specific structural groups. A "candidate set" describes a set of concepts and associated content nodes that are related to the active concept definition, without regard to precisely how they are related. The groups may be described relative to an active concept or content node, as parents and children (hierarchical relationships), and siblings (associative relationships). The structural relationships described by these groups are well known in the art. These proximate concepts and associated content nodes may then be ordered into hierarchical relationships relative to the active concept, based on the underlying morpheme relationships and morphemes involved.

In FIG. 22, this hierarchy is illustrated as the subset of relationships between content nodes (e.g. 2406) within the candidate set of content nodes 2404. In the hierarchical tree 2408, those content nodes that are directly related to the active node 2402 (direct children) do not have any other parents within the candidate set 2404. The remaining content nodes in the candidate set may be positioned deeper in the hierarchy, as indirect children (descendents).

Applying One Domain Classification Scheme to a Second Domain

Figure 23:
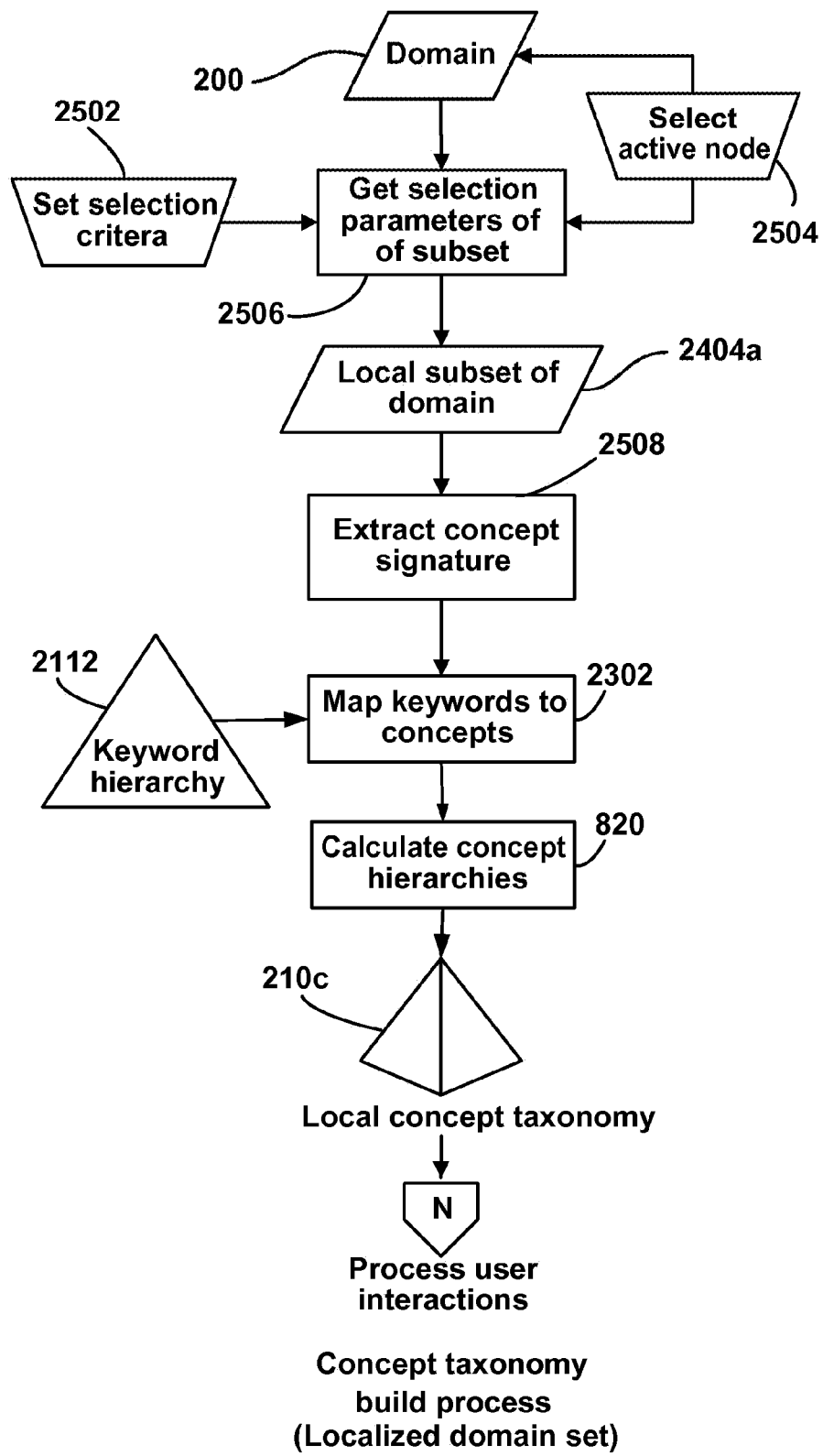
FIG. 23 illustrates a dimensional concept taxonomy build for a localized domain set.

FIG. 23 illustrates the operations of classifying a local subset of materials from the domain that were not part of the training set used to develop the faceted classification scheme.

From the domain 200 a local subset of the domain materials 2404a may be selected for processing. The materials may be selected based on selection criteria 2502 established by the domain owners. The selection may be made relative to the active node 2504 that is the basis for the localized region. The selection process may generate the parameters of the local subset 2506, such as a list of search terms that describe the boundaries of the local subset.

There are many possible selection criteria for the local set. In one embodiment, the materials may be selected by passing the concept definition associated with the active node to a full-text information retrieval (search) component to return a set of related materials. Such full-text information retrieval tools are well known in the art. In an alternate embodiment, an extended search query may be derived from the concept definition in the active node by examining the keyword hierarchy to derive sets of related keywords. These related keywords may in turn be used to extend the search query to include terms related to the concept definition of the active node.

The local subset of the domain 2404a derived from the selection process may comprise the candidate content nodes to be classified. For each candidate content node in the local subset, a concept signature may be extracted 2508. The concept signatures may be identified by the domain owners and may be used to map keywords 2302 in the domain-specific keyword hierarchy 2112 to provide concept definitions for each candidate content node. Again, the build component does not require that all keywords derived from the concept signatures are known to the system (as registered in the keyword hierarchy).

Concept hierarchies may be calculated 820 for the candidate content nodes using the build rules of implicit and explicit relationships described above. The end result may be a local concept taxonomy 210c, wherein the content nodes from the local subset of the domain are organized under the constructive scheme derived for that domain from the training set. The local concept taxonomy may then be available as an environment for user interactions to further refine the classification.

Dynamic (Real-Time) Synthesis

Figure 24:
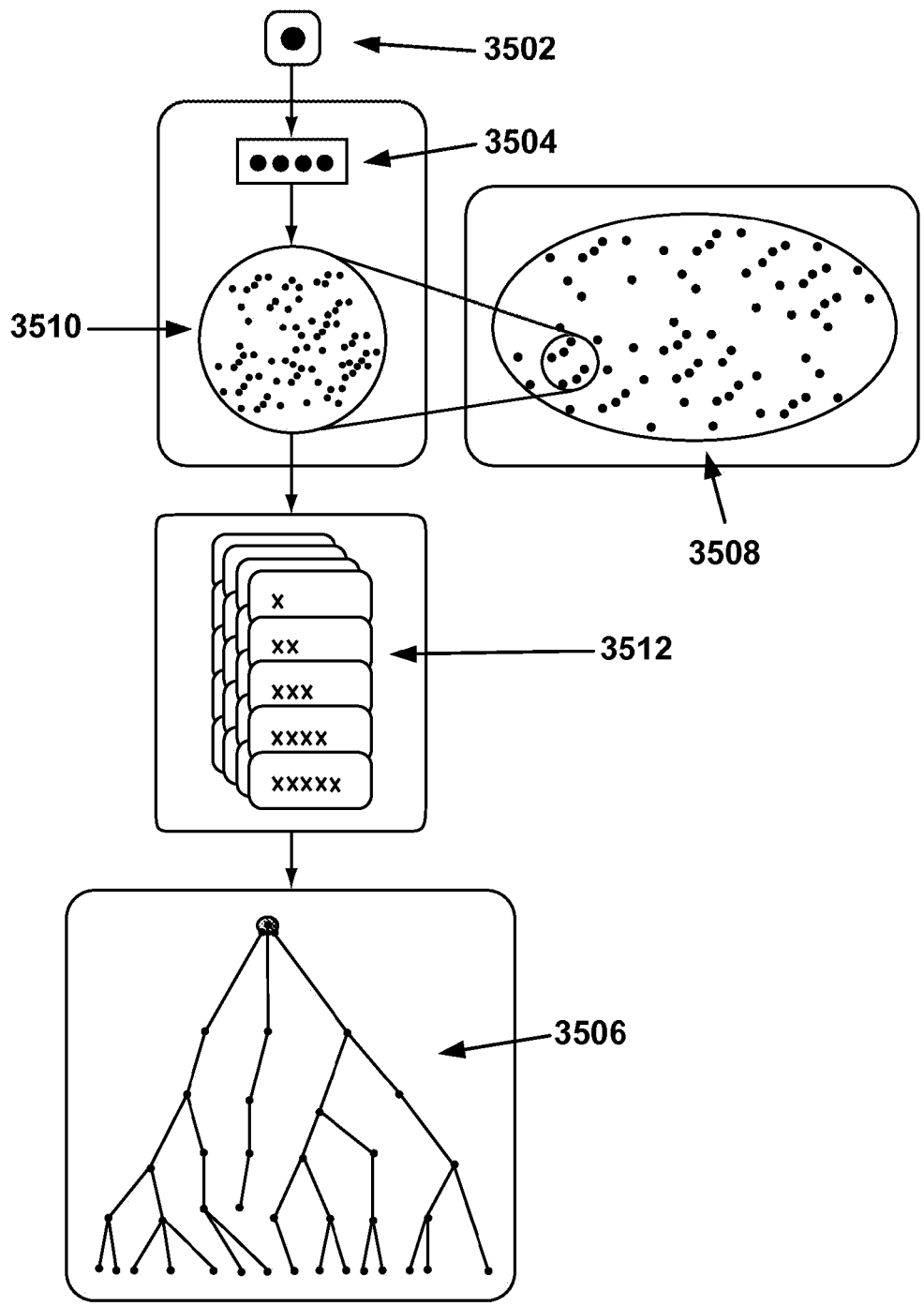
FIG. 24 illustrates a mode of dynamic synthesis.
Figure 25:
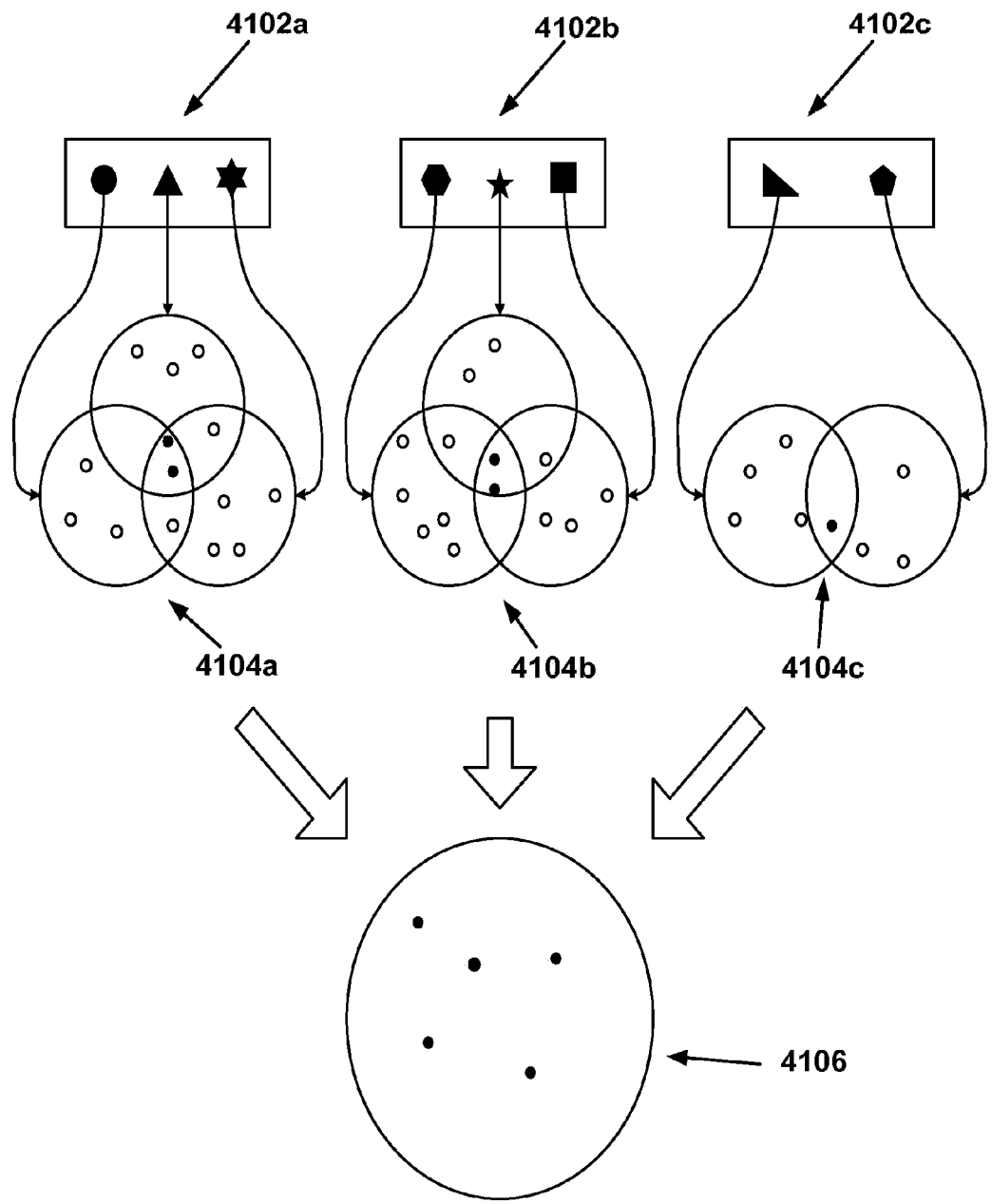
FIG. 25 illustrates a method of candidate set assembly for dynamic synthesis.

An alternate embodiment of the present invention uses a dynamic mode of synthesis, incorporating user preferences into the synthesis operations in real-time. FIGS. 24-25 and the description below provide greater detail on the operations within this mode of dynamic synthesis.

In FIG. 24, one embodiment of the mode of dynamic synthesis is illustrated in a broad overview. The dynamic synthesis process may follow a request-response model of operation. The dynamic synthesis operations are initiated by a user request 2402. The user may specify their requirements (for example, their domain of interest, their topic of interest as encoded by an active concept definition, their perspective on the topic as encoded by an axis definition, and the scope of their interest as constrained by a set of limiting synthesis parameters). In FIG. 24, these user parameters are represented schematically in simplified form as an active concept definition (a box) comprised of more elemental attributes inside (four dots) 2404.

Using this dynamic input from the user, the system then may return an associated hierarchy of concepts (an output concept hierarchy) 2406. This output concept hierarchy may then be the focus of further exploration by the user, or it can act as a bridge to yet another round of synthesis operations.

To process this request, the attribute set associated with the active concept definition may be the basis for locating the set of concepts from within the specified domain 2408 that will be used as the candidate set 2410 for the concept hierarchy that is synthesized. A "derivations" method 2412 is described below to relate those concepts to the active concept definition. The derivations may be dynamically sorted and used as a reference to construct a hierarchy of related concepts.

More details on the main steps and components of the mode of dynamic synthesis are provided next.

User-Initiated Synthesis Request

The dynamic synthesis operations are initiated by a user request 3502. To initiate the dynamic synthesis process, the user may provide a domain, an active concept definition and an axis definition. The user may also constrain the size and shape of the concept hierarchy via other input synthesis parameters, discussed below. There are many technical means to acquire this type of user input, as described below in the discussion of user interface system implementations.

Dynamic Synthesis Inputs and Synthesis Parameters

Thus, the inputs to the dynamic mode of synthesis may be comprised of the user-specific synthesis parameters and a domain-specific faceted data set. These inputs may constrain the synthesis operations to a narrowly honed field or subject area, to the precise requirements of the user. Details on the domain-specific faceted data set are provided above.

Run-Time Synthesis Parameters

As discussed above, one embodiment of dynamic synthesis may provide user inputs of the active domain, the active concept definition, and the active axis definition. In addition, users may describe their requirements further by providing a parameter stipulating degrees of separation and parameters that limit the output of the synthesis operations in terms of concepts and content nodes.

The degree of separation parameter specifies the maximum number of direct hierarchical steps from the active concept definition to a related concept definition in the output concept hierarchy.

For example, based on the build rules of the enhanced method of faceted classification, and given a representative active attribute set, {A, B, C}, the following attribute sets would be one degree of separation removed:

{A, B, C, ?}: all supersets with one additional element, where ? represents one other attribute {A, B}, {A, C}, {B,C}: all subsets based on implicit attribute relationships {D, B, C}, given A→D is an explicit attribute relationship Latency Latency is another parameter of synthesis that may be manipulated by end-users. In one implementation, a "ceiling" response time may be applied to the system such that synthesis operations are limited to a maximum time between a user's synthesis request and the build engine response and output to fill that request. Another embodiment of this latency control would allow end-users to increase or decrease the request-response time to tune the performance to match their individual information access and discovery requirements.

Candidate Set for Dynamic Synthesis

One embodiment of candidate set assembly for dynamic synthesis is illustrated in FIG. 25.

In dynamic synthesis, the attribute set of the active concept may be examined against the attribute hierarchy in order to find explicitly related ancestor and descendant attribute sets. More information on these examinations is provided above, under the description of synthesis (build) rules. Again, the entire domain need not be examined completely under this real-time mode of dynamic synthesis. The system only examines a subset of the domain as defined by the candidate set. The candidate set is found as follows:

Attribute sets which are subsets or which have elements that are explicit ancestors of those in the active attribute set, or both, may be considered. (These represent possible ancestor concepts.) Within each of these related attribute sets 2502a, 2502b, and 2502c, each attribute may have its own set of matching concepts definitions. The intersection set of these concept sets 2504a, 2504b, and 2504c for a given active concept definition attribute set may contain that attribute set's matching concepts (matching concepts are illustrated as solid dots; non-matching concepts as an open dot).

Separately, a similar process is conducted using related attribute sets which may be supersets or which have elements that are explicit descendants, or both, of those in the active attribute set, representing candidate descendant concepts. Here again, the intersection set of the concept sets for a related attribute set may contain that attribute set's matching concepts.

The union of the intersection sets from all the related attribute sets may be the candidate set. The related attribute sets may be constrained to the specified axis definition. Their number may also be subject to the specified maximum limits and degree of separation distance.

Derivations for Concept Hierarchy Assembly

Under a real-time mode of dynamic synthesis, latency may be a primary limiting factor. Specifically, there is very little time to process even a relatively small candidate set exhaustively. Static means of synthesis using recursive methods of concept hierarchy synthesis, as discussed above, are often misplaced in this dynamic environment due to the latency it may introduce for larger domains.

As such, one embodiment of dynamic synthesis uses a method of derivations to dynamically assemble concept hierarchies in real-time. The derivations are sets of operations that describe how the candidate concept is related to the active concept.

In addition to the performance and latency-reducing benefits introduced above, derivations introduce novel benefits of concept synthesis, namely the inference of new concept definitions as "virtual concepts", discussed below. These virtual concepts greatly extend the discovery benefits of the system by inferring new concepts, even if those new concepts are not yet associated with content nodes. These derivations also provide powerful sorting and filtering means as a user-configurable clustering mechanism.

The candidate set may be found from attribute sets related to the attribute set of the active concept. Explicitly related elements may be found from the attribute hierarchy in the faceted data set. Implicitly related attribute sets may be implied by set intersections (that is, the subsets and supersets of those attribute sets). The additional attributes used to find implicit descendant attributes, while in the domain, may or may not be known to the system.

The active attribute set may be paired with each of the attribute sets associated with the concepts in the candidate set. For each pair, a sequence of set operations may be derived which transforms the active attribute set into its paired set.

There are four derivation operations that may be performed on an attribute set in the process of trying to find related attribute sets. The operation types can be abbreviated as shown in Table 1.

TABLE 1

Derivation operation types

|  | To derive implicit relationships | To derive explicit relationships |
|---|---|---|
| with ancestors | d: delete an attribute | p: replace an attribute with a parent attribute |
| with descendants | a: add an attribute | c: replace an attribute with a child attribute |

Note that the directionality of all the attribute relationships must be consistent within pairs of potential concept relationships. Pairs of attribute sets may have ancestor relationships or descendant relationships between their elements, but not both.

The synthesis process preserves this directionality by only applying either ancestor operations (p, d) or descendant operations (c, a), not both, to establish a relationship between concepts. This prevents a concept from having all its attributes replaced with those corresponding to an unrelated concept.

For example, given an active concept with attributes {A, B, C} and a candidate concept with attributes {D, B, G, F}, there are three axes running through the definition of the active concept corresponding to its three attributes. To determine whether a relationship exists between the concepts, we could first use explicit relationships, such as an explicit relationship from A to D, and another from C to G. (These are both c operations: replacing an attribute with a child attribute.) Finally, using the implicit a operation of adding a descendant attribute (namely F) results in the active concept's attribute set matching that of the candidate descendant. Therefore we can say that the candidate is a descendant of the active concept.

To illustrate, when pairing the active and candidate attribute sets, there are three possible groups of attributes:
- Those associated with the candidate set only ("candidate-only" attributes)
- Those associated with both the candidate set and the active set ("both" attributes)
- Those associated with the active set only ("active-only" attributes)

If transforming the active set to the candidate set requires deleting "active-only" attributes, then the candidate set is an ancestor of the active set.

If the active set is the same as the candidate set, then the candidate set is a sibling of the active set.

If transforming the active set to the candidate set requires adding "candidate-only" attributes, then the candidate set is a descendant of the active set.

It is not valid to transform an active set to a candidate set by both deleting "active-only" attributes and adding "candidate-only" attributes, regardless of whether the two original sets already have attributes in common. Such a pair is deemed to be unrelated. The only exception to this is when attributes in the "only" sets are related in the attribute hierarchy. In such a case, we can perform one of two operations:

Replace an active set attribute with its parent attribute (with candidate sets that are ancestors of the active set)

Replace an active set attribute with its child attribute (with candidate sets that are descendants of the active set)

The resulting attribute is then a member of the "both" set.

At a given level, the order in which siblings are presented may be important. Those concepts more likely to be important to the user should have higher priority.

Each concept in the candidate set may have a unique derivation series connecting it to the active concept. The order in which derivations are sorted and dealt with by the synthesis affects the ordering of concepts in the result hierarchy. The priority of a candidate concept in the hierarchy is determined according to Table 2.

TABLE 2

Priority of derivations in determining result hierarchy

|  | Prevalence in candidate set | Prevalence in domain |
|---|---|---|
| Explicit operations (p, c) | 1 | 2 |
| Implicit operations (a, d) | 3 | 4 |

Response

In response to the requirements specified in the user's request, the application may return a concept hierarchy, built from concepts associated with objects within the domain, related to the active concept and along the axis. The user may refer to this concept hierarchy to find concepts related to the active concept they specified.

The derivations may be built into a hierarchical result set. Each node in that hierarchy represents a concept with an attribute set as its concept definition. Each edge in the hierarchy represents a single derivation operation.

Virtual Concepts

In some cases, the attribute set at a concept hierarchy node has no matching concepts. A virtual concept may be used as a placeholder to indicate this.

For example, given an attribute set {A, B, C}, if there is:
an explicit relationship A→D
an explicit relationship D→F
no concept with a {D, B, C} attribute set
then {F, B, C} would be in our candidate set with one degree of separation from {A, B, C}. If {D, B, C} attribute set has no corresponding concept, there is a virtual concept at this node in the hierarchy.

From within the active domain, the dynamic synthesis process may isolate and return a hierarchy of concepts related to the active concept. The related concepts may branch in both the ancestor (broader) and descendant (more specific) directions from the active concept, along the specified axis and as far as dictated.

Note that the data structure that derives the dimensional concept taxonomy 210 may be represented in many ways, for many purposes. In the description that follows, there is illustrated the purpose of end-user interactions. However, these structures may also be used in the service of other data manipulation technologies, for example as an input to another information retrieval or data mining tool (not shown).

Mechanisms of Complex-Adaptive Feedback

Figure 27:
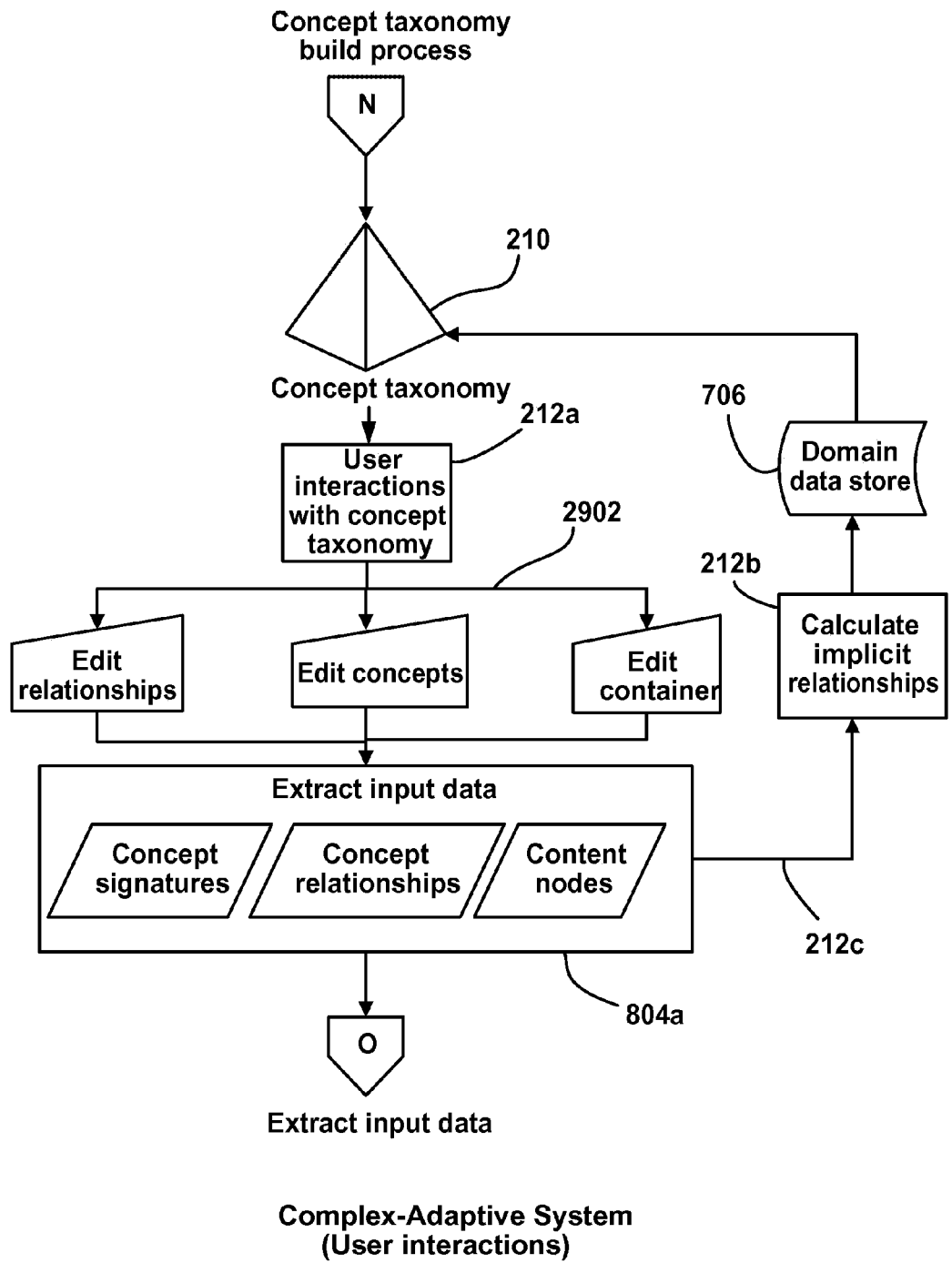
FIG. 27 illustrates a series of user interactions and feedback loops in the complex-adaptive system.

FIG. 27 illustrates the method for processing user interactions in a complex-adaptive system. It builds upon the dimensional concept taxonomy process described above N. User interactions may establish a series of feedbacks to the system. The adaptive process of refinement to the complex dimensional structures may be accomplished through the feedbacks initiated by end-users.

Figure 37:
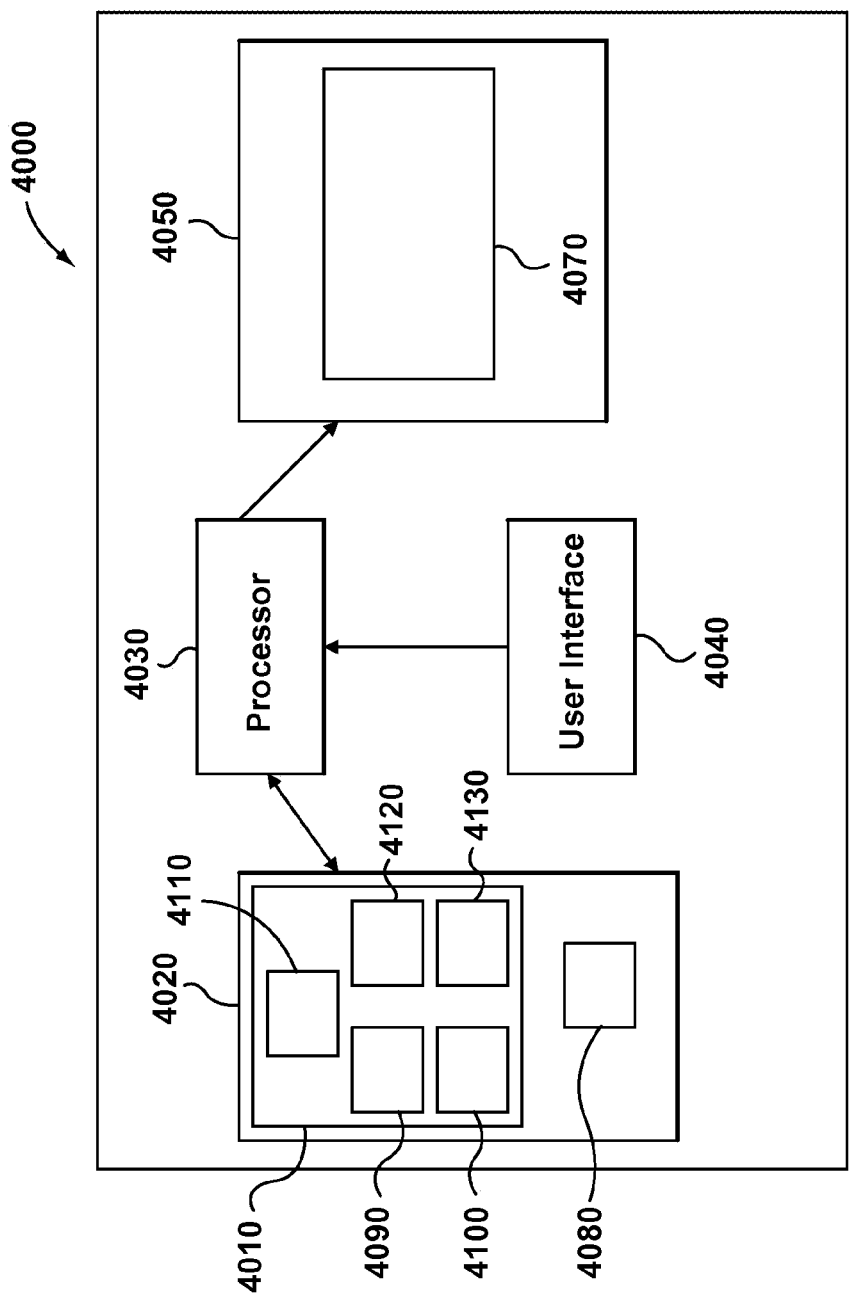
FIG. 37 illustrates a representative implementation of a computer system permitting manipulation of aspects of faceted classification information in accordance with the present invention.

FIG. 37 illustrates a possible implementation of a computer system 4000 permitting manipulation of aspects of faceted classification information in the form of one or more dimensional concept taxonomies 4010. The system 4000 may comprise a computer readable medium 4020, such as a disk drive or other form of computer memory, containing a computer program, software or firmware 4080 for executing the implementation, as well as aspects of the dimensional concept taxonomies, such as for example concept definitions 4090, hierarchical data 4100, content nodes 4110, definitions corresponding to content node 4120, or classifications 4130 of aspects of the dimensional concept taxonomy 4010 or ones of them. The system 4000 also may comprise a processor 4030, a user interface 4040, such as a keyboard or mouse, and a display 4050. In this implementation, the computer processor 4030 may access the computer readable medium 4020 and retrieve at least a portion of the dimensional concept taxonomy 4010 generated from source data and present the portion of the taxonomy 4010 on the display 4050. The processor 4030 may also input from an outside entity (user or machine) from the interface 4040 (optionally a user interface) reflecting user manipulation of aspects of the dimensional concept taxonomy 4010. The processor 4030 may incorporate the received outside entity manipulation of any one of the multitude of possible relationships found in the first dimensional concept taxonomy 4010 into a second dimensional concept taxonomy. The outside entity manipulation may be in the form of altering or adding data to the first dimensional concept taxonomy 4010, editing concept definitions, hierarchical data, changing position of content nodes associates with concepts relative to other content nodes associated with the concepts, altering definition describing the subject matter of a content node, or other changes to the faceted classification, for example. The second dimensional concept taxonomy may replace the first dimensional concept taxonomy 4010 entirely, exist completely alongside or apart from the first dimensional concept taxonomy 4010, reside as an exception table to the first dimensional taxonomy 4010, or the like. Further, accessibility to the second dimensional concept taxonomy may be limited to certain classes of outside entities, for example domain owners and administrators, subscribers, specific remote computer devices, etc.

The display 4050 may present aspects of the dimensional concept taxonomy 4010 in the form of processor controlled display window or editor 4070 that may be responsive to the interface 4040. The editor 4070 may also take the form of a web page, and may present content nodes and faceted classifications derived from the dimensional concept taxonomies 4010 or modifications thereof. The content nodes and faceted classifications shown by the editor may correspond to an active node selected by the outside entity, and may take the form of a tree fragment, for example. The editor 4070 may also present an editing functionality with which an outside entity may manipulate aspects of the dimensional concept taxonomy 4010 or introduce new elements, relationships and content. The editing functionality may also include a review interface permitting an outside entity to alter one or more morpheme groups associated with content of the node, as well as the position of a node in the dimensional concept taxonomy, to make them consistent with the content of the node.

Therefore, we may summarize the methods of the complex-adaptive process as follows:

Provide dimensional concept taxonomy as an environment for user interactions 212a. Once a dimensional concept taxonomy 210 has been presented to users, it may become an environment for revising existing data, as well as a source for new data (dimensional concept taxonomy information). The input data 804a comprised of the edits to existing data and the input of new data by users. It also provides for evolving and adapting the classifications to dynamic domains.

User interactions may comprise feedbacks to the system. Unique identifiers in the data elements in the dimensional concept taxonomy information may be uniquely identified using a notation system based on the morpheme elements stored in the centralized system. Thus, each data element in the dimensional concept taxonomies produced by the system may be identified in a way that can be merged back into the centralized (shared) morpheme lexicon.

Therefore, when users manipulate those elements, the contingent effects on the related morpheme elements may be tracked. These changes may reflect new explicit data in the system, to refine any of the inferred data automatically generated by the system. In other words, what was originally inferred by the system may be reinforced or rejected by the explicit interactions of the end-users.

User interactions may comprise both new data sources and revisions to known data sources. Manipulations to known elements may be translated back to their morpheme antecedents. Any data elements that are not recognized by the system may represent new data. However, since the changes are made in the context of the existing dimensional concept taxonomy produced by the system, this new data may be placed in the context of known data. Thus, any new data elements added by users may be provided in the context of the known elements. The relationships between the known and the unknown may greatly extend the amount of dimensional concept taxonomy information that may be inferred from the users' interactions.

A "shortcut" feedback 212c in the system may provide a real-time interactive environment for end-users. The taxonomy and container edits 2902 initiated by the user may be queued in the system and formally processed as system resources become available. Users, however, may require (or prefer) real-time feedback to their changes to the dimensional concept taxonomy. The time required to process the changes through the system's formal feedbacks may delay this real-time feedback to the user. As a result, one embodiment of the system provides a shortcut feedback.

This shortcut feedback may begin by processing user edits against the domain data store 706 as it exists at that time. Since the users' changes may include dimensional concept taxonomy information that does not presently exist in the domain data store, the system must use a process that approximates the effect of the changes.

The rules for creating implicit relationships 212b (described above) may be applied to new data as a short-term surrogate for full processing. This approach allows users to immediately insert and interact with the new data.

As opposed to the dimensional concept relationships calculated through the system's formal processes, this approximation process may use the presence of morphemes unknown to the system in sets of known morphemes to qualify and adjust the dimensional concept relationships of the known morphemes in the set. These adjusted relationships are described as "implicit relationships" 216, described in greater detail above.

For new data elements, short-term concept definitions may be assigned based on implicit relationships (described above) to facilitate real-time processing of the interactions. At the completion of the next full processing cycle for the domain, the short-term implied concept definitions may be replaced with the complete concept definitions devised by the system.

Those skilled in the art will appreciate that there are many algorithms that may be used to approximate the influence of unknown morphemes on the relationships of known morphemes in the system.

Provide User Interactions

The dimensional concept taxonomy provides an environment for user interactions. In one embodiment of the present invention, there may be provided two main user interfaces. A navigation "viewer" interface may provide for browsing the faceted classification. This interface may be of a class known as "faceted navigation". The other interface may be known as an "outliner", which may allow end users to change the relationship structure, concept definitions, and content node assignments.

The general features of faceted navigation and outliner interfaces are well known in the art. Novel aspects described herein below, particularly as they related to the complex-adaptive system 212, will be apparent to those of skill in the art.

Viewing the Concept Taxonomy

The dimensional concept taxonomy may be expressed through the presentation layer. In one embodiment, the presentation layer is a web site. The web site may be comprised of web pages that render a set of views of the dimensional concept taxonomy. The views are portions (e.g. a subset of the polyhierarchy filtered by one or more axis) of the dimensional context taxonomy within the scope of an active node. The active node in this context is a node within the dimensional concept taxonomy that is presently in focus by the end-user or domain owner. In one embodiment, a "tree fragment" is used to represent these relationships.

Users may provide text queries to the system to move directly to the general area of their search and information retrieval. Views may be filtered and sorted by the facets and attributes that intersect with each concept, as is well known in the art.

Content nodes may be categorized by each concept. That is, for any given active concept, all content nodes that match the attributes of that concept as filtered by the user may be presented.

The "resolution" of each view may be varied around each node. This refers to the breadth of relationships displayed and the exhaustiveness of the survey. The issue of the resolution of the view may also be considered in the context of the size and selection of the domain portion that is analyzed. Again, there is a trade-off between the depth of the analysis and the amount of time it takes to process (latency). The presentation layer may operate to select a portion of the domain to be analyzed based on the location of the active node, the resolution of the view, and parameters configured by administrators.

In one embodiment, the interactions of viewing the dimensional concept taxonomy, operating the mode of dynamic synthesis (as discussed above), may generate feedback for the complex-adaptive system of the invention. Under these conditions, implicit feedback generated through the interactions of viewing would be essentially transparent from the perspective of the end-user. In other words, end-users would create valuable feedback for the system by the mere interactions of viewing the dimensional concept taxonomy.

There are many benefits of this transparent user-generated feedback. End-users would not have to expend the effort required for direct edits to the dimensional concept taxonomy (as discussed in detail below). Further, since under this mode of dynamic synthesis, only dimensional concept hierarchies that are requested by users comprise the dimensional concept taxonomies that are returned as feedback for subsequent analysis operations. This narrower set of feedback, constrained to only the information that is actually requested by end-users, has the effect of improving the quality of feedback data generated by the system.

Editing the Concept Taxonomy

The presentation layer distils the dimensional structure down to simplified views (such as web pages that include links to related pages in the dimensional concept taxonomy) that are necessary for human interaction. As such, the presentation layer may also double as the editing environment for the informational structures from which it is derived. In one embodiment, the user is able to switch to editing mode from within the presentation layer to immediately edit the structures.

An outliner provides the means for users to manipulate hierarchical data. The outliner also allows users to manipulate the content nodes that are associated with each concept in the structure.

User interactions may alter the context and/or the concepts assigned to the nodes in the dimensional concept taxonomy. Context refers to the position of a node relative to the other nodes in the structure (that is, the dimensional concept relationships that establish structure). Concept definitions describe the content or subject matter of the node, expressed as collections of morphemes.

The user may be presented with a review process in one embodiment, to enable the user to confirm the parameters of such user's edits. The following dimensional concept taxonomy information may be exposed to the user for this review: 1) the content of the node; 2) the morpheme groups (expressed as keywords) associated with the content; and 3) the position of the node in the taxonomic structure. The user may alter the parameters of the latter two (morphemes and relative positioning) to make the information consistent with the first (the content at that node).

Thus, interactions in one embodiment of the invention may be summarized as some combination of two broad types: a) container edits; and b) taxonomy edits.

Container edits are changes to the assignment of content containers (such as URL addresses) to the content nodes that are classified within the dimensional concept taxonomy. Container edits are also changes to the descriptions of the content nodes within the dimensional concept taxonomy.

Taxonomy edits are context changes to the position of the nodes in the dimensional concept taxonomy. These changes include the addition of new nodes into the structure and the repositioning of existing nodes. This dimensional concept taxonomy information may be fed back into the system as changes to the morpheme relationships that are associated with the concepts that are affected by the user interactions.

With taxonomy edits, new relationships between concepts in the taxonomy may be created. These concept relationships may be constructed through the user interactions. Since these concepts are based on morphemes, new concept relationships may be associated with new sets of morpheme relationships. This dimensional concept taxonomy information may be fed back into the system to recalculate these implied morpheme relationships.

User interactions may also be provided at more elemental levels of abstraction, such as keywords and morphemes.

Figure 26:
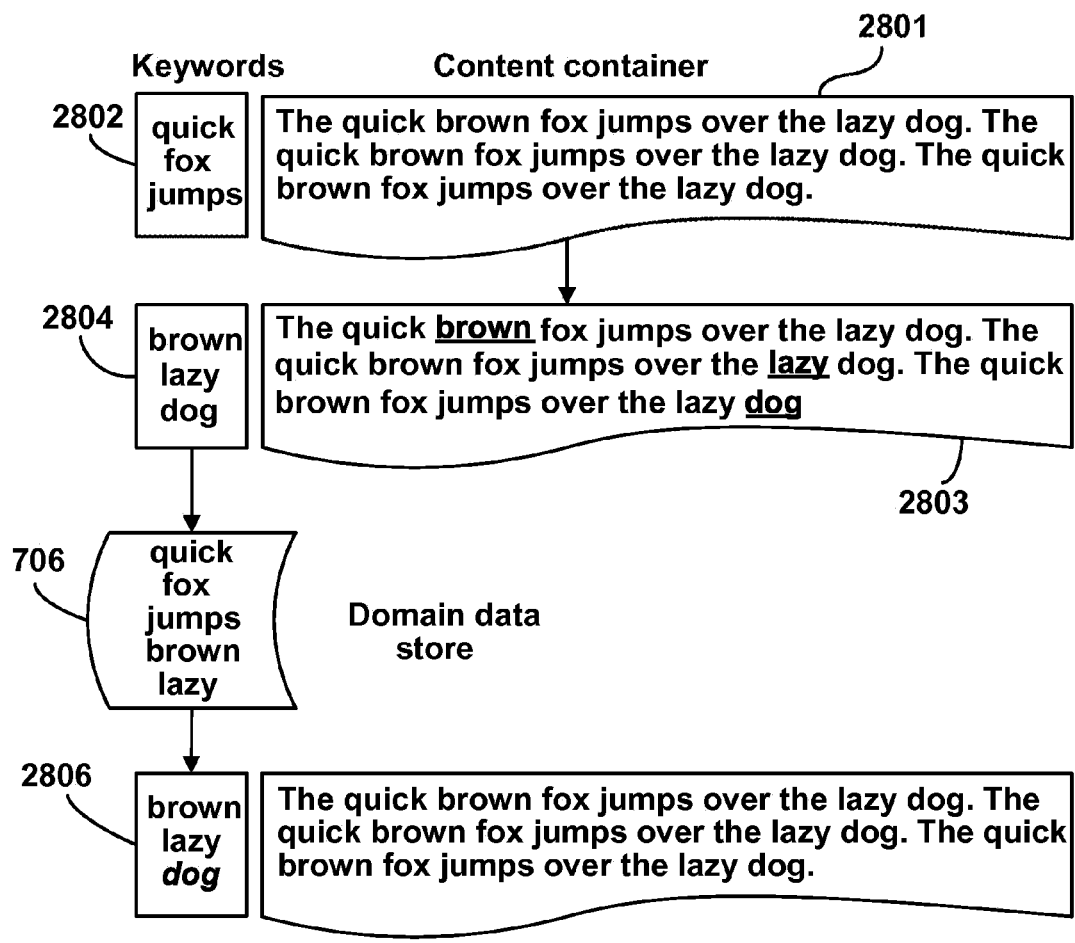
FIG. 26 illustrates a process of user interactions that edit content containers within the dimensional concept taxonomy.

FIG. 26 illustrates one embodiment of the process of container edits. Container edits are changes to the concept definitions and the underlying morphemes that describe each content node. With these changes, users may alter the underlying concept definition of a content node. In so doing, they may alter the morphemes that are mapped to the concept definitions at these content nodes.

The user interactions may construct the concept definition assigned to the content node, expressed as a collection of keywords. In this construction, the user may interact with the system's morpheme lexicon and domain data store. Any new keywords that are created here may be sent to the system's morpheme extraction process, as described above.

In this example, a document 2801 is the active container. In the user interface, the set of keywords 2802 that describe the content may be presented to the user along with the document. (The relative position of this node in the dimensional concept taxonomy is not shown here to simplify the example.)

In the example, as the user reviews the content, the user may determine that the keywords associated with the page are not optimal. New keywords may be selected by the user to replace the set that loaded with the page 2803. The user may update the list of keywords 2804 as the new concept definition associated with the document.

These changes may then be passed to the domain data store 706. The data store may be searched to identify all keywords registered in the system.

In this example, the list includes all keywords identified by the user, with the exception of "dog". As a result, "dog" will be processed as an implicit keyword that modifies the explicit keywords that are registered in the system 2806.

The implicit keywords may be analyzed in full when the domain is reviewed by the centralized transformation engine. It may then be replaced by an explicit keyword (either as an existing keyword or a new keyword) and associated with one or more morphemes.

Personalization

Figure 28:
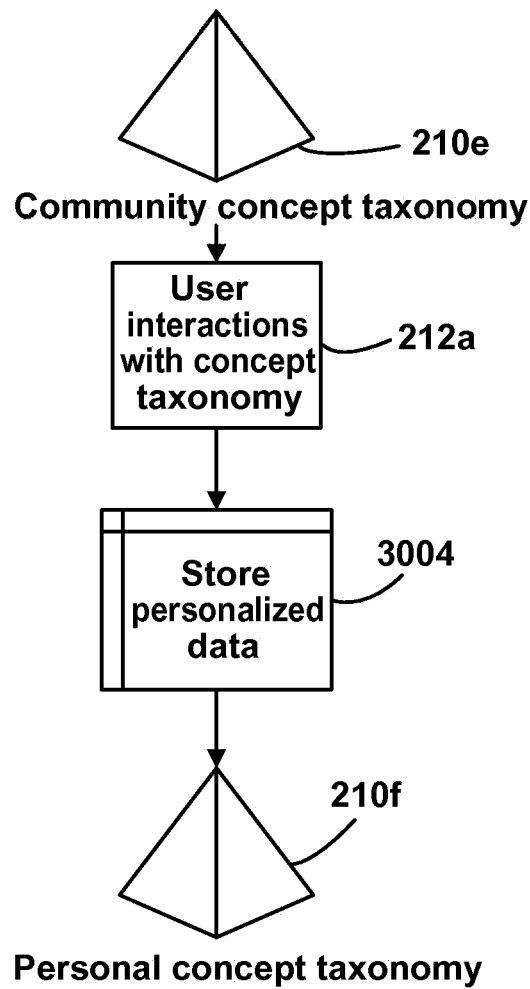
FIG. 28 illustrates operations of personalization.

FIG. 28 illustrates an alternate embodiment of the invention which provides for features of personalization, wherein personalized versions of the dimensional concept taxonomy may be maintained for each individual user of the domain.

One embodiment of personalization provides the means to personalize the community concept taxonomy 210*e*, along with a personalized concept taxonomy 210*f* for each individual user. The first time an end-user interacts with the system, each end-user may be engaging the community concept taxonomy 210*e*. Following interactions may engage the user's personalized view of the taxonomy 210*f*.

Data structures are "personalized" by collating a unique representation of the data structure in response to user interactions 212*a* representing the preferences of each end user. The results of the edits may be stored as the personalized data from the user interactions 3004. In one embodiment, these edits are stored as "exceptions" to the community concept taxonomy 210*e*. When the personal concept taxonomy 210*f* is processed, the system may substitute any changes it finds in the users' exceptions table.

The elements illustrated may identify the collaborators in the system's complex-adaptive processes. It provides a means to associate unique identifiers with each user and store their interactions.

In another embodiment, the system may assign unique identifiers to each user that interacts with the dimensional concept taxonomy 210*e* through the presentation layer. These identifiers may be considered as morphemes. Every user may be assigned a globally unique identifier (GUID), preferably a 128-bit integer (16 bytes) that can be used across all computers and networks. The user GUID exists as a morpheme in the system.

Like any other morpheme in the system, the user identifiers may be registered in the morpheme hierarchy (explicit morphemes) or unknown to the system (implicit morphemes).

The distinction between the two types of identifiers is akin to the distinction between registered and anonymous visitors, in terms that are well known in the art. The various ways that may be used to generate and associate identifiers (or "trackers") with users are also well known in the art, and will not be discussed herein.

When a user interacts with the system (for example, by editing a content container), the system may add that user's identifier to the set of morphemes that describe the concept definition. The system may also add one or more morphemes that are associated with the various types of interactivity the system supports. For example, the user "Bob" may wish to edit the container with the concept definition, "recording, studio" to include a geographic reference. The system may thus create the following concept definition record for that container, specific to Bob: {Bob, Washington, (recording, studio)}.

With this dimensional concept taxonomy information, the system could present the container in a manner specific to the user, Bob, by applying the same rules of explicit and implicit relationship calculations in the enhanced method of faceted classification described above. The container may appear on the personal Web page for Bob. In his personal concept taxonomy, the page would be related to resources in Washington.

The dimensional concept taxonomy information would also be available globally to other users, as well, subject to the statistical analyses and hurdle rates established by the administrators as a negative feedback mechanism. For example, if enough users identified the location of Washington with the recording studio, it would eventually be presented to all users as a valid relationship.

This type of modification to the concept definitions associated with the content container essentially adds new layers of dimensionality to the dimensional concept taxonomy information representing the various layers of user interactivity. It provides a versatile mechanism for personalization using the existing constructive processes applied to other forms of information and content.

As is well known in the art, there are many technologies and architectures available for adding personalization and customized presentation layers. The method discussed herein makes use of the system's core structural logic to organize collaborators. It essentially treats user interactions as just another type of informational element, illustrating the flexibility and extensibility of the system. It does not, however, limit the scope of the invention in the various methods for adding customization and personalization to the system.

Machine-Based Complex-Adaptive System

Figure 29:
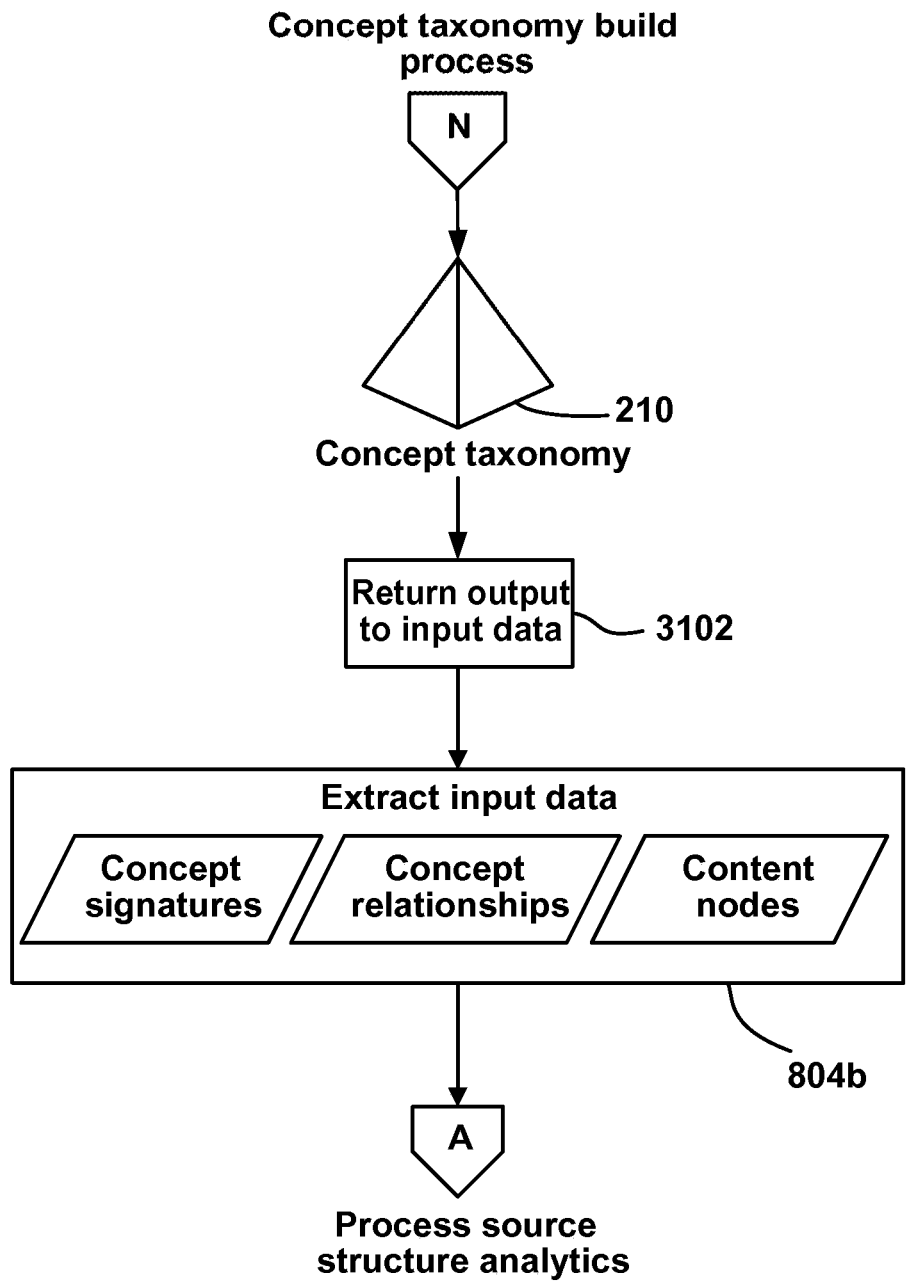
FIG. 29 illustrates operations of a machine-based complex-adaptive system.

FIG. 29 illustrates an alternate embodiment that provides a machine-based means for providing a complex-adaptive system, wherein the dimensional concept relationships that comprise the dimensional concept taxonomy 210 are returned directly back into the transformation engine processes 3102 as system input data 804b.

It is noted in this regard that the present invention provides the ability of an end-user to create and manage data structures as described in this disclosure. In certain aspects of the present invention, the end-user provides feedback, which further informs the creation and management of the data structures as explained herein. This feedback may be provided no only by an end-user, but also for example a machine such as a computer that collects feedback from an end-user or even a machine such as a computer without human involvement at all. In this context, the role of an end-user or machine is referred to in this disclosure as a "feedback agent". It should also be noted that a number of examples provided in this disclosure refer to an end-user for sake of illustration, but it should be understood that in many if not all of these cases a machine such as a computer could replace the role of the end-user. This sub-heading illustrates such an implementation. Accordingly, the present disclosure should be read such that the references to an "end-user" may be read in many if not all cases to refer to a "feedback agent".

Note that there is an important distinction between the original concept relationships derived from the source data structure and the dimensional concept relationships that emerge from the processes of the system build engine. The former are explicit in the source data structure; the latter are derived from (or emerge through) the constructive methods applied against elemental constructs within the morpheme lexicon. Thus, the machine-based approach, like the complex-adaptive system based on user interactions, may provide a means for introducing variation in the system operations 800 through the synthesis of (complex) dimensional concept relationships from elemental constructs, and then selecting from that variation in the source structure analytics component.

Under this machine-based mode of operation, the selection requirement for the complex-adaptive system may be borne by the source structure analytics component (described above and illustrated in FIG. 6). Specifically, dimensional concept relationships may be selected based on the identification of circular relationships 1002 and the various modes and parameters that may be used to resolve these circular relationships. As is well known in the art, there are many alternate means, selection criteria, and analytical tools to provide for a machine-based complex-adaptive system.

Dimensional concept relationships that contravene the assumptions of hierarchy, identified in the aggregate through the presence of circular relationships, may be pruned from the data set 1004. This pruned data set may be reassembled 1006 into an input concept taxonomy 1008, from which the operations 800 may derive a new set of elemental constructs through the remaining operations of the analysis engine.

This type of machine-based complex-adaptive system may be used in conjunction with other complex-adaptive systems, such as the system 212 based on user interactions, described above with reference to FIGS. 4 and 27. For example, the machine-based complex-adaptive system of FIG. 30 may be used to refine the dimensional concept taxonomy through several iterations of the process. Thereafter, the resultant dimensional concept taxonomy may be introduced to users in the user-based complex-adaptive system for further refinement and evolution.

Implementation

As emphasized throughout this description of the system architecture, there is much variability in the methods and technologies for engineering the many embodiments of this invention, including data stores. The many applications of the invention may be exposed and varied through the many forms of architectural engineering that are well known in the art.

System Architecture Components

Computing Environment

Figure 30:
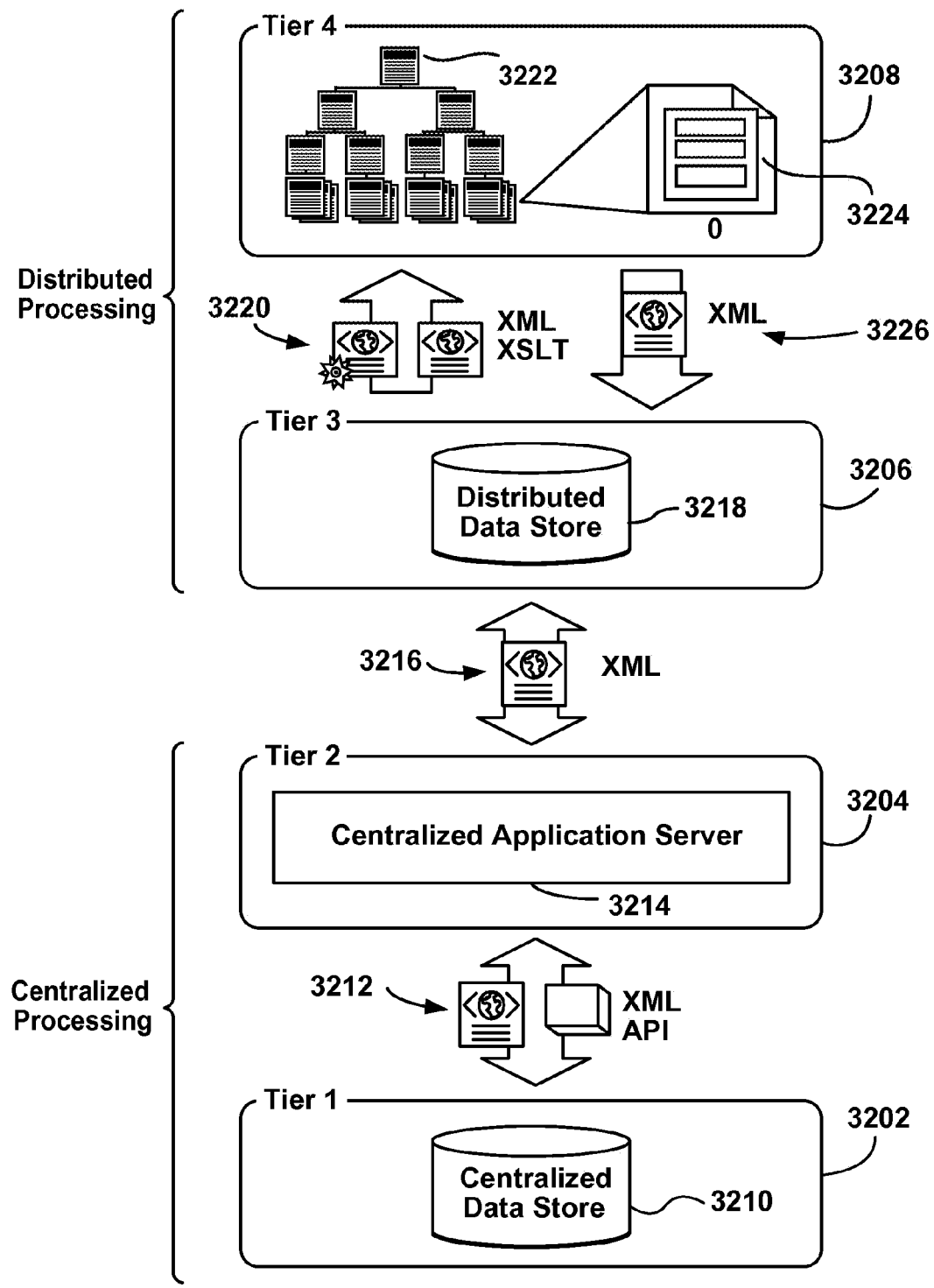
FIG. 30 illustrates a computing environment and architecture components for a system for executing the operations in accordance with an embodiment.

FIG. 30 illustrates one embodiment of a computing environment for the invention.

In one embodiment, the present invention may be implemented as a computer software program operating under a four-tier architecture. Server application software and databases may execute on both centralized computers and distributed, decentralized systems. The Internet may be used to as the network to communicate between the centralized servers and the various computing devices and distributed systems that interact with it.

The variability and methods for establishing this type of computing environment are well known in the art. As such, no further discussion of the computing environment is contained herein. What is common to all applicable environments is that the user accesses a public or private network, such as the Internet or a company's intranet, through his or her computer or computing device, thereby accessing the computer software that embodies the invention.

Service Tiers

Each tier may be responsible for providing a service. Tiers one 3202 and two 3204 operate under a model of centralized processing. Tiers three 3206 and four 3208 operate under a model of distributed (decentralized) processing.

This four-tier model realizes the decentralization of private domain data from the shared centralized data that the system uses to analyze domains. This delineation between shared and private data is discussed below, illustrated in FIG. 33.

At the first tier, a centralized data store represents the various data and content sources that are managed by the system. In one embodiment, a database server 3210 may provide data services, and the means of accessing and maintaining the data.

Although the distributed content is described here as being contained within a "database", data may be stored in a plurality of linked physical locations or data sources.

Metadata may also be decentralized and stored externally from the system database. For example, HTML code fragments that contain metadata that may be acted upon by the system. Elements from the external schema may be mapped to the elements used in the schema of the present system. Other formats for presenting metadata are well known in the art. The informational landscape may thus provide a wealth of distributed content sources and a means for end-users to manage the information in a decentralized way.

The techniques and methods for managing data across a plurality of linked physical locations or data sources is well known in the art, and will not be further exhaustively discussed herein.

XML data feeds and application programming interfaces (API) 3212 may be used to connect the data store 3210 to the application server 3214.

Again, those skilled in the art understand that the XML may conform to a broad range of proprietary and open schema. A range of data interchange technologies provide the infrastructure to incorporate a variety of distributed content formats into the system. This and all following discussion of the connectors used in one embodiment do not limit the scope of the present invention.

At the second tier 3204, an application that resides on a centralized server 3214 may contain the core programming logic for the invention. The application server may provide the processing rules for implementation the various aspects of the method of the present invention, along with connectivity to the database server. This programming logic is described in detail above, illustrated in FIGS. 4-17 and 20-23.

In one embodiment, the structural information processed by the application server may be output as XML 3216. XML may be used to connect external data stores and Web sites with the application server.

Again, XML 3216 may be used to communicate this interactivity back to the application server for further processing in an ongoing process of optimization and refinement.

At the third tier, a distributed data store 3218 may be used to store domain data. In one embodiment, this data may be stored in the form of XML files on a web server. There are many alternate modes of storing the domain data such as external databases. The distributed data store may be used to distribute the output data to presentation devices of end users.

In one embodiment, the output data may be distributed as XML data feeds, rendered using XSL transformation files (XSLT) 3220. These technologies may render the output data through a presentation layer at the fourth tier.

The presentation layer may be any decentralized web sites, client software, or other media that presents the taxonomies in a form that may be utilized by humans or machines. The presentation layer may represent the outward manifestation of the taxonomies and the environments through which end-users interact with the taxonomies. In one embodiment, the data may be rendered as a web site and displayed in a browser.

This structured information may provide the platform for user collaboration and input. Those skilled in the art will appreciate that XML and XSLT may be used to render information across a diverse range of computing platforms and media. This flexibility allows the system to be used as a process within a broad range of information processing tasks.

For example, morphemes may be expressed using the keywords in the data feed. By including the morpheme references in the data feed, the system may provide for additional processing on the presentation layer in response to specific morphemic identifiers. An application of this flexibility is described above in the discussion of personalization (FIG. 28).

Using web-based forms and controls 3224, users may add and modify information in the system. This input may then be returned to the centralized processing systems via the distributed data store as XML data feeds 3226 and 3216.

Additionally, open XML formats such as RSS may also be incorporated from the Internet as inputs to the system.

Modifications to the structural information may be processed by the application server 3214. Shared morpheme data from this processing may be returned via XML and API connectors 3212 and stored in the centralized data store 3210.

Within the broad field of system architecture, there are many possible designs, modes, and products, which are well known. These include centralized, decentralized, and open access models of system architecture. The technical workings of these implementations and the various alternatives that are covered by this invention will not be further discussed herein.

Data Model and Schema

Figure 31:
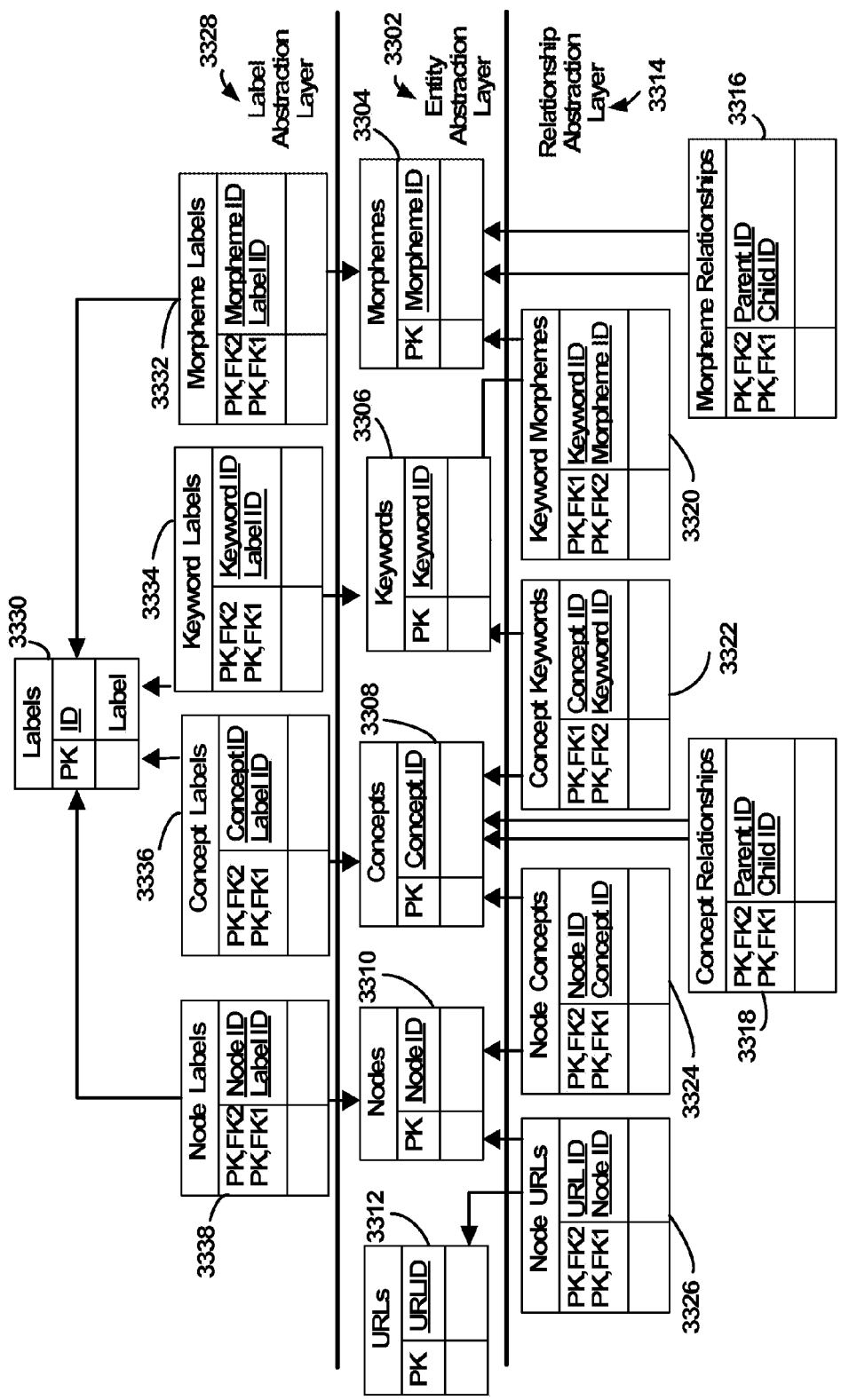
FIG. 31 illustrates a simplified data schema in one embodiment.

FIG. 31 provides a simplified overview of the core data structures within the system in one embodiment of the invention. This simplified schema illustrates the manner in which data may be transformed through the system's application programming logic. It also illustrates how the morpheme data may be deconstructed and stored.

The data architecture of the system was designed to centralize the morpheme lexicon, while providing temporary data stores for processing domain-specific entities.

Note that domain data may flow through the system; it may be not stored in the system. The tables that map to the domain entities may be temporary data stores, which are then transformed to the output data and the data store for the domain. The domain data store may be stored along with the other centralized assets or distributed to storage resources maintained by the domain owner.

In one embodiment, the application and database servers (described above and illustrated in FIG. 30) may primarily manipulate data. The data may be organized within three broad areas of data abstraction in the system:

The entity abstraction layer 3302, where entities are the main building blocks of knowledge representation in the system. Entities may be comprised of: morphemes 3304, keywords 3306, concepts 3308, content nodes 3310, and content containers 3312 (represented by URLs).

The relationship layer of abstraction 3314, where entity definitions are represented by the relationships between the various entities used in the system. Entity relationships may be comprised of morpheme relationships 3316, concept relationships 3318, keyword-morpheme relationships 3320, concept-keyword relationships 3322, node-concept relationships 3324, and node-content container (URL) relationships 3326.

The label abstraction layer 3328 is where the terms used to describe entities are separated from the structural definitions of the entities themselves. Labels 3330 may be comprised of morpheme labels 3332, keyword labels 3334, concept labels 3336, and node labels 3338. Labels may be shared across the various entities. Alternatively, labels may be segmented by entity type.

Note that this simplified schema in no way limits the database schema used in one embodiment. Issues of system performance, storage, and optimization figure prominently. Those skilled in the art know that there are many ways to design a database system that reflects the design elements described herein. As such, the various methods, technologies, and designs that may be used as embodiments in the present will not be discussed further herein.

Dimensional Transformation System

FIG. 32 illustrates a system overview in accordance with one embodiment to execute the operations of data structure transformation described above and further herein below.

The three broad processes of transformation introduced above may be restated in more detailed terms, as they present in one embodiment: 1) the analysis and compression of domain 200 to discover facets of its structure, as defined in terms of the elemental constructs in the complex dimensional structure; 2) the synthesis and expansion of the complex dimensional structure of the domain into the dimensional concept taxonomy 210, provided through an enhanced method of faceted classification; and 3) the management of user interactions within the dimensional concept taxonomy 210, through a faceted navigation and editing environment, to enable the complex-adaptive system that refines the structures (e.g. 206 and 210) over time.

Analysis of Elemental Constructs

In one embodiment, a distributed computing environment 600 is shown schematically. One computing system for centralized processing 601 may operate as a transformation engine 602 for data structures. The transformation engine may take as its inputs the source data structures 202 from one or more domains 200. The transformation engine 602 may be comprised of an analysis engine 204a, a morpheme lexicon 206, and a build engine 208a. These system components may provide the functionality of analysis and synthesis introduced above and illustrated in FIG. 2.

In one very specific embodiment, the complex dimensional structure may be encoded into XML files 604 that may be distributed via web services (or API or other distribution channels) over the Internet 606 to one or more second computing systems for decentralized processing (e.g. 603). Through this and/or other modes of distribution and decentralization, a wide range of developers and publishers may use the transformation engine 602 to create complex dimensional structures. Applications include web sites, knowledge bases, e-commerce stores, search services, client software, management information systems, analytics, etc.

Note here that these descriptions of centralized and decentralized processing should not be confused with the various centralized and distributed physical systems that may be used to provide for these modes of processing. Here, "centralized processing" refers to the shared, public, and/or collective data and services for the transformation process. "Decentralized processing" refers to domain-specific data and services. As is well known in the art, there are a multitude of physical systems and architectures that may be implemented to realize this mix of centralized and decentralized processing.

Synthesis Through Enhanced Faceted Classification

The complex dimensional structures embodied in the XML files 604 may be available as the bases for reorganizing the content of domains. In one embodiment, an enhanced method of faceted classification may be used to reorganize the materials in the domain, deriving the dimensional concept taxonomy 210 at a second computing system 603 using the complex dimensional structures embodied in the XML files 604. Typically, second computing systems like system 603 may be maintained by domain owners that are also responsible for the domain to be reorganized by the dimensional concept taxonomy 210. Detailed information on the multi-tier data structures used by the system is provided below, illustrated in FIG. 33.

In one embodiment of the system 603, there may be provided a presentation layer 608 or graphical user interface (GUI) for the dimensional concept taxonomy 210. Client-side tools 610 such as browsers, web-based forms, and software components may allow domain end-users and domain owners/administrators to interact with the dimensional concept taxonomy 210.

Complex-Adaptive Processing Via User Interactions

The dimensional concept taxonomies 210 may be tailored and demarcated by each individual end-user and domain owner. These user interactions may be harnessed by second computing systems (e.g. 603) to provide human cognition and additional processing resources to the classification system.

Dimensional taxonomy information that embody the user interactions for example, encoded in XML 212a, may be returned to the transformation engine 602 such as by distributing via web services or other means. This allows the data structures (e.g. 206 and 210) to evolve and improve over time.

The feedbacks from second systems 603 to the transformation engine 602 establish the complex-adaptive system of processing. While end-users and domain owners interact at a high level of abstraction through the dimensional concept taxonomy 210, the user interactions may be translated to the elemental constructs (e.g. morphemes and morpheme relationships) that underlie the dimensional concept taxonomy information. By coupling the end-user and domain owner interactions to the elemental constructs and feeding them back to the transformation engine 602, the system may be able to evaluate the interactions in the aggregate.

Using this mechanism, ambiguity and conflict that historically arise in collaborative classification may be removed. Thus, this approach to collaborative classification seeks to avoid the personal and collaborative negotiations on the concept level that may arise with other such systems.

User interactions also extend the source data 202 available by allowing users to contribute content nodes 302 and classification data (dimensional concept taxonomy information) through their interactions, enhancing the overall quality of the classifications and increasing the processing resources available.

Multi-Tier Data Structures

FIG. 33 illustrates the means by which the elemental constructs harvested from each source data structure 202 are compounded through successive levels of abstraction and dimensionality to create the dimensional concept taxonomies 210 for each domain 200. It also illustrates the delineations between the decentralized private data (708, 710 and 302) embodied in each domain 200 and the shared elemental constructs (morpheme lexicon) 206 that the centralized system uses to inform the classification schemes generated for each domain.

Elemental Constructs

The elemental constructs of morphemes 310 and morpheme relationships may be stored in the morpheme lexicon 206 as centralized data. The centralized data may be centralized across the distributed computing environment 600 (e.g. via transformation engine system 601) and made available to all domain owners and end-users to aid in the classification of domains. Since the centralized data is elemental (morphemic) and disassociated from the context of any specific and private knowledge represented by concepts 306 and concept relationships, it may be shared among second decentralized computing systems 603. System 601 need not permanently store the unique expression and combination of these elemental constructs that comprises the unique information contained in each domain.

The morpheme lexicon 206 may store the attributes of each morpheme 310 in a set of tables of morpheme attributes 702. The morpheme attributes 702 may reference structural parameters and statistical data that are used by analytical processes of the transformation engine 602 (as described further below). The morpheme relationships may be ordered in the aggregate into the morpheme hierarchy 402.

Dimensional Faceted Output Data

A domain data store 706 may store the domain-specific data (complex dimensional structures 210a) derived by the transformation engine system 601 from the source data structure 202 and using the morpheme lexicon 206. One embodiment of the domain-specific data may be stored in XML form.

The XML-based complex dimensional structures 210a in each domain data store 706 may be comprised of a domain-specific keyword hierarchy 710, a set of content nodes 302, and a set of concept definitions 708. The keyword hierarchy 710 may be comprised of a hierarchical set of keyword relationships. The XML output may itself be encoded as faceted data. The faceted data represents the dimensionality of the source data structure 202 as facets of its structure, and the content nodes 302 of the source data structure 202 in terms of attributes of the facets. This approach allows domain-specific resources (e.g. system 603) to process the complex dimensional structures 210*a* into higher levels of abstraction such as dimensional concept taxonomy 210.

The complex dimensional structure 210*a* may be used as an organizing basis to manage the relationships between content nodes 302. A new set of organizing principles may be then applied to the elemental constructs for classification. The organizing principles may comprise an enhanced method of faceted classification as detailed below, illustrated in FIGS. 20-22.

The enhanced method of faceted classification may be applied to the complex dimensional structures 210*a*. Other simpler classification methods may also be applied and other data structures (whether simple or complex) may be created from the complex dimensional structures 210*a* as desired. In one embodiment, an output schema that explicitly represents faceted classifications may be used. Other output schema may be used. The faceted classifications produced for each domain may be represented using a variety of data models. The methods of classification available are closely associated with the types of data structures being classified. Therefore, these alternate embodiments for classification may be directly linked to the alternate embodiments of dimensionality, discussed above.

Data entities (e.g. 708, 710) contained in the domain data store 706 include references to the elemental constructs that are stored in the morpheme lexicon 206. In this way, the dimensional concept taxonomy 210 for each domain 200 can be re-analyzed subsequent to its creation, to accommodate changes. When domain owners want to update their classifications, domain-specific data may be reloaded into the analysis engine 204*a* for processing. A domain 200 may be analyzed in real-time (for example, through end-user interactions via XML 212*a*) or through (queued) periodic updates.

Shared Versus Private Data

An advantage of the dimensional knowledge representation model is the clear separation of private domain data and shared data used by the system to process domains into complex dimensional structures 210*a*. Data separation provides for distributed computing benefits such as hosted application service provider (ASP) processing models, opportunities to leverage utility computing environments such as the one described above, or software-as-a-service (SaaS) application delivery models. Under these models, a third-party may offer transformation engine services to domain owners. The domain owner can thus capitalize on the economies of scale that these types of models provide.

A domain owner's domain-specific data may be securely hosted under a variety of storage models (via an ASP, for example) as it is separable from the shared data (i.e. morpheme lexicon 206) and the private data of other domain owners. Alternately, the domain-specific data may be hosted by the domain owners, physically removed from the shared data.

Under this distributed knowledge representation model, domain owners may benefit from both the economic advantages and specialization of centralized knowledge transformation services as well as benefit from the "collective wisdom" of centralized classification data. However, by keeping the necessary domain-specific data separate from these centralized services and data assets, domain owners may build on the shared knowledge (e.g. the morpheme lexicon) of the entire community of users without having to compromise their unique knowledge.

The knowledge warehouses and intranets within enterprise settings provides an example of this application of shared collective knowledge within the context of private knowledge domains. Presently, companies are faced with severe trade-offs between the economic advantages of collective knowledge and open collaboration with the need to maintain private knowledge for competitive advantage. The system described herein allows this type of closed information domain to nevertheless benefit from the centralized knowledge representation and transformation services described herein as well as community data assets, as in the morpheme lexicon described herein, while keeping their synthesized knowledge and domain-specific data assets private.

Distributed Computing Environments

In one embodiment, the build engine may be distributed as a software application running on an open source platform. One such open source platform is the "LAMP" stack of technologies consisting LINUX™, APACHE™, MySQL™, and programming languages that may include Perl, PHP, Python and others. Through such an application multiple copies of the build engine's synthesis rules may be read directly on the distributed physical systems of domain owners. Under this model, we have a distributed physical system running centralized processing rules (as each copy of the build engine is provided with the same instructions).

Using this approach, the scaling costs for synthesizing the complex dimensional structures for each domain are distributed across the resources of each domain owner. In a similar fashion, the build engine may be distributed as lightweight client-side application, synthesizing complex dimensional structures as needed by the end-users of those applications.

In addition to the opportunity to run these decentralized systems directly on the systems of domain owners and end-users, a utility computing platform such as AMAZON WEB SERVICES™ (AWS) provides an economical distribution mechanism for the centralized build engine rules. (The direct costs of running virtualized instances of the build engine may be more than offset by the indirect costs of distributing and supporting build engines across the heterogeneous environments of domain owners.) Rather than physically distributing copies of the build engine, virtualized build engine applications could be provided within the utility computing environment.

For example, within AWS, an image for the build engine would be created and uploaded to the virtualized environment of the AWS Elastic Compute Cloud service (EC2). EC2 may provide one or more virtual server environments. An AWS "image" is essentially a disk image of the virtual server; an "instance" is an operating virtual server that is based on that disk image. New instances of the build engine running on virtual servers would be provisioned to process domains and accommodate user activity as needed.

In this decentralized environment (as well as many others), the domain-specific data and the build engine may be decoupled. Within AWS, EC2 may be used for processing, the Simple Storage Service (S3) may be used for data storage, and the Simple Queue Service (SQS) may be used to coordinate messaging across EC2, S3 and the other centralized services of analysis and complex-adaptive feedback, introduced above and discussed in greater detail below.

The AWS S3 service may be used for storage and distribution of faceted data sets that encode dimensional complex structures for domains. These domain-specific faceted data sets may be shared between multiple virtual servers that are processing the build engine rules.

Synthesized concept relationships may be stored in this decentralized environment. Build requests may be synthesized and sent in parallel to both end-user systems and to S3. Thereafter, synthesis requests matching previously requested parameters may be fulfilled from the cache of concept relationships in S3 or, if updates are needed, generated directly by the build engine. Equally importantly, the synthesized relationships would be available as feedback for the next analysis cycle in the centralized analysis engine services, as described above.

Those skilled in the art will appreciate that there are many architectural improvements and advancements that may be made here in the area of distributed computing. Parallelization across multiple virtual machines and load balancing across domains and user activities are examples of this type of improvement.

XML Schema and Client-Side Transformations

Faceted output data may be encoded as XML and rendered by XSLT. The faceted output may be reorganized and represented in many different ways (for example, refer to the published XFML schema). Alternate outputs for representing hierarchies are available.

XSL transformation code (XSLT) is used in one embodiment to present the presentation layer. All information elements managed by the system (including distributed content if it is channeled through the system) may be rendered by XSLT.

Client-side processing is the process of one embodiment to connect data feeds to the presentation layer of the system. These types of connectors may be used to output information from the application server to the various media that use the structural information. XML data from the application server may be processed through XSLT for presentation on a web page.

Those skilled in the art will appreciate the current and future functionality that XML technologies and similar presentation technologies will provide in the service of this invention. In addition to basic publishing and data presentation, XSLT and similar technologies may provide a range of programmatic opportunities. Complex information structures such as those created by the system may provide actionable information, much like data models. Software programs and agents may act upon the information on the presentation layer, to provide sophistication interactivity and automation. As such, the scope of invention provided by the core structural advantages of the system may extend far beyond the simple publishing.

Those skilled in the art will also appreciate the variability that is possible for architecting these XML and XSLT locations. For example, the files may be stored locally on the computers of end-users or generated using web services. ASP code (or similar technology) may be used to insert the information managed by our system on distributed presentation layers (such as the web pages of third-party publishers or software clients).

As another example, an XML data feed containing the core structural information from the system may be combined with the distributed content that the system organizes. Those skilled in the art will appreciate the opportunities to decouple these two types of data into separate data feeds.

These and other architectural opportunities for storing and distributing these presentation files and data feeds are well known in the art, and will therefore not be discussed further herein.

User Interfaces

The following sections provide implementation details on various user interfaces for system operations discussed above. These operations are: viewing the dimensional concept taxonomy; providing synthesis parameters in the mode of dynamic synthesis; and editing the dimensional concept taxonomy. Those skilled in the art will appreciate the diversity of possible user interfaces that may be implemented in the service of the system operations discussed above. As such, the illustrations and descriptions of user interface implementations in no way limit the scope of the invention.

Dimensional Concept Taxonomy Viewer

Figure 34:
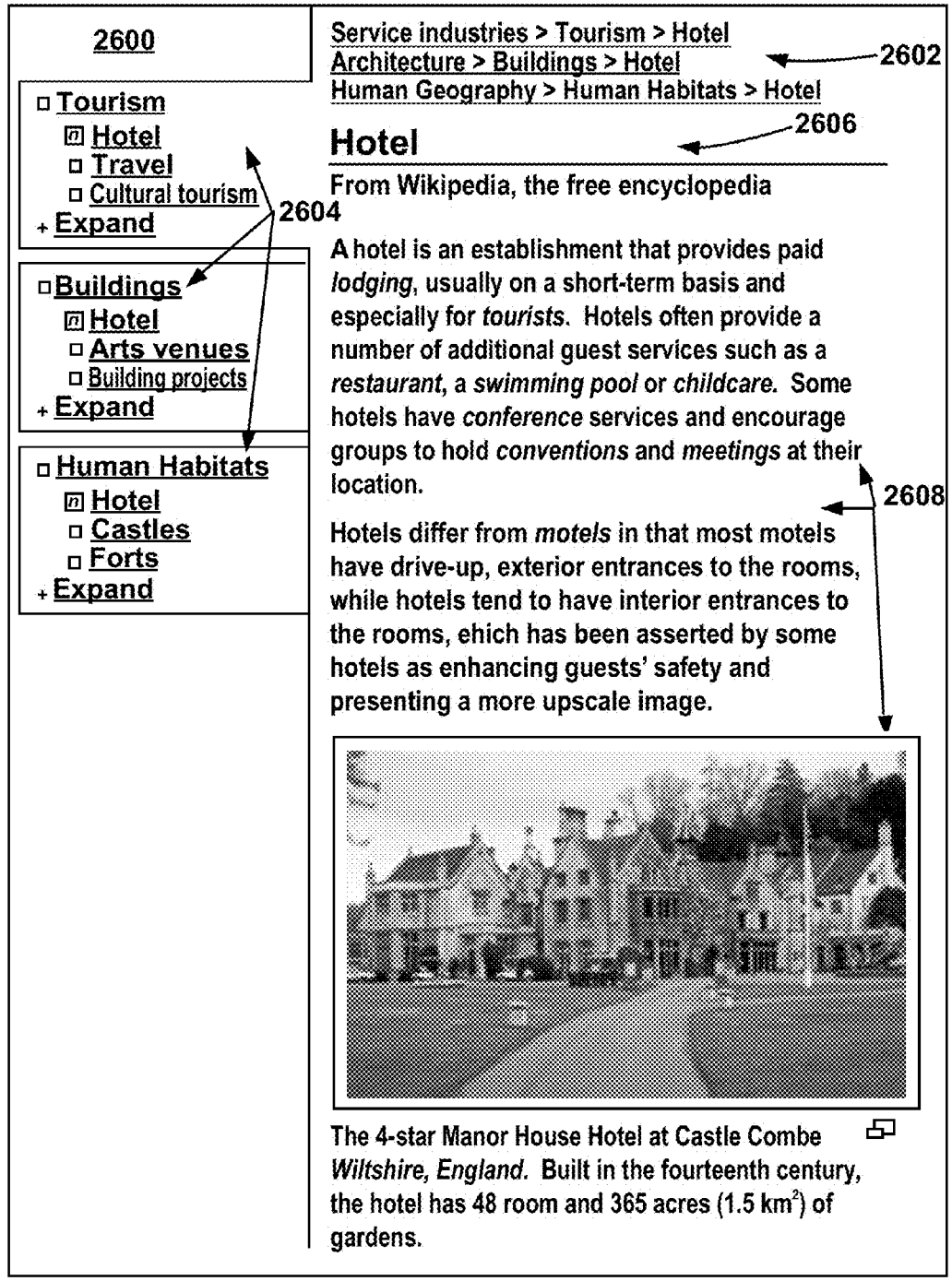
FIG. 34 illustrates a view of a dimensional concept taxonomy in a browser-based user interface.
Figure 35:
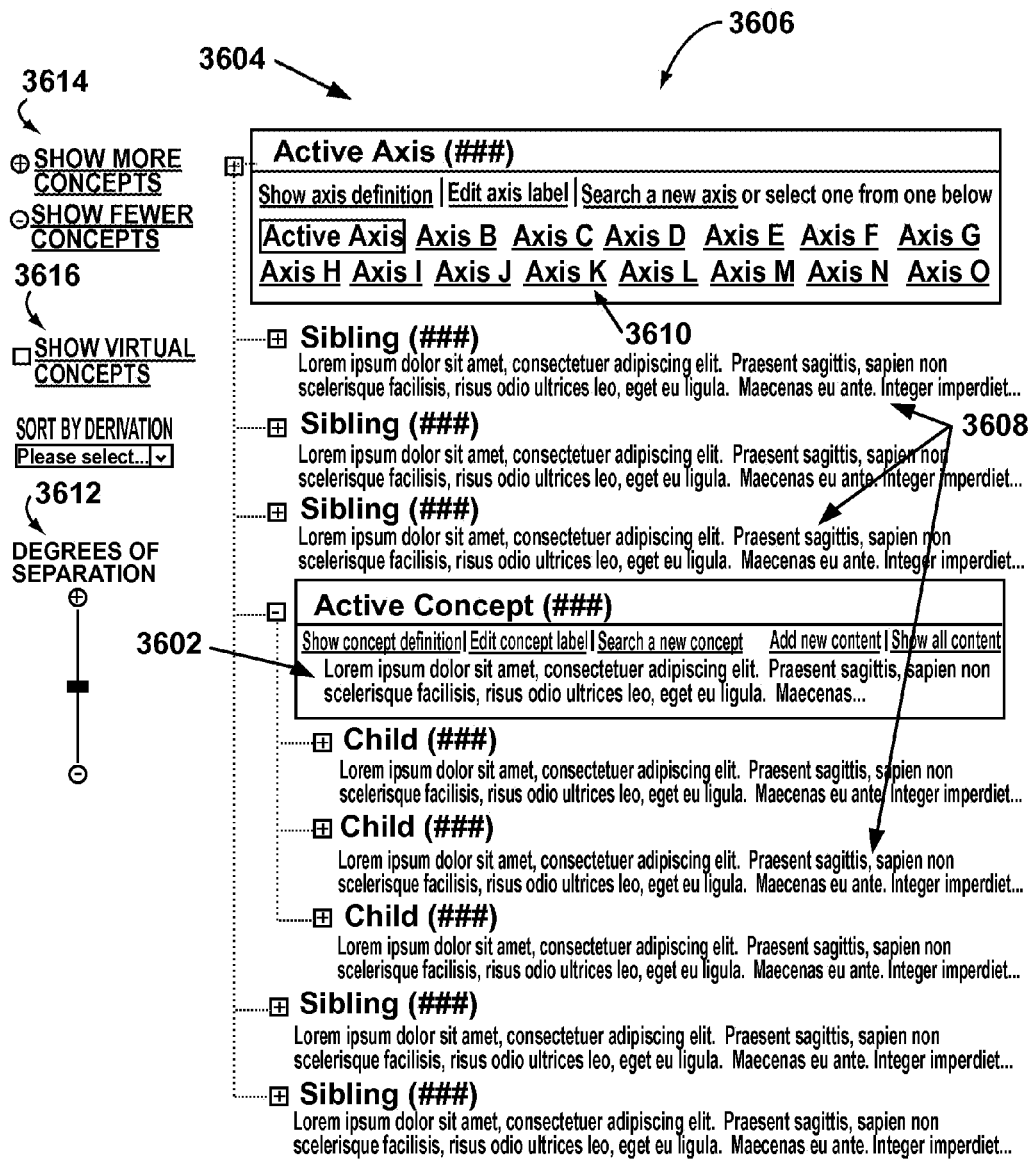
FIG. 35 illustrates a browser-based user interface to facilitate a mode of dynamic synthesis.

FIG. 34 provides an illustrative screen capture of the main components of the dimensional concept taxonomy presentation UI for end-user viewing and browsing.

The content container 2600 may hold the various types of content in the domain, along with the structural links and concept definitions that form the presentation layer for a dimensional concept taxonomy. One or more concept definitions may be associated with the content nodes in the container. The system may be able to manage any type of informational element, registered in the system along with a URI and the concept definitions used to calculate dimensional concept relationships, as described herein.

In one embodiment, user interface devices that are usually associated with traditional linear (or flat) information structures may be compounded or stacked to represent dimensionality in the complex dimensional structures.

Compounding traditional Web UI devices such as navigation bars, directory trees 2604, and breadcrumb paths 2602 may be used to show the dimensional intersections at various nodes in the information architecture. Each dimensional axis (or hierarchy) that intersects with the active content node 2606 may be represented as a separate hierarchy, one for each intersecting axis.

Structural relationships may be defined by pointers (or links) from the active content container to related content containers in the domain. This may provide for multiple structural links between the active container and the related containers, as dictated by the dimensional concept taxonomy. The structural links may be presented in a variety of ways, including a full context presentation of the concepts, a filtered presentation of the concepts that displays only the keywords on the active axis, a presentation of content node labels, etc.

Structural links may provide the context for the content nodes 2608 within the dimensional concept taxonomy, organized in prioritized groupings of content nodes within one or more relationship types (for example, parent, child, or sibling).

XSLT may be used to present structural information as a navigation path on the Web site, allowing a user to navigate the structural hierarchy to containers related to the active container. This type of presentation of structural information as navigation devices on a web site may be among the most basic applications of the system.

These and other navigational conventions are well known in the art.

Dynamic Synthesis User Interface

A user interface incorporating user interface controls to provide for dynamic synthesis operations (as described above) is shown in FIG. 35.

The user interface may include user interface controls with which a user may specify: an active concept definition 3602, an active axis definition 3604, and an active domain 3606. The controls for specifying an active concept definition and active axis definition may include links (shown) for stipulating concept definitions as keywords, and initiating editing operations and text-based searches (not shown).

In one embodiment, the user may select an active concept definition from a set of concept definitions arranged within an existing concept hierarchy 3608. This selection of active concept definitions may be based on a previously executed static synthesis operations to provide a global navigation structure for the dimensional concept taxonomy.

In another embodiment, to specify the active concept definition, the user may type a query into a text box (not shown). The query may be processed against the set of entity labels associated with the domain. As they are typing, a list of suggestions may be offered, based on string comparisons against the labels associated with other entities of concepts, keywords, and morphemes in the domain. (Extraction methodologies are discussed in greater detail above.) Using these tools, the user may be able to select a concept definition from the suggestions offered, based on the custom vocabulary of domain-specific labels.

The axis definition may be specified using a list of one or more attributes of the active concept definition or any combination of attributes that the user may wish to assemble (as described above under the discussion of synthesis operations). "Tag clouds" 3610 based on an analysis of attributes from within the candidate set used for the dynamic synthesis operations may be one means for providing s survey of possible axial definitions. For example, a count of the most prevalent keywords in the candidate set may be used as the basis for both selecting a subset of keywords for presentation, as well as varying the font size of the keyword labels based on an overall keyword count.

In this implementation, the user may choose the active domain by selecting from a set of tabs located across the top of the screen.

To control the scope of the processing and the resultant synthesis output, controls to define synthesis parameters as described above may include: degrees of separation as a slider 3610 and limits on the number of concepts returned as links 3612. (In this embodiment, limits on the number of content nodes displayed are coupled to the limits on the concepts returned. Alternatively, the limits on concepts and content nodes may be decoupled to provide for more flexibility in the presentation.) A means by which virtual concepts may be displayed or hidden is illustrated as a check box toggle control 3614

Dimensional Concept Taxonomy Outliner

A view of the dimensional concept taxonomy may be presented to the user through the user interface described above. It is assumed, for the purposes of illustration, that after reviewing the classification, the user wishes to reorganize it. From a system perspective, these interactions would generate explicit user feedback within the complex-adaptive system.

Figure 36:
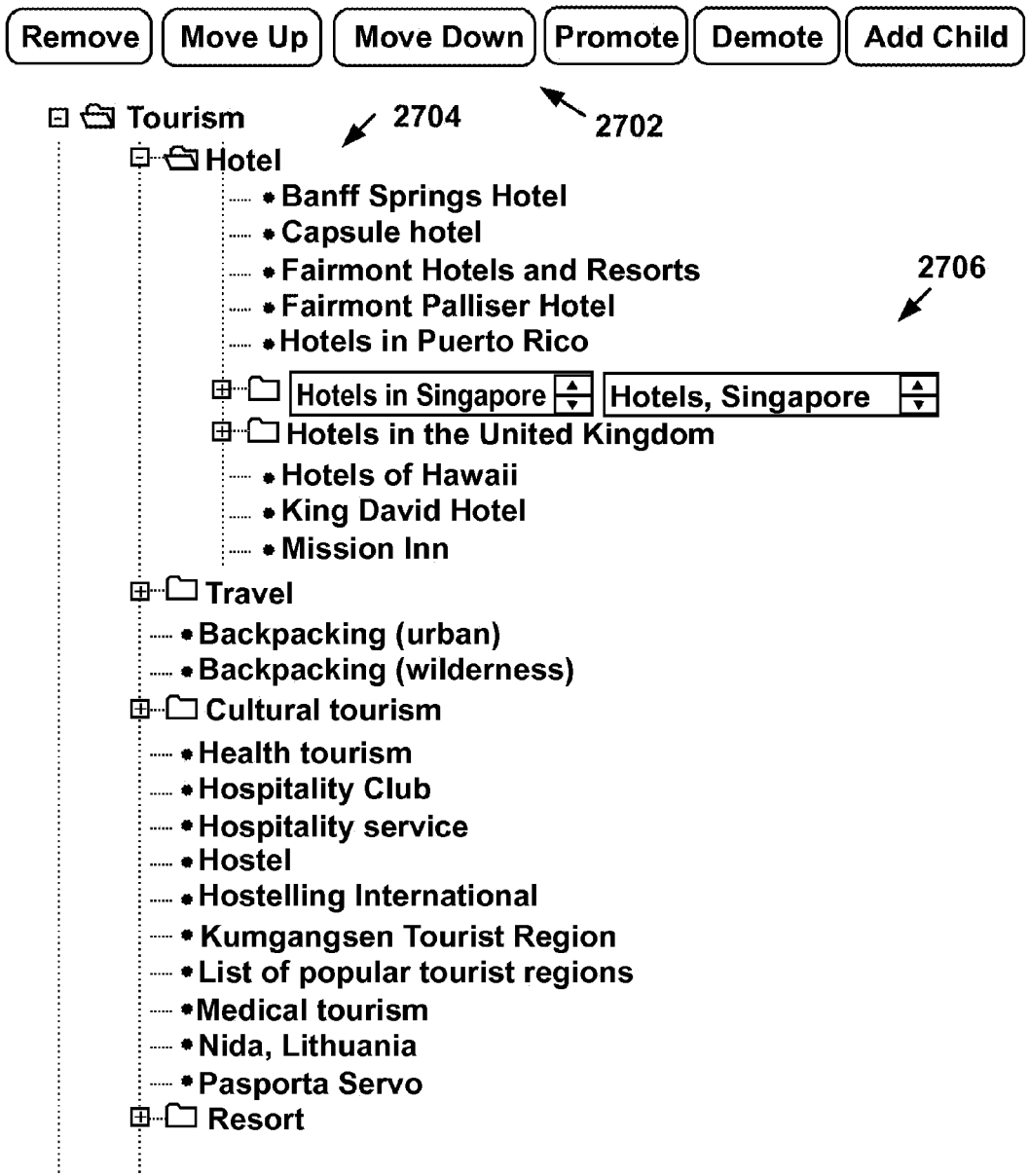
FIG. 36 illustrates an environment for user interactions in an outliner-based user interface.

FIG. 36 illustrates the outliner user interface that may provide for these interactions in one embodiment. It shows devices to change the location of nodes 2702 in the structure 2704 and to edit the containers and concept definition assignments at each node 2706.

In one embodiment, using a client-side control, the user may be able to move nodes in the hierarchy to reorganize the dimensional concept taxonomy. In so doing, the user may establish new parent-child relationships between nodes.

As the location of the node is edited, it may make relevant a new set of relationships between the underlying morphemes. This in turn may require a recalculation to determine the new set of inferred dimensional concept relationships. These changes may be queued to calculate the new morpheme relationships inferred by the concept relationships.

The changes may be stored as exceptions to a shared dimensional concept taxonomy (hereinafter a community concept taxonomy) for the personalized needs of the user (see below for more details on personalization).

Those skilled in the art will appreciate that there are many methods and technologies that may be used to present multi-dimensional information structures and provide interactivity to end-users. For example, multivariate forms may be used to allow users to query the information architecture along many different dimensions simultaneously. Technologies such as "pivot tables" may be used to hold one dimension (or variable) constant in the information structure while other variables are changed. Software components such as ActiveX and Ajax-based components may be embedded in the Web pages to provide interactivity with the underlying structure. Visualization technologies may provide three-dimensional views of the data. These and other variations will be apparent to those skilled in the art and do not limit the scope of the present invention.

It will be appreciated by those skilled in the art that the invention can take many forms, and that such forms are within the scope of the invention as claimed. Therefore, the spirit and scope of the appended claims should not be limited to the descriptions of the particular versions contained herein.

What is claimed is:

1. A method, performed in a computer, for synthesizing one or more relationships between concept definitions in a plurality of concept definitions, wherein each of the concept definitions comprises at least one of a plurality of attributes, the method comprising:

providing a user interface comprising a web page that renders a view of data elements corresponding to an active content node in a domain of information, the active content node being associated with an active concept definition in the plurality of concept definitions;

determining, based at least in part on input received via the user interface, whether any implicit relationships exist between the active concept definition and a first concept definition of the plurality of concept definitions, wherein an implicit relationship between the active concept definition and the first concept definition is determined to exist if the active concept definition and the first concept definition share at least one common attribute in the plurality of attributes;

in response to determining that at least one implicit relationship exists between the active concept definition and the first concept definition, using the computer, synthesizing a previously unrecognized relationship between the active concept definition and the first concept definition; and generating a dimensional concept hierarchy based on dimensional concept relationships synthesized between the active concept definition and the plurality of concept definitions.

2. The method of claim 1, wherein the relationship synthesized between the active concept definition and the first concept definition is either an ancestor relationship or a descendant relationship.

3. The method of claim 1, further comprising:

defining a limit for a number of hierarchical steps in the dimensional concept hierarchy.

4. The method of claim 3, further comprising:
receiving user input indicating the limit.

5. The method of claim 1, further comprising:
defining a limit on a number of relationships to synthesize between the active concept definition and the plurality of concept definitions.

6. The method of claim 5, further comprising:
receiving user input indicating the limit.

7. The method of claim 1, wherein synthesizing the relationship between the active concept definition and the first concept definition further comprises defining a dimensional axis between the active concept definition and the first concept definition in the dimensional concept hierarchy.

8. The method of claim 1, further comprising:
evaluating sets of dimensional concept relationships for presence of indirect relationships and assembling the dimensional concept hierarchy without the indirect relationships.

9. The method of claim 1, further comprising:
defining the dimensional concept relationships for the domain of information such that said defining is limited to real-time processing using concept definitions proximal to a selected concept definition.

10. The method of claim 1, further comprising:
defining the dimensional concept relationships for a domain to be classified such that said defining is limited in time for latency control.

11. The method of claim 1, wherein the domain of information further comprises a plurality of content nodes and wherein the method further comprises:
automatically deriving the plurality of concept definitions from the domain of information by examining the content nodes.

12. The method of claim 11, further comprising:
defining the dimensional concept relationships for a domain to be classified such that said defining is limited to processing a localized region of the domain using content nodes proximal to a selected content node.

13. The method of claim 1, wherein the data elements include concept definitions and the user interface allows a user to modify the concept definitions.

14. The method of claim 1, wherein the data elements include hierarchical data and the user interface allows a user to modify the hierarchical data.

15. The method of claim 1, wherein the data elements include content nodes and the user interface allows a user to change a position of a content node associated with concepts relative to other content nodes associated with concepts in a dimensional concept taxonomy.

16. The method of claim 1, wherein the user interface allows a user to change definitions describing subject matter of a content node.

17. The method of claim 1, wherein the user interface allows display of data element modifications to a user.

18. The method of claim 1, wherein the synthesized relationship represents a data connection that matches an interest of the user.

19. At least one non-transitory computer-readable medium encoded with instructions that, when executed by a computer, cause the computer to perform a method of synthesizing relationships between concept definitions in a plurality of concept definitions, wherein each of the concept definitions comprises at least one of a plurality of attributes, the method comprising:
providing a user interface comprising a web page that renders a view of data elements corresponding to an active content node in a domain of information, the active content node being associated with an active concept definition in the plurality of concept definitions;
determining, based at least in part on input received via the user interface, whether any implicit relationships exist between the active concept definition and a first concept definition of the plurality of concept definitions, wherein an implicit relationship between the active concept definition and the first concept definition is determined to exist if the active concept definition and the first concept definition share at least one common attribute in the plurality of attributes;
in response to determining that at least one implicit relationship exists between the active concept definition and the first concept definition, synthesizing a previously unrecognized relationship between the active concept definition and the first concept definition; and
generating a dimensional concept hierarchy based on dimensional concept relationships synthesized between the active concept definition and the plurality of concept definitions.

20. The at least one non-transitory computer-readable medium of claim 19, wherein synthesizing the relationship between the active concept definition and the first concept definition further comprises defining a dimensional axis between the active concept definition and the first concept definition in a dimensional concept hierarchy.

21. A computer system comprising:
at least one hardware processor; and
at least one tangible memory that stores processor-executable instructions that, when executed by the at least one hardware processor, cause the at least one hardware processor to perform a method of synthesizing relationships between concept definitions in a plurality of concept definitions, wherein each of the concept definitions comprises at least one of a plurality of attributes, the method comprising:
providing a user interface comprising a web page that renders a view of data elements corresponding to an active content node in a domain of information, the active content node being associated with an active concept definition in the plurality of concept definitions;
determining, based at least in part on input received via the user interface, whether any implicit relationships exist between the active concept definition and a first concept definition of the plurality of concept definitions, wherein an implicit relationship between the active concept definition and the first concept definition is determined to exist if the active concept definition and the first concept definition share at least one common attribute in the plurality of attributes;
in response to determining that at least one implicit relationship exists between the active concept definition and the first concept definition, synthesizing a previously unrecognized relationship between the active concept definition and the first concept definition; and
generating a dimensional concept hierarchy based on dimensional concept relationships synthesized between the active concept definition and the plurality of concept definitions.

22. A method, performed in a computer, for rendering a view of data elements corresponding to an active node in an information domain, wherein the information domain comprises a plurality of content nodes, the method comprising:

receiving user input specifying an active concept definition;

determining whether any implicit relationships exist between the active concept definition and a first concept definition, wherein an implicit relationship is determined to exist if the active concept definition and the first concept definition share at least one common attribute;

providing a user interface comprising a web page that renders a view of data elements corresponding to an active content node in the information domain, wherein input provided by a user through the user interface is used in determining whether any implicit relationships exist between the active concept definition and the first concept definition thereby providing an implicit feedback loop, based on the input provided by the user, for determining implicit concept relationships; and in response to determining that at least one implicit relationship exists between the active concept definition and the first concept definition, synthesizing a previously unrecognized relationship between the active concept definition and the first concept definition; and generating a dimensional concept hierarchy based on dimensional concept relationships synthesized between the active concept definition and the plurality of concept definitions.

* * * * *